US012730090B2

(12) United States Patent
Browne

(10) Patent No.: US 12,730,090 B2
(45) Date of Patent: Sep. 8, 2026

(54) pH METER CALIBRATION AND CORRECTION

(71) Applicant: Regeneron Pharmaceuticals, Inc., Tarrytown, NY (US)

(72) Inventor: Ross Browne, New York, NY (US)

(73) Assignee: REGENERON PHARMACEUTICALS, INC., Tarrytown, NY (US)

( * ) Notice: Subject to any disclaimer, the term of this patent is extended or adjusted under 35 U.S.C. 154(b) by 929 days.

(21) Appl. No.: 17/938,504

(22) Filed: Oct. 6, 2022

(65) Prior Publication Data

US 2023/0110811 A1 Apr. 13, 2023

Related U.S. Application Data

(60) Provisional application No. 63/253,336, filed on Oct. 7, 2021.

(51) Int. Cl.
*G01N 27/416* (2006.01)
*G01N 27/30* (2006.01)

(52) U.S. Cl.
CPC ....... *G01N 27/4165* (2013.01); *G01N 27/302* (2013.01)

(58) Field of Classification Search
CPC ............. G01N 27/4165; G01N 27/302; G01N 31/166; G01N 31/16
See application file for complete search history.

(56) References Cited

U.S. PATENT DOCUMENTS

| | | | |
|---|---|---|---|
| 4,072,565 | A | 2/1978 | Weiss et al. |
| RE30,985 | E | 6/1982 | Cartaya |
| 4,560,655 | A | 12/1985 | Baker |
| 4,615,977 | A | 10/1986 | Hasegawa et al. |
| 4,786,599 | A | 11/1988 | Chessebeuf et al. |
| 4,940,551 | A | 7/1990 | Riggs et al. |
| 5,122,469 | A | 6/1992 | Mather et al. |
| 5,389,546 | A | 2/1995 | Becket et al. |
| 5,610,279 | A | 3/1997 | Brockhaus et al. |
| 5,705,364 | A | 1/1998 | Etcheverry et al. |

(Continued)

FOREIGN PATENT DOCUMENTS

| | | | |
|---|---|---|---|
| CN | 107416969 | A | 12/2017 |
| CN | 112306035 | A | 2/2021 |

(Continued)

OTHER PUBLICATIONS

Altamirano et al., "Analysis of CHO Cells Metabolic Redistribution in a Glutamate-Based Defined Medium in Continuous Culture," Biotechnol. Prog., 2001, 17(6), pp. 1032-1041.

(Continued)

*Primary Examiner* — Jennifer Wecker
(74) *Attorney, Agent, or Firm* — BakerHostetler

(57) ABSTRACT

The disclosure relates to systems and methods for detecting and correcting errors in pH meter calibration or function when changing the pH of a sample, comprising measuring an initial pH, adding two or more amounts of titrant and measuring corresponding pH values, and applying a model to determine if the measured pH values correspond to pH values predicted by the model. The systems and methods can be used to control pH during viral inactivation of protein samples.

33 Claims, 24 Drawing Sheets

(56) References Cited

U.S. PATENT DOCUMENTS

| | | | |
|---|---|---|---|
| 5,856,179 | A | 1/1999 | Chen et al. |
| 5,976,833 | A | 11/1999 | Furukawa et al. |
| 6,048,728 | A | 4/2000 | Inlow et al. |
| 6,180,401 | B1 | 1/2001 | Chen et al. |
| 6,528,286 | B1 | 3/2003 | Ryll |
| 6,919,183 | B2 | 7/2005 | Fandl et al. |
| 6,924,124 | B1 | 8/2005 | Singh |
| 6,927,004 | B2 | 8/2005 | Eurlings et al. |
| 7,087,411 | B2 | 8/2006 | Daly et al. |
| 7,279,159 | B2 | 10/2007 | Daly et al. |
| 7,294,484 | B2 | 11/2007 | Drapeau et al. |
| 7,429,491 | B2 | 9/2008 | Luan et al. |
| 7,582,298 | B2 | 9/2009 | Stevens et al. |
| 7,666,416 | B2 | 2/2010 | Etcheverry et al. |
| 7,771,997 | B2 | 8/2010 | Chen et al. |
| 7,879,984 | B2 | 2/2011 | Martin et al. |
| 8,043,617 | B2 | 10/2011 | Stevens et al. |
| 8,062,640 | B2 | 11/2011 | Sleeman et al. |
| 8,216,575 | B2 | 7/2012 | Yu |
| 8,309,088 | B2 | 11/2012 | Macdonald et al. |
| 8,735,095 | B2 | 5/2014 | Martin et al. |
| 8,871,209 | B2 | 10/2014 | Stitt et al. |
| 8,945,559 | B2 | 2/2015 | Dix et al. |
| 9,018,356 | B2 | 4/2015 | Sleeman et al. |
| 9,079,948 | B2 | 7/2015 | Orengo et al. |
| 9,132,192 | B2 | 9/2015 | Daly et al. |
| 9,173,880 | B2 | 11/2015 | Dix et al. |
| 9,228,014 | B2 | 1/2016 | Classon et al. |
| 9,260,515 | B2 | 2/2016 | Stitt et al. |
| 9,265,827 | B2 | 2/2016 | Wiegand et al. |
| 9,302,015 | B2 | 4/2016 | Papadopoulos et al. |
| 9,353,176 | B2 | 5/2016 | Macdonald et al. |
| 9,402,898 | B2 | 8/2016 | Walsh et al. |
| 2014/0044730 | A1 | 2/2014 | Yancopoulos et al. |
| 2014/0088295 | A1 | 3/2014 | Smith et al. |
| 2014/0271642 | A1 | 9/2014 | Murphy et al. |
| 2014/0271653 | A1 | 9/2014 | Gurnett-Bander et al. |
| 2014/0271658 | A1 | 9/2014 | Murphy et al. |
| 2014/0271681 | A1 | 9/2014 | Martin et al. |
| 2015/0203579 | A1 | 7/2015 | Papadopoulos et al. |
| 2015/0203580 | A1 | 7/2015 | Papadopoulos et al. |
| 2015/0259423 | A1 | 9/2015 | Kirshner et al. |
| 2015/0266966 | A1 | 9/2015 | Smith et al. |
| 2015/0313194 | A1 | 11/2015 | Hu et al. |
| 2015/0337029 | A1 | 11/2015 | Kyratsous et al. |
| 2015/0337045 | A1 | 11/2015 | Okamoto et al. |
| 2016/0017029 | A1 | 1/2016 | Walsh et al. |
| 2016/0075778 | A1 | 3/2016 | Okamoto et al. |
| 2016/0215040 | A1 | 7/2016 | Kyratsous et al. |
| 2019/0361007 | A1 | 11/2019 | Zeuthen et al. |
| 2021/0123885 | A1 | 4/2021 | Wilhelm et al. |
| 2021/0190700 | A1 | 6/2021 | Schweitzer et al. |

FOREIGN PATENT DOCUMENTS

| | | | | | |
|---|---|---|---|---|---|
| CN | 112947617 | A | | 6/2021 | |
| CN | 113008883 | A | * | 6/2021 | ............ G01N 31/16 |
| JP | 6-174677 | A | | 6/1994 | |
| KZ | 1297 | B | | 9/1994 | |
| TW | 200630107 | A | | 9/2006 | |
| TW | 200823454 | A | | 6/2008 | |
| WO | 2014/004103 | A1 | | 1/2014 | |
| WO | 2014074687 | A1 | | 5/2014 | |
| WO | 2017/156355 | A1 | | 9/2017 | |
| WO | 2021/021260 | A1 | | 2/2021 | |

OTHER PUBLICATIONS

Bettger et al., "Rapid clonal growth and serial passage of human diploid fibroblasts in a lipid-enriched synthetic medium supplemented with epidermal growth factor, insulin, and dexamethasone," Proc. Natl. Acad. Sci. USA, 1981, 78(9), pp. 5588-5592.

Davidson et al., "The Nucleoprotein Content of Fibroblasts Growing in vitro," Biochem. J., 1945, 39(2), pp. 188-199.

Dulbecco et al., "Production of Plaques in Monolayer Tissue Cultures by Single Particulars of an Animal Virus," Proc. Natl. Acad. Sci. USA, 1952, 38(8), pp. 747-752.

Eagle et al., "Nutrition Needs of Mammalian Cells in Tissue Culture," Science, 1955, 122(3168), pp. 501-504.

Ham, "Clonal Growth of Mammalian Cells in a Chemically Defined, Synthetic Medium," Nat'l Acad. Sci. USA, 1965, 53, pp. 288-293.

Holliger et al., "'Diabodies': small bivalent and bispecific antibody fragments," PNAS USA, 1993, 90:6444-6448.

Holmes et al., "Serum Fractionation and the Effects of Bovine Serum Fractions on Human Cells Grown in a Chemically Defined Medium," Biochem. Cytol., 1961, 10, pp. 389-401.

Huang et al., "Maximizing Productivity of CHO Cell-Based Fed-Batch Culture Using Chemically Defined Media Conditions and Typical Manufacturing Equipment," Biotechnol. Prog., 2010, 26(5), pp. 1400-1410.

Kipriyanov et al., "Single-chain antibody streptavidin fusions: tetrameric bifunctional scFv-complexes with biotin binding activity and enhanced affinity to antigen," Human Antibodies and Hybridomas (1995) 6:93-101.

Kipriyanov et al., "Recombinant single-chain Fv fragments carrying C-terminal cysteine residues: Production of bivalent and biotinylated miniantibodies," Mol. Immunol., 1994, 31(14):1047-1058.

Moore et al., "Culture of Normal Human Leukocytes," J. Amer. Med. Assoc., 1967, 199(8), pp. 519-524.

Orr et al., "Survival of Animal Tissue Cells in Primary Culture in the Absence of Serum," Appl. Microbiol., 1973, 25(1), pp. 49-54.

Poljak RJ et al., "Production and structure of diabodies," Structure, Dec. 1994, 2:1121-1123.

Taylor et al., "A transgenic mouse that expresses a diversity of human sequence heavy and light chain immunoglobulins," Nucl. Acids Res., (1992) 20(23):6287-6295.

Ward E.S., et al., "Binding Activities of a Repertoire of Single Immunoglobulin Variable Domains Secreted from *Escherichia coli*," Nature, Oct. 12, 1989, vol. 341, No. 6242, pp. 544-546.

Williams et al., "Isolation and Long-Term Cell Culture of Epithelial-Like Cells From Rat Liver," Exp. Cell. Res., 1971, 69, pp. 106-112.

Mahmoud Reza Pishvaie et al., "Control of pH processes using fuzzy modeling of titration curve", Fuzzy Sets and Systems, 157 (2006), pp. 2983-3006.

International Search Report and Written Opinion mailed Apr. 18, 2024 in International Application No. PCT/US2022/045902 (12 pages).

PALL® Biotech, "Viral Safety—Practical Solutions for Risk Control", Jun. 1, 2018, pp. 1-39, XP055713559, Retrieved from the Internet: URL:https://www.pall.com/content/dam/pall/biopharm/lit-library/gated/special/19-07511-USD3364-Virus-Safety-PracticalSolutions-Risk-Control-BOOK-EN.PDF.

Kurt Brorson et al: "Bracketed generic inactivation of rodent retroviruses by low pH treatment for monoclonal antibodies and recombinant proteins", Biotechnology and Bioengineering, John Wiley, Hoboken, USA, vol. 82, No. 3, Feb. 21, 2003, pp. 321-329, XP071133841, ISSN: 0006-3592, DOI: 10.1002/BIT.10574.

International Search Report and Written Opinion mailed Feb. 9, 2023 in International Application No. PCT/US2022/045905 (15 pages).

Rosdiazli Ibrahim et al., "Design, Implementation and Performance Evaluation of a Fuzzy Control System for a pH Neutralisation Process Pilot Plant", International Conference on Intelligent and Advanced Systems (ICIAS) 2007, Nov. 25, 2007, pp. 1001-1006, XP031397703.

* cited by examiner

Transform pH to scale of 1→0 (intial→final)

$$y = \frac{pH - pH_{final}}{pH_{initial} - pH_{final}}$$

Transform acid added to scale of 0→1 (intial→final)

$$x = \frac{\text{acid added}}{\text{acid added}_{final}}$$

- RMSE of quadratic fit = 0.0175 normalized pH units

→ In pH units RMSE = $0.0175 * \left(\frac{4.2\text{-}3.6\ pH}{1}\right) = 0.011\ pH$

How is the model used?

1. Measure initial pH (autosample)
2. Add conservative amount of acid
3. Measure intermediate pH (autosample)
4. Calculate normalized intermediate pH
5. Calculate normalized acid added by solving polynomial fit
6. Calculate remaining acid to be added

FIG. 3

| Components | Signals |
|---|---|
| 2 x Watson Marlow 530 pumps | Speed Setpoint (AO)<br>Speed Feedback (AI)<br>On/Off (DO) |
| 1 x Watson Marlow 120 pump | Speed Setpoint (AO)<br>Speed Feedback (AI)<br>On/Off (DO) |
| 2 x Sonotec CO.55 ultrasonic flow meters | Autozero (DO)<br>Volume Pulse (DI) |
| 1 x Mettler M400 pH transmitter | pH (AI)<br>Temperature (AI)<br>mV (AI) |
| 1 x Mettler pH flow cell | N/A |
| 1 x imPULSE mixer control cable | Speed Setpoint (AO)<br>On/Off (DO) |
| 3 x Ethernet I/O modules | N/A |

FIG. 11

Process Flow – Base Adjustment
Control Strategy for Slip-Stream Approach

VI Hold

Autozero Flowmeter

Base Addition #1

- Addition volume controlled by flowmeter
- Conservative addition ensures target pH is not overshot
- Mixer ON during base addition Base Addition #2

- Addition volume controlled by flowmeter
- Mixer ON during base addition

Base Addition #3

- Addition volume controlled by flowmeter
- Mixer ON during base addition

Process Complete

Mix and Auto-Sample Pool

- Mix pool for ~30s
- Start hold timer in case pH is in range
- Sample fixed volume
- Wait for pH to stabilize Calculate 1st Addition Volume mL/kg linear function of target pH Calculate 2nd Addition Volume Target: halfway to final pH Calculate 3rd Addition Volume Target: final pH Confirm offline pH is within target range for VIP filtration If pH is out of expected range, take offline pH sample and input measured pH Key
Automated Step
Manual Step

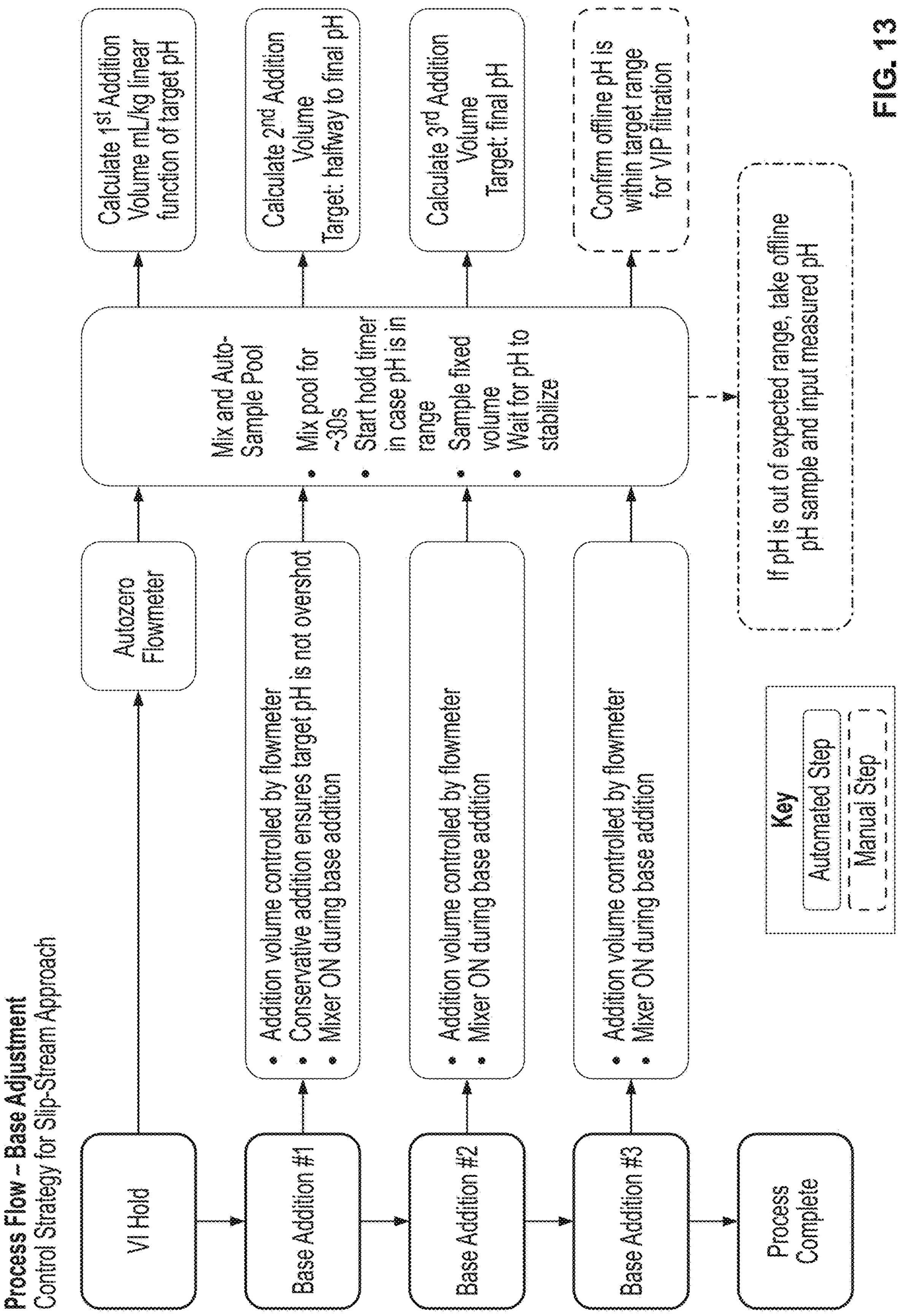

FIG. 13

| Process Step | Test Run #1 | | Test Run #2 | | Test Run #3 | | Test Run #4 | | Test Run #5 | |
|---|---|---|---|---|---|---|---|---|---|---|
| | ΔpH | Dosing Error (%) | ΔpH | Dosing Error (%) | ΔpH | Dosing Error (%) | ΔpH | Dosing Error (%) | ΔpH | Dosing Error (%) |
| Protein Pool | 0.05 | N/A | 0.05 | N/A | 0.00 | N/A | 0.00 | N/A | 0.04 | N/A |
| Acid Add #1 | 0.05 | 2.2 | 0.04 | 0.9 | 0.01 | 1.6 | 0.01 | 0.4 | 0.05 | 4.9 |
| Acid Add #2 | 0.05 | 4.0 | 0.06 | 0.9 | 0.01 | 1.1 | 0.00 | 0.3 | 0.05 | 5.0 |
| Acid Add #3 | 0.04 | 2.6 | 0.04 | 0.5 | 0.01 | 1.0 | 0.00 | 0.4 | 0.05 | 5.5 |
| Base Add #1 | 0.01 | 0.6 | 0.02 | 2.2 | 0.01 | 1.7 | 0.02 | 0.2 | 0.02 | -0.1 |
| Base Add #2 | 0.00 | 0.3 | 0.02 | 1.8 | 0.01 | 0.4 | 0.02 | -3.4 | 0.00 | -0.6 |
| Base Add #3 | 0.01 | 13.9 | 0.02 | 1.9 | 0.00 | 1.7 | 0.01 | -0.1 | 0.00 | 0.0 |

ΔpH = Slipstream pH - Offline pH $$\text{Dosing Error} = \frac{(\text{Volume Dosed} - \text{Target Volume})}{\text{Target Volume}} * 100\%$$

FIG. 15 pH METER CALIBRATION AND CORRECTION

CROSS REFERENCE TO RELATED APPLICATIONS

This application claims priority to, and benefit of, U.S. Provisional Application No. 63/253,336, filed on Oct. 7, 2021, the contents of which are incorporated by reference in their entirety herein.

BACKGROUND

Conventional methods of measuring pH can be problematic. Methods of sterilizing a pH probe, and inserting the probe into a sample, can frequently lead to errors in pH meter calibration. There thus exists a need in the art for systems and methods for determining errors in pH meter calibration.

SUMMARY

The disclosure provides methods of determining, and correcting, errors in pH meter calibration during processes that change the pH of a sample.

The disclosure provides methods comprising A method comprising (a) measuring an initial pH ($pH_{initial}$) of a sample; (b) adding a first amount of titrant ($Titrant_n$) to the sample and measuring a first additional pH value ($pH_n$), $Titrant_n$ being the amount of titrant added to the sample to reach $pH_n$, wherein $pH_n$ is different from $pH_{initial}$; (c) applying a model to determine a normalized initial amount of Titrant ($Titrant_{initial}$) and normalized $Titrant_n$, wherein the model relates the normalized titrant added to the sample to pH of the sample; (d) adding a second amount of titrant to the sample to reach a second pH value ($pH_{n+1}$), wherein the second amount of titrant is determined from $pH_{initial}$, $pH_n$, normalized $Titrant_{initial}$ and normalized $Titrant_n$; (e) measuring the pH of the sample after the addition of the second amount of titrant to determine $pH_{n+1}$ as measured; and (f) correcting a pH meter used to measure the pH of the sample when a difference between $pH_{n+1}$ as measured and $pH_{n+1}$ from the model indicates a calibration error in the pH meter.

In some embodiments of the methods of the disclosure, the difference between $pH_{n+1}$ as measured and $pH_{n+1}$ from the model is >0.01 pH units, >0.02 pH units, >0.03 pH units, >0.04 pH units, >0.05 pH units, >0.06 pH units, >0.07 pH units, >0.08 pH units, >0.09 pH units or >0.10 pH units. In some embodiments, the difference between $pH_{n+1}$ as measured and $pH_{n+1}$ from the model is >0.05 pH units. In some embodiments, the methods comprise adding a third amount of titrant ($Titrant_{n+2}$) to the sample and measuring a third additional pH ($pH_{n+2}$), and repeating steps (c) through (e), wherein a difference between $pH_{n+2}$ as measured and $pH_{n+2}$ from the model indicates a calibration error in the pH meter. In some embodiments, the methods comprise repeating steps (d) through (f) until a final pH is reached. In some embodiments, the methods comprise repeating steps (d) through (f) at least 1, 2, 3, 4, 5, 6, 7, 8, 9 or 10 times. In some embodiments, difference between the pH as measured and a pH from the model at any repetition that is >0.01 pH units, >0.02 pH units, >0.03 pH units, >0.04 pH units, >0.05 pH units, >0.06 pH units, >0.07 pH units, >0.08 pH units, >0.09 pH units or >0.10 pH units indicates a calibration error in the pH meter.

In some embodiments, correcting the pH meter comprises sending a signal to an operator indicating that a pH probe is faulty. In some embodiments, correcting the pH meter comprises recalibrating or replacing the pH probe.

In some embodiments of the methods of the disclosure, the methods comprise generating a model. In some embodiments, the methods comprise (i) generating at least one reference titration curve from at least one reference sample relating an amount of titrant added to the reference sample to the pH of the reference sample; (ii) normalizing the at least one reference titration curve; and (iii) generating the model to fit the at least one reference titration curve. In some embodiments, the model comprises a polynomial relating normalized titrant to pH.

The disclosure provides apparatuses configured for the methods of the disclosure.

The disclosure provides apparatuses for pH control in processes that change the pH of a sample. In some embodiments, the sample comprises a protein. In some embodiments, an apparatus can include a reactor and a pH flow cell comprising a pH probe disposed therein, the pH flow cell fluidically coupled to the reactor. The pH flow cell can receive a slip stream for sampling from the reactor and contains the pH probe disposed therein that measures the pH of the slip stream. The apparatus includes an acid titrant supply fluidically coupled to the reactor. The acid titrant supply provides an acid titrant to the reactor to reduce the pH in the reactor. The apparatus further includes a base titrant supply fluidically coupled to the reactor. The base titrant supply provides a base titrant to the reactor to increase the pH in the reactor. In some embodiments, the apparatus can further include a sampling pump that delivers the slip stream from the reactor to the pH flow cell. In some embodiments, the apparatus can include a waste receiver that receives effluent from the pH flow cell.

BRIEF DESCRIPTION OF THE DRAWINGS

FIG. 3 is a diagram showing application of pH modeling in an embodiment of the disclosure.

FIG. 11 is a list of parts for an exemplary system to control pH while changing pH of a sample.

FIG. 13 is a flow chart showing an exemplary control strategy for raising pH of a protein sample following viral inactivation. VIP: viral inactivated pool (the sample after addition of base).

FIG. 15 is a table showing the results from five tests runs lowering and raising pH using the apparatus and methods of an embodiment of the disclosure.

DETAILED DESCRIPTION

Figure 1:
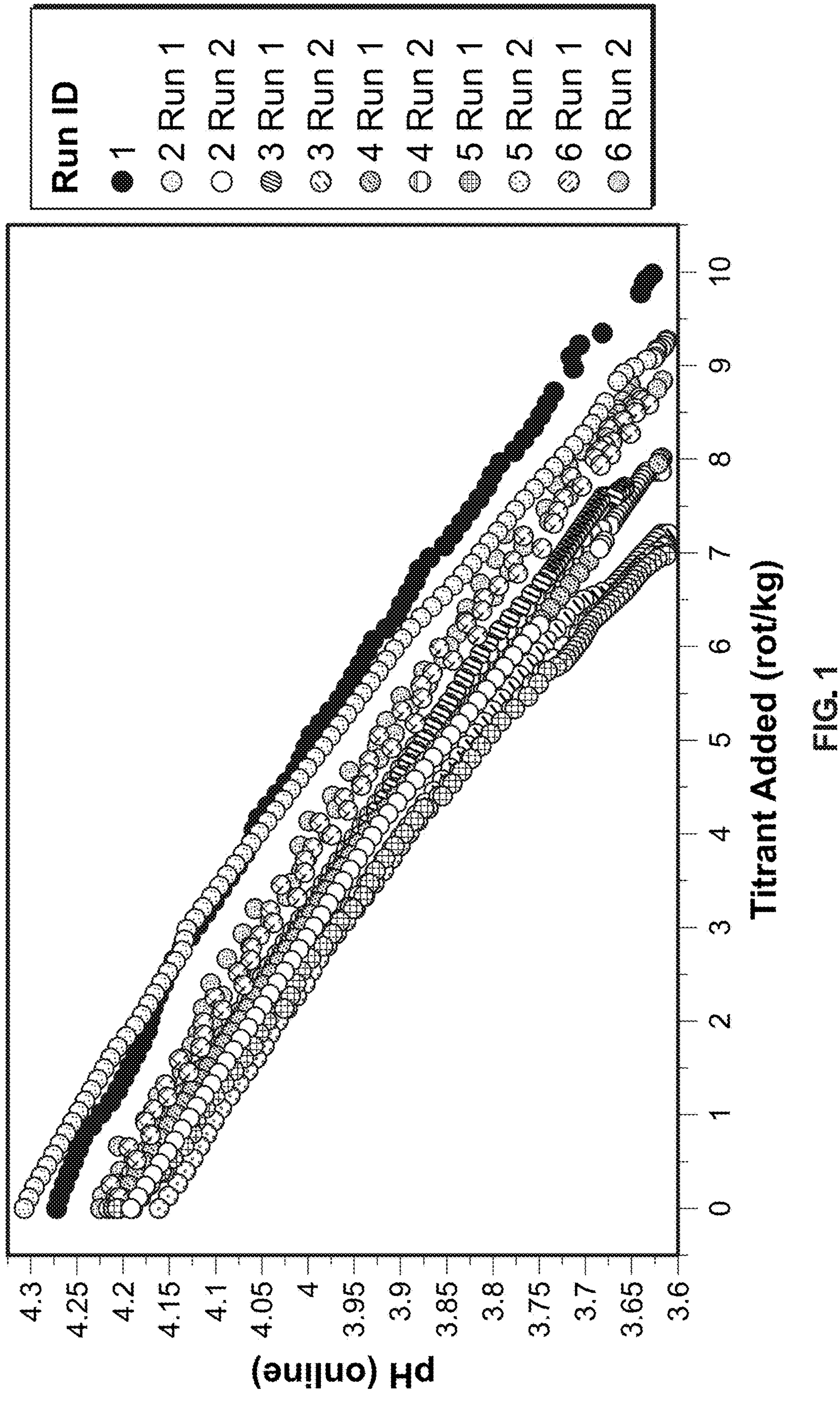
FIG. 1 is a plot showing 11 titration curves generated using 5 different proteins. pH was lowered through the addition of acid solution to reach a target pH of 3.6. pH is shown in the Y-axis, while the X-axis indicates the amount of acid titrant added in pump rotations per kilogram of eluate (rot/kg). A time shift was applied to the pump speed data to account for delay between acid addition and pH response.

The disclosure relates to methods of determining whether there has been an error in pH meter calibration. Many processes involve changing the pH of a sample, and errors in pH meter calibration, which are reflected by the pH of the sample, can lead to damage to the sample. One example of a process is the large-scale manufacture of biologics, such as antibodies or other therapeutic proteins. The manufacture of many therapeutic proteins involves culturing cells expressing the therapeutic protein, followed by purification of the protein from the cultured cells and/or cell culture medium. Controlling the pH of cell culture medium during cell culture, and controlling pH of the sample during protein purification, are both important for therapeutic protein production. Errors in pH meter calibration, and the resulting error in sample pH, can lead to denaturation of the protein, necessitating discarding the sample, if certain minimum or maximum pH values are exceeded. Even if the pH errors do not lead to the destruction of the protein, sample ranges outside of an acceptable pH range may necessitate costly and time consuming quality control measures to ensure that the protein is unaffected.

pH is controlled during multiple processes during therapeutic protein product. Most mammalian cells have a specific pH range that supports optimal cell growth, metabolism, and protein production. Errors in pH meter calibration, if they lead to cell culture conditions outside an optimal pH range, can negatively affect cell growth and protein production. Furthermore, cells used in manufacturing of therapeutic proteins may carry viruses, which are potentially harmful if they contaminate drug substances or drug products. One way to inactivate potentially harmful viruses is by transiently lowering pH during purification of the therapeutic protein. Many viruses are irreversibly denatured and effectively destroyed at a pH of about 5.0 to 5.5. Several enveloped viruses are effectively inactivated at a pH range of about 3.5 to 4.0. However, lowering or raising the pH of a protein sample too far risks denaturing the therapeutic protein, which can lead to destruction of the batch of protein and increased manufacturing costs. There thus exists a need to measure and control pH during the manufacture of therapeutic proteins, both during cell culture and during purification of the protein.

Conventional methods of measuring pH during protein purification can be unreliable, and lead to waste of protein product. In one method, pH is measured during protein purification by inserting a sterile pH probe directly into the reaction vessel containing the protein solution. However, it can be difficult to maintain sterility and probe accuracy using this approach. pH probes are typically calibrated, sealed in a bag with a bellows connector used to insert the probe into a reaction vessel, and sterilized via autoclave or gamma irradiation. However, this leads to a period between calibration and use when the pH probe is dry, which can affect probe accuracy. In addition, pH probes are made of glass, and can break when inserted into the vessel. Inserting the probe, while maintaining sterility, can be difficult. In another method, which measures pH of the protein solution indirectly, a "slip stream" is taken off the main protein solution, and the pH of the slip stream is measured using a pH probe. However, without direct measurement of the main protein solution pool, direct feedback control of titration to adjust pH is not possible. Further, any protein pulled from the main pool into the slip stream to measure pH is not returned to the main pool, and ends up being wasted. While statistical titration models can be used to predict the amount of acid or based to be added when making pH adjustments to a protein solution during manufacturing processes, these models require manual user input of protein concentrations, and each titration type (acid or base) requires a large historical data set to generate the model. In addition, these models are not universally accurate for all processes and types of proteins. Finally, without independent measurements, e.g. from a second pH probe, these methods may fail to detect errors in pH meter calibration early in the process.

There thus exists a need for methods of detecting errors in pH meter calibration that do not require direct insertion of a pH probe into the protein solution pool, or continuously pulling a slip stream of material from the protein pool. The disclosure provides methods and systems for detecting errors in pH meter calibration during processes that involve changing the pH of a sample, for example a protein sample. The methods of the disclosure are accurate across a wide range of proteins, do not require operator input or offline concentration measurement, and do not require large amounts of historical data. The methods of the disclosure can also be used to extrapolate the amounts of acid or base titrant needed to adjust pH during manufacturing processes. Furthermore, the methods and systems disclosed herein are able to reproducibly and accurately achieve pH values that are within 0.05 to 0.10 pH units of a desired target pH during processes to change the pH of the sample. A final target pH, for example a target acid pH for viral inactivation of a protein sample, or a target basic pH following inactivation, can be accurately and reliably achieved with just 3 to 4 titrant additions. The methods and systems disclosed herein are also able to accurately determine and add the amount of acid or basic titrant to be added to a sample, and can add the desired volume of titrant with an accuracy of 10% volume error or less per titrant addition. Because the methods and system disclosed herein are able to reproducibly and accurately reach target pH values, the methods and systems disclosed herein also provide superior efficacy in detecting and ameliorating errors in pH meter calibration. For example, if measured pH values do not conform to expected (or target) pH values from the models described herein during processes changing the pH of a sample, the skilled artisan can stop the process and recalibrate the pH meter before the sample is damaged by pH outside of an acceptable range.

The disclosure provides methods comprising measuring an initial pH of a sample, adding a first conservative amount of a titrant such as an acidic or basic solution, measuring a first intermediate pH value, adding a second amount of titrant and measuring a second intermediate pH value, applying a model to normalize the first and second amounts of titrant added to the sample, and correcting the pH meter when the second measured pH value diverges from the value predicted by the model for the normalized second amount of titrant added to the sample. The disclosure further provides an apparatus for carrying out the methods of the disclosure. Accordingly, the disclosure provides methods comprising: (a) measuring an initial pH ($pH_{initial}$) of a sample; (b) adding a first amount of titrant ($Titrant_n$) to the sample and measuring a first additional pH value ($pH_n$), $Titrant_n$ being the amount of titrant added to the sample to reach $pH_n$, wherein $pH_n$ is different from $pH_{initial}$; (c) applying a model to determine a normalized $Titrant_n$, wherein the model relates the normalized titrant added to the sample to pH of the sample; (d) adding a second amount of titrant ($Titrant_{n+1}$) to the sample and measuring a second additional pH value ($pH_{n+1}$) and repeating step (c); and (e) correcting a pH meter used to measure the pH of the sample when a difference between $pH_{n+1}$ and the model indicates a calibration error in the pH meter.

Definitions

As used herein, the term "initial pH" refers to the pH of a sample prior to the addition of a titrant used to change the pH, i.e. a solution that is acidic or basic relative to the initial pH of the sample.

As used herein, the "final pH" refers to the desired pH of the sample. For example, a sample may have a pH of 3.6, but to be suitable for a particular purpose needs to be at a pH of 7.5, and the processes used herein are used to detect errors in pH meter calibration while changing the pH from 3.6 to 7.5 through the controlled addition of a basic titrant. In this case, 3.6 is the initial pH, and 7.5 is the final, or target pH. The skilled artisan will appreciate that depending on the sample, sample conditions, and application, the initial and final pH values of any particular sample may be different. The person of ordinary skill in the art will appreciate that when processes for changing pH are carried out, the process may encompass multiple steps, each of which has an associated target pH, prior to reaching the final pH of the sample (or final target pH).

As used herein, the "total titrant ($Titrant_{total}$) refers to the amount of titrant added to a sample to change the pH from the initial pH to the final pH.

As used herein, "$pH_n$" refers to the pH of a sample after the addition some amount of titrant (necessary to change the sample from a previous pH ($pH_{n-1}$) to $pH_n$. Accordingly the amount of titrant necessary to change the pH from, for example, an initial pH to $pH_n$ is referred to herein as $Titrant_n$. The skilled artisan will appreciate that measured pH values and the corresponding amounts of titrant added to the sample to change the pH of the sample to these measured pH values can be iterative. I.e., a further amount of titrant can be added to a sample at $pH_n$ to change the pH of the sample to $pH_{1+1}$, and the amount of titrant added to the sample to change the pH from the initial pH to $pH_{n+1}$ is referred to as $Titrant_{n+1}$. Similarly, an amount of titrant can be added to a sample at $pH_{n+1}$ to change the pH of the sample to $pH_{n+2}$, and the like, until the target pH is achieved.

The term "sample" refers to a sample subjected to the methods described herein to change its pH. In some cases the sample comprises a protein, for example a purified, or partially purified protein in a liquid solution. However, other types of samples are contemplated within the scope of the instant disclosure, and include DNA, RNA, and drugs. The person of ordinary skill in the art will appreciate that, as used herein, a sample refers to a liquid solution, for example a liquid solution comprising a plurality of biological molecules (DNA, RNA, or proteins), or analytes (compounds, drugs and the like). Samples may be at any suitable concentration, or initial pH, and include any suitable buffer or carrier.

The term "reference sample" refers to reference sample with properties similar or identical to the sample, that has been subjected to pH changes similar to those of the sample, from which the data regarding pH and titrant addition, and the relationship between the two, has been collected. The reference sample can be identical to the sample, for example the reference sample taken from a larger sample (i.e., a subsample as the reference sample). However, the reference sample need not be identical to the sample if it behaves similarly to the sample when titrant is added. For example, the sample and the reference sample can be different batches of the same protein produced and purified by the same or similar process. As a further example, the sample and the reference sample can be similar but not identical proteins, such as two antibodies, or two proteins with similar glycosylation patterns, that behave similarly when undergoing similar titration process.

As used herein, the term "titration curve" refers to a graph (or series of measurements) relating the volume of titrant added to a sample as the independent variable to the pH of the solution as the dependent variable. Titration curves can be generated by continuous measurements, for example by inserting a pH probe directly into a sample and taking continuous measurements. Alternatively, titration curves can be generated from discontinuous measurements, followed by fitting an appropriate curve to the measured data points.

As used herein "normalize" refers to adjusting values measured on different scales to a common scale.

As used herein, "titrant" refers to a solution of known pH, and preferably known concentration, that is added (titrated) to another solution to change the pH of that solution.

An "acid titrant" refers to a titrant with a pH that is more acidic than the sample. Generally, acid titrants will have a pH of less than 7.0. Common acid titrants include phosphoric acid ($H_3PO_4$), glycine hydrochloride ($C_2H_6ClNO_2$), acetic acid ($CH_3COOH$), hydrochloric acid (HCl), perchloric acid ($HClO_4$), and sulfuric acid ($H_2SO_4$). Acid titrant solutions can be prepared by diluting a commercially available concentrated stock solution, and determining the concentration by standardizing against a standard weak base. Exemplary acid titrants include phosphoric acid at a concentration of between 0.20 M to 2.0 M, between 0.25 M to 1.5M or between 0.5 M to 1.0 M. For example, phosphoric acid at a concentration of 0.10 M, 0.20 M, 0.25 M, 0.30 M, 0.35 M, 0.40 M, 0.45 M, 0.50 M, 0.60 M, 0.70 M, 0.80 M, 0.90 M, 1.0 M, 1.1 M, 1.2 M, 1.3 M, 1.4 M, 1.5 M, 1.6 M, 1.7 M, 1.8 M, 1.9 M or 2.0 M can be used as the acid titrant. Further exemplary acid titrants include glycine HCl at a concentration of between 0.1 M and 1.0 M, between 0.2 M and 0.75 M, between 0.25 M and 0.75 M or between 0.25 M and 0.5 M. For example, glycine HCl at a concentration of 0.10 M, 0.20 M, 0.25 M, 0.30 M, 0.35 M, 0.40 M, 0.45 M, 0.50 M, 0.60 M, 0.70 M, 0.80 M, 0.90 M, or 1.0 M is the acid titrant. Further exemplary acid titrants include acetic acid at a concentration of between 0.5 M to 3.0 M, 1.0 M to 2.5 M, 1.0 M to 2.0 M or 1.5 M to 2.0 M. For example, acetic acid at a concentration of 0.50 M, 0.60 M, 0.70 M, 0.80 M, 0.90 M, 1.0 M, 1.1 M, 1.2 M, 1.3 M, 1.4M, 1.5 M, 1.6M, 1.7M, 1.8 M, 1.9 M, 2.0 M, 2.1 M, 2.2 M, 2.3 M, 2.4 M, 2.5 M, 2.6 M, 2.7 M, 2.8 M, 2.9 M or 3.0 M is the acid titrant.

A "base titrant" or "basic titrant" refers to titrant with a pH that is more basic than the sample. Common base titrants include sodium hydroxide (NaOH), which is commercially available both as an impure solid and as an approximately 50% w/v solution. Solutions of NaOH can be standardized against a weak acid standard to determine concentration. Additional common base titrants include tromethamine (also called Tris(hydroxymethyl)aminomethane, tris base, with a formula of $C_4H_{11}NO_3$). An exemplary base titrant includes tromethamine at a concentration of between 0.5 M to 3.0 M, 1.0 M to 2.5 M, 1.0 M to 2.0 M or 1.5 M to 2.0 M. For example, tromethamine at a concentration of 0.50 M, 0.60 M, 0.70 M, 0.80 M, 0.90 M, 1.0 M, 1.1 M, 1.2 M, 1.3 M, 1.4M, 1.5 M, 1.6M, 1.7M, 1.8 M, 1.9 M, 2.0 M, 2.1 M, 2.2 M, 2.3 M, 2.4 M, 2.5 M, 2.6 M, 2.7 M, 2.8 M, 2.9 M or 3.0 M is the base titrant.

A pH meter measures the hydrogen-ion activity in water-based solutions, indicating its acidity or alkalinity expressed as pH. The pH meter measures the difference in electrical potential between a pH electrode and a reference electrode. A pH "probe" refers to the part of the meter containing the pH electrode and the reference electrode. Typically, pH electrodes are glass electrodes, which are a type of ion-selective electrode made of a doped glass membrane that is sensitive to a specific ion. An exemplary pH electrode is a glass electrode that is sensitive to hydrogen ions. The voltage of the glass electrode, relative to some reference value (i.e. from the reference electrode), is sensitive to changes in the activity of the hydrogen ions. In other words, the hydrogen ion activity in the measured solution influences the electrochemical potential between the reference electrode and the hydrogen ion sensitive electrode. The pH meter is calibrated to correlate an electrochemical potential with a pH value.

"pH meter calibration" refers to a process of calibrating the pH meter against one or more standardized buffers of known pH, as pH electrodes are known to drift from their calibrated settings. Typical calibration processes use a calibration curve generated by at least three standard buffers, although two point calibration can also be used. An exemplary calibration protocol comprises cleaning the electrode, submerging the rinsed electrode in a first standard at pH 4.0, then a second standard at pH 7.0 and a final standard at pH 10.0, cleaning the electrodes between measurements.

A "slipstream" or "slip stream" as used herein refers to a sampling method where a subsample is drawn off, or isolated, from a main sample, for example using a tube inserted into the main sample, and measurements are performed upon the subsample. A slipstream can be continuous, i.e. constantly drawing from the sample, or discontinuous, drawing from the sample only at discrete timepoints during a process.

As used herein "online probe" or "online pH probe" refers to a probe that measures the pH of the sample during pH changes (online pH), and the information from which is used, in conjunction with the models described herein, to determine the amount of titrant to be added to the sample during titrant addition steps. The online probe can be a slipstream probe, for example installed in a flow cell coupled to a slipstream. Alternatively, the online probe may be inserted directly into the reactor.

As used herein "peptide", "polypeptide" and "protein" are used interchangeably throughout and refer to a molecule comprising two or more amino acid residues joined to each other by a peptide bond. Peptides, polypeptides and proteins may also include modifications such as glycosylation, lipid attachment, sulfation, gamma-carboxylation of glutamic acid residues, alkylation, hydroxylation and ADP-ribosylation. Peptides, polypeptides, and proteins can be of scientific or commercial interest, including protein-based drugs (biotherapeutics). Peptides, polypeptides, and proteins include, among other things, antibodies and chimeric or fusion proteins. Peptides, polypeptides, and proteins can be produced by recombinant animal cell lines such as mammalian cell lines using cell culture methods.

The phrase "viral reduction/inactivation", as used herein, is intended to refer to a decrease in the number of viral particles in a particular sample ("reduction"), as well as a decrease in the activity, for example, but not limited to, the infectivity or ability to replicate, of viral particles in a particular sample ("inactivation"). Such decreases in the number and/or activity of viral particles can be on the order of about 50% to about 99%, even more preferably of about 60% to about 99%, yet more preferably of about 70% to about 99%, yet more preferably of about 80% to 99%, yet more preferably of about 90% to about 99%, yet more preferably of about 95% to 99%, yet more preferably of about 95% to 99.9%, yet more preferably of about 95% to 99.99%, and yet more preferably of about 98% to 99.99%. In certain non-limiting embodiments, the amount of virus, if any, in the purified antibody product is less than the ID50 (the amount of virus that will infect 50 percent of a target population) for that virus, preferably at least 10-fold less than the ID50 for that virus, more preferably at least 100-fold less than the ID50 for that virus, and still more preferably at least 1000-fold less than the ID50 for that virus.

All publications and patents mentioned herein are hereby incorporated by reference in their entirety as if each individual publication or patent was specifically and individually indicated to be incorporated by reference. In case of conflict, the present application, including any definitions herein, will control. However, mention of any reference, article, publication, patent, patent publication, and patent application cited herein is not, and should not be taken as an acknowledgment, or any form of suggestion, that they constitute valid prior art or form part of the common general knowledge in any country in the world.

pH Meter Calibration

The methods described herein can be used to determine if there have been errors in pH meter calibration or function of a pH meter used when changing the pH of a sample. The methods described herein can be used to confirm the accuracy of a pH meter, thereby increasing the reliability of methods of changing the pH of a sample.

Alternatively, if errors in pH meter calibration or function are detected, the process of adding titrant to a sample to change its pH can be halted until the pH meter error is resolved, thereby increasing the accuracy of the process and preventing damage to the sample. When the sample is a protein, pH changes outside those tolerated by the protein can lead to protein denaturation, potentially destroying the sample. Thus, the ability to rapidly and reliably identify pH meter calibration errors is an advantage of the methods disclosed herein compared to other methods known in the art. For example, if an error in pH meter calibration is detected, the pH meter can be recalibrated, swapped for a new one, or measurements taken from the inaccurate pH meter can be corrected for mathematically using measurements taken from a second pH meter.

In some embodiments, correcting the pH meter comprises sending a signal to an operator indicating that a pH probe is faulty. In some embodiments, correcting the pH meter comprises halting the addition of titrant to a sample when the error is detected. For example, when a measured the pH of the sample differs from the pH predicted by the model when the corresponding amount of titrant is added, a signal is sent to the operator, and/or the process of adding titrant to the sample is halted until the error is corrected by the operator. In some embodiments, when the measured pH of the sample differs from the pH predicted by the model by >0.01 pH units, >0.02 pH units, >0.03 pH units, >0.04 pH units, >0.05 pH units, >0.06 pH units, >0.07 pH units, >0.08 pH units, >0.09 pH units or >0.10 pH units a signal is sent to the operator, and/or the process of adding titrant to the sample is halted. In some embodiments, when the measured pH of the sample differs from the pH predicted by the model by >0.01 pH units a signal is sent to the operator, and/or the process of adding titrant to the sample is halted. In some embodiments, when the measured pH of the sample differs from the pH predicted by the model by >0.05 pH units a signal is sent to the operator, and/or the process of adding titrant to the sample is halted. In some embodiments, when the measured pH of the sample differs from the pH predicted by the model by >0.10 pH units a signal is sent to the operator, and/or the process of adding titrant to the sample is halted.

In some embodiments, the correcting the pH meter following detection of an error comprises recalibrating the pH meter. In some embodiments, correcting the pH meter comprises replacing the pH meter or the pH probe. In some embodiments, correcting the pH meter comprises measuring sample pH with a second, independently calibrated pH meter, comparing the measurements between pH meter and the second pH meter to determine the amount by which the measurements of the pH meter differ from the second pH meter, and applying said difference to the measurements from the pH meter to determine an accurate pH.

In some embodiments, following correction of the pH meter, the methods further comprise adding an additional amount of titrant to the sample and measuring an additional pH; applying the model and comparing the normalized titrant, and pH, to the model; and continuing the process of adding titrant to the sample to change the pH of the sample when the measured pH of the sample corresponds to the pH predicted by the model.

In some embodiments, following correction of the pH meter, the methods further comprise adding an additional amount of titrant to the sample and measuring an additional pH; applying the model and comparing the normalized titrant, and pH, to the model; and adding the remaining amount of titrant to the sample to reach $pH_{final}$ when the measured pH corresponds to the model.

In some embodiments, a difference between a measured sample pH and the model identifies an error in calibration of a pH meter used to measure sample pH. In some embodiments, a difference of the measured pH and the pH as predicted by the model that is >0.01 pH units, >0.02 pH units, >0.03 pH units, >0.04 pH units, >0.05 pH units, >0.06 pH units, >0.07 pH units, >0.08 pH units, >0.09 pH units or >0.10 pH units is indicative of an error associated with the pH meter, such as a calibration error. In some embodiments, a difference of >0.05 pH units is indicative of a pH meter error.

In some embodiments, correspondence between a measured pH value and a value predicted by the model indicates that the pH meter is functioning correctly. This correspondence can be with the pH meter as originally calibrated, i.e. no correction required, or determined following correction of the pH meter, i.e. indicating the corrected pH meter is functioning properly. In some embodiments, a difference of the measured pH and the pH as predicted by the model that is ≤0.01 pH units, ≤0.02 pH units, ≤0.03 pH units, ≤0.04 pH units, ≤0.05 pH units, ≤0.06 pH units, ≤0.07 pH units, ≤0.08 pH units, ≤0.09 pH units or ≤0.10 pH units is indicative of correspondence between the measured and predicted pH values, and that the pH meter is functioning properly. In some embodiments, a difference of the measured pH and the pH as predicted by the model that is ≤0.01 pH units is indicative of correspondence between the measured and predicted pH values, and that the pH meter is functioning properly. In some embodiments, a difference of the measured pH and the pH as predicted by the model that is ≤0.05 pH units is indicative of correspondence between the measured and predicted pH values, and that the pH meter is functioning properly.

In some embodiments, the methods further comprise correcting for a known, quantifiable error in pH meter calibration when determining pH values of the sample, or pH values of the at least one reference sample used to generate the model, in the methods described herein. pH meter calibration, when the error in calibration is consistent and quantifiable across the range of pH values being assayed while changing sample pH, can be corrected for mathematically using independent offline pH measurements. For example, measurements taken by an independent pH meter, using subsamples pulled from the sample.

In some embodiments, correcting for pH meter calibration comprises: (a) removing a first portion of the sample or reference sample prior to the addition of titrant, and measuring the pH of said first portion with an independently calibrated pH meter thereby generating an offline initial pH value ($pH_{initial\_off}$); (b) removing a second portion of the sample or reference sample after the addition of the total amount of titrant and measuring the pH of said second portion with an independently calibrated pH meter thereby generating an offline final pH value ($pH_{final\_off}$); and (c) applying the relationship between the offline pH value and measured pH value to determine a corrected pH for the reference sample. The independently calibrated pH meter may be the same pH meter as was used to take the initial measurements, after a further round of calibration. Alternatively, the independently calibrated pH meter may be a different pH meter.

The offline measurement may be used to calculate a corrected pH according to the following formula, wherein a corrected pH for the sample (or reference sample) is determined by:

$$pH_{initial\_off} + (pH_{final\_off} - pH_{initial\_off}) \times \left( \frac{pH_n - pH_{initial}}{pH_{final} - pH_{initial}} \right). \quad \text{(Equation 16)}$$

Here, $pH_{initial\_off}$ is the initial pH of the sample measured by the offline pH meter, $pH_{final\_off}$ is the final pH of the sample measured by the offline pH meter, $pH_{initial}$ and $pH_{final}$ are the initial and final pH values as measured by the online pH meter (the meter with the calibration error), and $pH_n$ is the uncorrected pH measurement from the uncorrected pH meter.

If the pH meter being corrected for was used to make measurements of the reference sample, the same relationship between corrected and uncorrected pH holds as described supra for the sample in some embodiments of the methods described herein. In these embodiments, when correcting for pH meter calibration of the reference sample, the methods comprise (a) removing a first portion of the reference sample prior to the addition of titrant, and measuring the pH of said first portion with an independently calibrated pH meter thereby generating an offline initial pH value ($pH_{initial\_off\_ref}$); (b) removing a second portion of the reference sample after the addition of the total amount of titrant and measuring the pH of said second portion with an independently calibrated pH meter thereby generating an offline final pH value ($pH_{final\_off\_ref}$); and (c) applying the relationship between the offline pH value and measured pH value to determine a corrected pH for the reference sample. In some embodiments, a corrected $pH_{n\_ref}$ for the reference sample is determined by:

$$pH_{initial\_off\_ref} + (pH_{final\_off\_ref} - pH_{initial\_off\_ref}) \times \left( \frac{pH_{n\_ref} - pH_{initial\_ref}}{pH_{final\_ref} - pH_{initial\_ref}} \right). \quad \text{(Equation 22)}$$

Here, $pH_{initial\_off\_ref}$ is the initial pH of the reference sample measured by the offline pH meter, $pH_{final\_off\_ref}$ is the final pH of the reference sample measured by the offline pH meter, $pH_{initial\_ref}$ and $pH_{final\_ref}$ are the initial and final pH values of the reference sample as measured by the online pH meter (the meter with the calibration error), and $pH_{n\_ref}$ is the uncorrected pH measurement from the uncorrected pH meter.

Errors in pH meter calibration may be detected at the outset of processes for changing the pH of a sample, for example by comparing the initial pH value of the sample to an initial pH of a reference sample expected to behave the same, or substantially the same, as the sample. If the sample and the reference sample are substantially the same, and subjected to the same conditions, then if the initial pH of the two differs, for example by >0.05 pH units, >0.06 pH units, >0.07 pH units, >0.08 pH units, >0.09 pH units, >0.10 pH units, >0.20 pH units, >0.30 pH units, >0.40 pH units, >0.50 pH units, >0.60 pH units or >0.70 pH units then an error in pH meter calibration may be suspected. In some embodiments, the methods further comprise, prior to the addition of titrant, comparing $pH_{initial}$ to a $pH_{initial}$ previously measured for at least one reference sample, and correcting the pH meter when the difference between $pH_{initial}$ and the previously measured $pH_{initial}$ indicates a calibration error in the pH meter. In some cases, a statistical titration model, i.e. a model based on historical titration data of similar, or substantially similar samples, may be used. The statistical titration model predicts the pH (or change in pH) that results from the addition of a pre-determined amount of titrant to the sample. Thus, the statistical model can be used to verify, after the first titrant addition, that the change in pH of the sample is within the bounds of expected values. The statistical model can also be used to evaluate whether the initial pH is within normal limits. In some embodiments, the methods comprise comparing the $pH_{initial}$ from the sample to a $pH_{initial}$ value predicted by a statistical titration model, and correcting the pH meter when the difference between $pH_{initial}$ and the $pH_{initial}$ predicted by the statistical titration model indicates a calibration error in the pH meter.

Changing Sample pH

The disclosure provides methods of detecting errors in pH meter calibration when changing the pH of a sample. In some embodiments, the methods comprise correcting a pH meter used to measure the pH of the sample when a measurement taken by the pH meter differs from a measurement predicted by a model. In some embodiments, the methods comprise taking an initial pH measurement of the sample, adding a first amount of titrant to the sample, measuring a first additional pH value, and applying a model to that relates sample pH to a normalized amount of titrant added to the sample, adding a second amount of titrant to the sample and measuring a second additional pH value, applying the model, and correcting a pH meter used to measure the pH of the sample when a difference between the second pH measurement and the second pH measurement predicted by the model indicates a calibration error in the pH meter. In some embodiments, the methods further comprise adding a third or further amount of titrant to the sample and measuring a third or further pH value, and applying the model after each addition of titrant. In some embodiments, the methods further comprise adding a fourth, or further amounts of titrant, measuring pH after each addition, and applying the model. Additional titrant steps can confirm errors in pH meter calibration, or if they occur after correcting the pH meter, verify the accuracy of subsequent pH measurements. Additional steps of adding conservative amounts of titrant, and checking pH, can also be used to verify that the sample is behaving as predicted by the model, and that there are no additional errors in the process. After the two or more titrant additions to a sample and corresponding measurements are used to validate the pH meter, these measurements and the model can be used to determine the amount the titrant to be added to the sample to change the pH of the sample to a final, or target pH.

By adding discrete, conservative amounts of titrant, measuring the resulting pH change, and applying the models described herein to determine if the actual pH changes correlate with those predicted by the model, the methods of the disclosure can validate the accuracy of a pH meter without removing the pH meter from the sample, or relying on measurements of a second pH meter to confirm accuracy. As an example of an application of the methods described herein, the initial pH of the sample is 4.30, and target pH is 3.60, then the pH of the sample after the first acid titrant addition can be about 4.0, i.e. between 4.3 and 3.6. A second amount of titrant to add to the sample to reach a second intermediate pH, for example 3.80, is calculated using the model and the measured pH and normalized titrant vales. After addition of the second predetermined amount of titrant, a second intermediate pH is determined, and the correspondence between the measured pH and the intermediate target of 3.80 is determined. If the two values correspond, then the pH sequence continues. If the two values do not correspond, then appropriate corrective action, such as recalibrating the pH meter, is taken. The methods described herein thus improve the accuracy and reliability of pH measurements when changing the pH of a sample, reduce sample waste, and increase the efficiency of processes used to change sample pH.

Further, the methods of the disclosure can be achieved using a relatively small number of discrete measurements and the model to determine the amount of titrant to add to a sample to change the pH. By using the model, the methods can improve the accuracy of by which the final pH of the sample is reached, when compared to methods that measure pH by inserting a pH probe into the sample. Differences between the measured pH values and the model can also be used to identify errors in the processes, for example errors in pH meter calibration or function.

In some embodiments, pH of a sample is changed by the addition of multiple amounts of titrant. In some embodiments, pH of a sample is changed by the 1, 2, 3, 4, 5, 6, 7, 8, 9 or 10 additions of titrant to reach the final pH. In some embodiments, pH of a sample is changed by 2 additions of titrant to reach the final pH. In some embodiments, pH of a sample is changed by 3 additions of titrant to reach the final pH. In some embodiments, pH of a sample is changed by 4 additions of titrant to reach the final pH. In some embodiments, pH of a sample is changed by 5 additions of titrant to reach the final pH. In some embodiments, pH of the sample is changed to a pH value within 0.01 to 0.20, 0.01 to 0.15, 0.01 to 0.10, 0.05 to 0.20, 0.05 to 0.15, 0.05 to 0.10, 0.01 to 0.07 or 0.05 to 0.07 pH units of a final pH, followed by a final addition of titrant to reach the final pH. In some embodiments, pH of the sample is changed to a pH value with 0.05 to 0.10 pH units of a final pH, followed by a final addition of titrant to reach the final pH. As an example, the pH of the sample can changed to a target pH that is within 0.05 to 0.10 pH units of a final pH by the addition of 1, 2, 3, 4, or 5 additions of titrant, followed by final addition of titrant to reach the final pH. In some embodiments, for example those embodiments where the pH of the sample is being lowered, the titrant is an acid. In alternative embodiments, for example those embodiments where the pH of the sample is being raised, the titrant is a base. A mismatch of target pH predicted by the models described herein and the measured pH at any of the addition steps described herein can indicate that the pH meter used to make the measurements has a calibration error. For example, if the predicted and measured pH values for a given addition step differ by more than 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, or more pH units, it indicates that the pH meter used to measure the sample is giving an erroneous reading. As a further example, if the predicted and measured pH values for a given addition step differ by more than 0.03, 0.04, 0.05, 0.06, 0.07, 0.08, 0.09 or 0.10 pH units, it indicates that the pH meter used to measure the sample is giving an erroneous reading. In some embodiments, the methods comprise stopping the process to change the pH of the sample when a difference between the predicted and measured pH values occurs until the pH meter is recalibrated or the pH probe is replaced.

The methods of the disclosure can be used any time changing the pH of a sample is required. For example, if a process, such as protein purification, produces a liquid sample comprising the protein of interest (sometimes referred to as the protein pool) with a pH unsuited for downstream purification steps or applications, the methods described herein can be used to change the pH of the sample to the desired pH. As a further example, the methods of the disclosure can be used to lower the pH of a protein sample to a pH low enough to inactivate viruses potentially contaminating the protein sample, and then raise the pH to a neutral pH for further protein purification and analysis processes.

In some embodiments, the sample comprises a protein of interest, for example a therapeutic protein, and the methods are used to confirm the accuracy of, or correct, a pH meter used while changing the pH of the sample thereby inactivating a virus in the sample.

Methods of pH viral inactivation include, but are not limited to, incubating the mixture for a period of time at low pH, and subsequently neutralizing the pH and removing particulates by filtration. In some embodiments, the pH of the sample is lowered to a pH of between about 2 and 5, preferably at a pH of between about 3 and 4, and more preferably at a pH of about 3.6, and the sample is incubated at this pH to inactivate any viruses present. The pH of the sample mixture may be lowered by any suitable acid including, but not limited to, phosphoric acid, glycine hydrochloride, perchloric acid, hydrochloric acid, citric acid, acetic acid, caprylic acid, or other suitable acids. The choice of pH level largely depends on the stability profile of the protein in the sample, and buffer components.

In an exemplary method to inactivate a virus in a sample, a conservative initial amount of acid titrant is added, pH is assessed, and then an additional conservative amount of acid titrant is added, followed by another pH assessment. This can be repeated using small amounts of acid until a target pH is achieved, in a process that can take between 30 minutes and 2 hours. The sample is held at the target the target pH for a period of time sufficient to inactivate the virus, and the sample pH is raised by the same process described supra.

In some embodiments the duration of the low pH incubation period that inactivates the virus will be from 0.5 hours to 2 hours, or 0.5 hours to 1.5 hours, or 0.5 hours to 1 hour. In some embodiments, the low pH incubation is about 20 minutes, about 30 minutes, about 40 minutes, about 50 minutes, about 60 minutes, about 70 minutes, about 80 minutes, or about 90 minutes. Thus, the skilled artisan, depending on the protein of interest, will be able to select the appropriate protein concentration, pH, and duration time to achieve viral inactivation.

In some embodiments, changing the pH of the sample comprising the protein of interest involves lowering the pH of the sample. The methods described herein are used to confirm the accuracy of, or correct, a pH meter used to measure the pH of the sample while lowering the pH of the sample through the addition of an acid titrant. For example, the final pH of the sample ($pH_{final}$) is less than the initial pH of the sample ($pH_{initial}$), and the titrant is an acid. Any suitable acidic solution may be used, as long as the pH of the titrant is less than the initial pH of the sample.

In some embodiments, for example those embodiments where the pH is being lowered, the initial pH of the sample ($pH_{initial}$) is between about 4.0 and 4.7, between about 4.0 and 4.5, between about 4.0 and 4.3, between about 4.1 and 4.6, between about 4.1 and 4.5, between about 4.1 and 4.4, between about 4.1 and 4.3, between about 4.1 and 4.2, between about 4.2 and 4.5, between about 4.3 and 4.5, between about 4.1 and 4.4 or between about 4.2 and 4.4. In some embodiments, $pH_{initial}$ is between about 4.0 to 4.5, between about 4.1 and 4.5, between about 4.2 and 4.5, between about 4.3 and 4.5, between about 4.1 and 4.4 or between about 4.2 and 4.4. In some embodiments, the initial pH is about 4.1. In some embodiments, the final pH of the sample is between about 3.0 and 3.8, between about 2.0 and 3.7, between about 3.0 and 3.6, between about 3.0 and 3.5, between about 3.0 and 3.4, between about 3.0 and 3.3, between about 3.1 and 3.8, between about 3.3 and 3.8, between about 3.5 and 3.8, between about 3.2 and 3.8, between about 3.3 and 3.7, between about 3.4 and 4.0, between about 3.5 and 4.0, 3.4 and 3.9, between about 3.4 and 3.8, between about 3.4 and 3.7, between about 3.4 and 3.6, between about 3.5 and 3.9, between about 3.5 and 3.8, between about 3.5 and 3.7, or between about 3.5 and 3.6. In some embodiments, the final pH is between about 3.5 and 3.7. In some embodiments, $pH_{final}$ is between about 3.0 and 3.8, between about 3.1 and 3.8, between about 3.2 and 3.8, between about 3.3 and 3.7, between about 3.4 and 3.7 or between about 3.5 and 3.7. In some embodiments, the final pH is about 3.6.

In some embodiments, changing the pH of the sample comprising the protein of interest involves raising the pH of the sample. The methods described herein are used to confirm the accuracy of, or correct, a pH meter used to measure the pH of the sample while raising the pH through the addition of a basic titrant. For example, the final pH of the sample ($pH_{final}$) is greater than the initial pH of the sample ($pH_{initial}$), and the titrant is a base. Any suitable basic solution may be used, as long as the pH of the titrant is more than the initial pH of the sample.

In some embodiments, for example those embodiments where the pH is being raised, the initial pH of the sample ($pH_{initial}$) is between about 3.0 and 3.8, between about 2.0 and 3.7, between about 3.0 and 3.6, between about 3.0 and 3.5, between about 3.0 and 3.4, between about 3.0 and 3.3, between about 3.1 and 3.8, between about 3.3 and 3.8, between about 3.5 and 3.8, between about 3.2 and 3.8, between about 3.3 and 3.7, between about 3.4 and 4.0, between about 3.5 and 4.0, 3.4 and 3.9, between about 3.4 and 3.8, between about 3.4 and 3.7, between about 3.4 and 3.6, between about 3.5 and 3.9, between about 3.5 and 3.8, between about 3.5 and 3.7, or between about 3.5 and 3.6. In some embodiments, $pH_{final}$ is between about 3.0 and 3.8, between about 3.1 and 3.8, between about 3.2 and 3.8, between about 3.3 and 3.7, between about 3.4 and 3.7 or between about 3.5 and 3.7. In some embodiments, $pH_{initial}$ is between about 3.0 and 3.8, between about 3.1 and 3.8, between about 3.2 and 3.8, between about 3.3 and 3.7, between about 3.4 and 3.7 or between about 3.5 and 3.7. In some embodiments, the initial pH is between about 3.1 and 3.8. In some embodiments, the initial pH is between about 3.3 and 3.8. In some embodiments, the initial pH is between about 3.5 and 3.7. In some embodiments, the initial pH is about 3.6. In some embodiments, the final pH ($pH_{final}$) is 5.1 and 8.5, between about 5.1 and 8.3, between about 5.1 and 8.1, between about 5.1 and 8.0, between about 5.1 and 7.7, between about 5.1 and 7.5, between about 5.1 and 7.3, between about 5.1 and 7.0, between about 5.3 and 8.5, between about 5.3 and 8.3, between about 5.3 and 8.1, between about 5.3 and 8.0, between about 5.3 and 7.7, between about 5.3 and 7.5, between about 5.3 and 7.3, between about 5.3 and 7.0, between about 5.5 and 8.5, between about 5.5 and 8.3, between about 5.5 and 8.1, between about 5.5 and 8.0, between about 5.5 and 7.7, between about 5.5 and 7.0, between about 6.0 and 8.5, between about 6.0 and 8.3, between about 6.0 and 8.0, between about 6.0 and 7.7, between about 6.0 and 7.0, between about 6.5 and 8.5, between about 6.5 and 8.3, between about 6.5 and 8.0, between about 6.5 and 7.7, between about 6.5 and 7.0, between about 7.0 and 8.5, between about 7.0 and 8.3, between about 7.5 and 8.0, between about 7.7 and 8.0, between about 7.7 and 8.5, between about 7.7 and 8.3, between about 7.9 and 8.2, between about 7.0 and 8.0, between about 7.0 and 7.9, between about 7.0 and 7.5, between about 6.8 and 7.8, between about 6.8 and 7.6, or between about 6.8 and 7.4. In some embodiments, $pH_{final}$ is between about 5.3 and 8.5, between about 5.1 and 8.1, between about 5.5 and 8.0, or between about 7.5 and 8.0. In some embodiments, the final pH is between about 5.5 and 8.0. In some embodiments, the final pH is between about 7.0 and 8.0.

The disclosure provides methods of determining the accuracy of, and optionally correcting, a pH meter when inactivating a virus in a sample. In some embodiments, the methods comprise providing a sample comprising a protein of interest, for example a sample that has been purified from cultured cells via column chromatography, and lowering the pH. An exemplary sample may have an initial pH of about 4.1 to 4.5, and the final pH is about 3.5 to 3.7, optionally about 3.6. The initial pH will depend on the protein of interest, the purification methods used, and the composition of the sample after protein purification steps (e.g., elution buffers and the like). Following the reduction in pH and a hold for a period of time to inactivate the virus, the pH is then raised to a final basic pH of between about 7.5 and 8.5, or about 7.5 and 8.0, or about 7.6. the final basic pH will depend on the protein of interest, and the choice of buffers and the like, which will depend on the desired downstream applications. The methods of determining the accuracy of a pH meter described herein can be used lowering the pH of the sample, when raising the pH of the sample, or for both.

Accordingly, the disclosure provides methods of inactivating a virus in a sample. In some embodiments, the sample comprises a protein of interest. In some embodiments, the methods comprise providing a sample at an initial pH ($pH_{initial}$) of 4.0 or greater, for example 4.1, 4.2, 4.3, 4.4 or 4.5. In some embodiments, the methods comprise measuring the initial pH before the addition of acid titrant. In some embodiments, the methods comprise adding a first amount of acid titrant ($Titrant_{n\_acid}$) to the sample and measuring a first additional acid pH value ($pH_{n\_acid}$), $Titrant_{n\_acid}$ being the amount of acid titrant added to the sample to reach $pH_{n\_acid}$, wherein the $pH_{n\_acid}$ is different from the $pH_{initial}$. The first amount of titrant is commonly a conservative amount of titrant. For example, the first amount of titrant is an amount of titrant predicted based on previous reference samples to be sufficient to change the pH of the sample by no more than the halfway point to the target, or final pH, or no more than two-thirds of the way to the target pH or no more than three-quarters of the way to the target pH. The skilled artisan will appreciate that the amounts of acid titrant at each addition can be adjusted depending on the sample, the initial pH of the sample, the final target pH, and the number of additions of acid titrant to be added to the sample to change the sample pH. In some embodiments, the methods comprise applying a first model to determine normalized titrant, i.e. the normalized amount of titrant corresponding to the initial pH and the pH after the addition of the first amount of acid titrant, wherein the first model relates normalized titrant to the pH of the sample. After the addition of the first amount of titrant, the first model can be used to determine a second amount of titrant required to reach a pH between $pH_n$ acid and the final acid pH ($pH_{acid\_final}$), termed here $pH_{n+1\_acid}$. In some embodiments, the methods comprise adding the second amount of acid titrant ($Titrant_{n+1\_acid}$) to the sample and measuring the second additional acid pH value ($pH_{n+1\_acid}$), $Titrant_{n+1\_acid}$ being the amount of acid titrant added to the sample to reach $pH_{n+1\_acid}$, wherein the $pH_{n+1\_acid}$ is different from $pH_{n\_acid}$. In some embodiments, the methods comprise measuring the pH of the sample after the addition of the second amount of titrant to determine $pH_{n+1\_acid}$ as measured, and comparing $pH_{n+1\_acid}$ as measured to $pH_{n+1\_acid}$ as predicted by the first model. In some embodiments, the methods comprise correcting a pH meter used to measure the pH of the sample when a difference between $pH_{n+1\_acid}$ as measured and $pH_{n+1}$ from the first model indicates a calibration error in the pH meter. In some embodiments, the difference between $pH_{n+1\_acid}$ and the first model is >0.01 pH units, >0.02 pH units, >0.03 pH units, >0.04 pH units, >0.05 pH units, >0.06 pH units, >0.07 pH units, >0.08 pH units, >0.09 pH units or >0.10 pH units. In some embodiments, the difference between $pH_{n+1\_acid}$ as measured and $pH_{n+1}$ from the first model is >0.05 pH units. Optionally, adding an amount of titrant can be repeated at least once, twice, three times, four times, five times, or more, to confirm that the behavior of the sample corresponds to the model and the pH meter, if corrected, now behaves as predicted by the first model. If the sample does not conform to the model after the addition of the second amount of titrant, or a pH meter calibration error is suspected, the skilled artisan can decrease the amount of titrant added, and increase the number of times titrant is added, in order to more accurately measure pH and during the process and avoid going past the target pH.

In some embodiments, the methods comprise determining a remaining amount of titrant to be added to the sample to reach a final acid pH ($pH_{acid\_final}$) of between 3.1 and 3.8 based on the normalized titrant, pH, and the first model. In some embodiments, the methods comprise adding the remaining amount of titrant to the sample to reach $pH_{acid\_final}$. In some embodiments, the methods comprise holding the sample at $pH_{final\_acid}$ for a period of time sufficient to inactivate the virus, for example an incubation time as described supra.

Accordingly, the disclosure provides methods of raising the pH of a sample, for example following viral inactivation as described supra. In some embodiments, the sample comprises a protein of interest. In some embodiments, the methods comprise providing a sample at an initial pH ($pH_{initial\_base}$) of 3.1 to 3.8. For example, $pH_{initial\_base}$ can be the same as $pH_{acid\_final}$ when inactivating a virus, described supra. In some embodiments, the methods comprise measuring the initial pH before the addition of base titrant. In some embodiments, the methods comprise adding a first amount of basic titrant ($Titrant_{n\_base}$) to the sample and measuring a first additional base pH value ($pH_{n\_base}$), $Titrant_{n\_base}$ being the amount of titrant added to the sample to reach $pH_{n\_base}$, wherein $pH_{n\_base}$ is different from the $pH_{initial\_base}$. The amount of base titrant added to the sample is commonly a conservative amount of titrant, i.e. an amount of titrant predicted based on previous reference samples to be sufficient to change the pH of the sample by no more than the halfway point to the target basic pH, or no more than two-thirds, or no more than three-quarters of the way to the target basic pH. The skilled artisan will appreciate that the amounts of base titrant added to the sample at each addition can be adjusted depending on the sample, the initial pH the sample, the final target pH, and the number of additions of base titrant to be added to the sample to change the sample pH. In some embodiments, the methods comprise applying a second model to determine normalized titrant, i.e. the normalized amount of titrant corresponding to the initial pH and the pH after the addition of the first amount of base titrant, wherein the second model relates normalized titrant to the pH of the sample. After the addition of the first amount of base titrant, the second model can be used to determine a second amount of base titrant required to reach a pH between $pH_n$ base and the final base pH ($pH_{final\_base}$), termed here $pH_{n+1\_base}$. In some embodiments, the methods comprise adding the second amount of base titrant ($Titrant_{n+1\_base}$) to the sample and measuring the second additional base pH value ($pH_{n+1\_base}$), $Titrant_{n+1\_base}$ being the amount of base titrant added to the sample to reach $pH_{n+1\_base}$, wherein the $pH_{n+1\_base}$ is different from $pH_n$ base. In some embodiments, the methods comprise measuring the pH of the sample after the addition of the second amount of titrant to determine $pH_{n+1\_base}$ as measured, and comparing $pH_{n+1\_base}$ as measured to $pH_{n+1\_base}$ as predicted by the second model. In some embodiments, the methods comprise correcting a pH meter used to measure the pH of the sample when a difference between $pH_{n+1\_base}$ as measured and $pH_{n+1\_base}$ from the second model indicates a calibration error in the pH meter. In some embodiments, the difference between $pH_{n+1}$-base as measured and $pH_{n+1\_base}$ from the second model is >0.01 pH units, >0.02 pH units, >0.03 pH units, >0.04 pH units, >0.05 pH units, >0.06 pH units, >0.07 pH units, >0.08 pH units, >0.09 pH units or >0.10 pH units. In some embodiments, the difference between $pH_{n+1\_base}$ and the second model is >0.05 pH units. In some embodiments, the methods comprise repeating the adding and measuring steps at least once, twice, three times, four times, five times, or more, to confirm that the behavior of the sample corresponds to the second model. If the sample does not conform to the second model, or a pH meter calibration error is suspected, the skilled artisan can decrease the amount of titrant added, and increase the number of times titrant is added, in order to more accurately measure pH and during the process and avoid going past the target pH. In some embodiments, the methods comprise determining a remaining amount of basic titrant to add to the sample to change the pH of the sample to a final pH of between 5.0 and 8.5 ($pH_{final\_base}$) based on normalized titrant, pH, and the model. In some embodiments, the methods comprise adding the remaining amount of basic titrant to the sample to reach $pH_{final\_base}$.

In some embodiments, the methods comprise adding one or more conservative amounts of titrant, i.e. amounts of titrant that are expected to change the pH of the sample to no more than halfway to the target pH, measuring pH, and applying a model to determine the remaining amount of titrant to be added to the sample to reach a target, or final pH. In some embodiments, determining the final amount of titrant to be added to the sample is determined by the formula:

$$\text{Titrant}_n \times \left[\left(\frac{(\text{normalized Titrant}_{total} - \text{normalized Titrant}_{initial})}{(\text{normalized Titrant}_n - \text{normalized titrant}_{initial})}\right) - 1\right]. \quad \text{(Equation 15)}$$

In this formula, normalized $\text{Titrant}_{total}$ is the total amount of added to the sample to achieve the final pH, after normalization, normalized $\text{Titrant}_{initial}$ is the amount of titrant added to the sample for the initial pH after normalization (this value can be 0 prior to normalization), and normalized $\text{Titrant}_n$ is the amount of titrant added the sample to reach an intermediate $pH_n$, normalized using the model, with $pH_n$ falling between $pH_{initial}$ and $pH_{final}$. The skilled artisan will appreciate that where multiple intermediate amounts of titrant are added to the sample, and the corresponding pH values are measured, the remaining amount of titrant to be added to the sample to reach the final pH will be recalculated according to the formula described above.

In some embodiments, the methods comprise adding a first amount of titrant ($\text{Titrant}_n$) to the sample and measuring at least a first additional pH value ($pH_n$), $\text{Titrant}_n$ being the amount of titrant added to the sample to reach $pH_n$, wherein $pH_n$ is different from the initial pH ($pH_{initial}$); applying a model to determine a normalized initial amount of Titrant ($\text{Titrant}_{initial}$) and normalized $\text{Titrant}_n$, wherein the model relates the normalized titrant added to the sample to the pH of the sample; and determining a further additional amount of titrant ($\text{Titrant}_{n+1}$) to be added to the sample to reach a target pH ($pH_{n+1}$), $pH_{n+1}$ being the pH reached by the addition of the further additional amount of titrant ($\text{Titrant}_{n+1}$) to the sample. In some embodiments, the methods comprise applying the model, and calculating an additional amount of titrant to add to the sample ($\text{Titrant}_{n+2}$) to reach a second target pH ($pH_{n+2}$). In some embodiments, the methods further comprise adding the additional amount of titrant ($\text{Titrant}_{n+2}$) to the sample, thereby changing the pH of the sample to the second target pH ($pH_{n+2}$). In some embodiments, the methods further comprise applying the model, and calculating an additional amount of titrant ($\text{Titrant}_{n+3}$) to add to the sample to reach a third target pH ($pH_{n+3}$). In some embodiments, the methods comprising adding $\text{Titrant}_{n+3}$ thereby changing the pH of the sample to $pH_{n+3}$. In some embodiments, the methods further comprise applying the model, and calculating an additional amount of titrant ($\text{Titrant}_{n+4}$) to add to the sample to reach a fourth target pH ($pH_{n+4}$). In some embodiments, adding $\text{Titrant}_{n+1}$, $\text{Titrant}_{n+2}$, $\text{Titrant}_{n+3}$, or $\text{Titrant}_{n+4}$ produces a target pH that is within 0.05 to 0.10 pH units of a final target pH ($pH_{final}$). In some embodiments, an additional amount of titrant, as determined by applying the model, is added to the sample to reach the final target pH. For example, $pH_{n+2}$ is within 0.05 to 0.10 pH units of a final target pH, which is reached by the addition of $\text{Titrant}_{n+3}$, wherein the amount of titrant to add for $\text{Titrant}_{n+3}$ is determined by applying the model. As a further example, $pH_{n+3}$, is within 0.05 to 0.10 pH units of a final target pH, which is reached by the addition of $\text{Titrant}_{n+4}$, wherein the amount of titrant to add for $\text{Titrant}_{n+4}$ is determined by applying the model. The person of ordinary skill in the art will understand that depending on the magnitude of the desired pH change, and the nature of the sample and titrant, more or less titrant additions than those described supra may be used to reach a final target pH. In some embodiments, a final pH is reached by the addition of 1, 2, 3, 4, 5, 6, 7, 8, 9 or 10 additions of titrant, wherein pH is measured after each addition and the model applied to determine an amount of titrant to be added to reach an additional target pH, and optionally, a desired final pH. In some embodiments, the methods comprise comparing the target pH at any of the addition steps described herein (e.g., $pH_{n+1}$, $pH_{n+2}$, $pH_{n+3}$, $pH_{n+4}$ etc.) with the target pH predicted for the corresponding step by the model.

When carrying out the methods of changing pH described herein, pH measurements of the sample can be measured using a pH probe inserted in a subsample removed from the sample. The subsample can be removed from the sample via a slipstream, for example a slipstream connecting a reaction vessel containing the sample to a flow cell into which the pH probe is inserted. In some embodiments, the slipstream is continuous. In some embodiments, the slipstream is discontinuous, or intermittent. In some embodiments, the pH of the sample is not measured using a pH probe inserted directly into the sample.

Models

The disclosure provides models for use in the methods of the disclosure, and methods of generating these models.

In some embodiments, generating the model comprises nondimensionalization, for example nondimensionalization of titrant values of reference titration curves. Nondimensionalization is the partial or full removal of physical dimensions from an equation involving physical quantities by a substitution of suitable variables. For example, the volume of titrant added to a sample may be determined by rotations/kg of a pump, or mL titrant added per kg of total sample, and these dimensions can be removed by nondimensionalization techniques. Nondimensionalization can simplify and parameterize problems where measured units are involved. In some cases, scaling is interchangeable with nondimensionalization, when nondimensionalization is used to convert multiple datasets to a common scale.

In some embodiments, generating the model comprises regression analysis. Regression analysis is a set of statistical processes for estimating the relationships between a dependent variable (often called the 'response' variable) and an more independent variables, in this case pH and normalized titrant, respectively. One common form of regression analysis is linear regression, in which the skilled artisan finds the line that most closely fits the data according to a specific mathematical criterion. For example, the method of ordinary least squares computes the unique line that minimizes the sum of squared differences between the true data and that line).

In some embodiments, fitting the model comprises linear regression. linear regression is a linear approach for modelling the relationship between a scalar response variable and one or more explanatory variables. The case of one explanatory variable is called simple linear regression. In linear regression, the relationships are modeled using linear predictor functions whose unknown model parameters are estimated from the data. Such models are called linear models.

Linear regression was the first type of regression analysis to be studied rigorously, and to be used extensively in practical applications. This is because models which depend linearly on their unknown parameters are easier to fit than models which are non-linearly related to their parameters and because the statistical properties of the resulting estimators are easier to determine.

In some embodiments, the regression analysis comprises polynomial regression. Polynomial regression is a form of regression analysis in which the relationship between the independent variable (normalized titrant, e.g.) and the dependent variable (pH, e.g.) is modelled as an nth degree polynomial. Polynomial regression fits a nonlinear relationship between the value of independent variable and the corresponding conditional mean of the dependent variable. Although polynomial regression fits a nonlinear model to the data, as a statistical estimation problem it is linear, in the sense that the regression function is linear in the unknown parameters that are estimated from the data. For this reason, polynomial regression is considered to be a type of multiple linear regression.

Polynomial regression models can be fit using the method of least squares. The least-squares method minimizes the variance of the unbiased estimators of the coefficients, under the conditions of the Gauss-Markov theorem.

In some embodiments, fitting the model comprises curve fitting. Curve fitting is the process of constructing a curve, or mathematical function, that has the best fit to a series of data points. Curve fitting can involve either interpolation, where an exact fit to the data is required, or smoothing, in which a "smooth" function is constructed that approximately fits the data. Curves can be extrapolated, i.e. extended beyond the range of the observed data, although extrapolated curves are subject to a degree of uncertainty.

Fitting the model can be carried out using any suitable program known in the art, for example Microsoft excel, MATLAB or R.

In some embodiments, the model is determined from one or more titration curves generated from one or more reference samples. The reference samples can be identical to the sample, for example a subsample of a larger sample subjected to identical pH processes. Alternatively, the reference samples can be similar to the sample. Examples of such reference samples include previously purified batches of a protein identical to the protein of interest, that were purified using similar or identical methods, and subjected to substantially the same pH processes. As a still further alternative, the reference protein may be a protein similar but not identical to the protein of interest, for example two antibodies or two Fc receptor fusion proteins, as long as the two proteins behave similarly when going through similar pH change regimens. Due to the non-dimensionalization and the modelling methods described herein, the initial and final pH values of all reference samples, and the sample, need not be perfectly identical. For example, the initial and/or final pH values of the one or more reference samples, and the sample, can differ by at about 0.1, 0.2, 0.3, 0.4, 0.5, 0.6, 0.7, 0.8, 0.9, 1.0, 1.1, 1.2, 1.3, 1.4 or 1.5 pH units. Alternatively, the initial and/or final pH values of the one or more reference samples, and the sample can be identical.

Accordingly, the disclosure provides one or more reference samples used to generate the models used herein. The disclosure provides titration curves generated by changing the pH of the reference sample, and relating reference sample pH to the amount of titrant added to the reference sample. Methods of generating and plotting titration curves will be known to persons of ordinary skill in the art.

In some embodiments, the methods comprise (i) generating at least one reference titration curve from at least one reference sample relating an amount of titrant added to the reference sample to the pH of the reference sample; (ii) normalizing the at least one reference titration curve; and (iii) generating the model to fit the at least one reference titration curve. In some embodiments, generating the at least one reference titration curve comprises measuring an initial pH of the reference sample ($pH_{initial\_ref}$). This is followed by adding an amount of titrant to the reference sample ($Titrant_{n\_ref}$) sufficient to change the pH of the reference sample, and measuring an additional reference pH value after addition of this titrant ($pH_{n\_ref}$). These steps can be repeated until the final pH is reached, and the amount of titrant versus pH of the reference sample is plotted using any suitable program known in the art. When generating reference titration curves, any suitable methods of adding titrant may be used. Titrant may be added in discrete steps—for example by adding a discrete amount of titrant, stirring for an amount of time to mix it into the reference sample (for example, until the pH of the reference sample is stable), and taking a pH measurement. Alternatively, titrant may be added continuously, and pH may be measured continuously. When generating the titration curves of the reference sample or samples, any suitable methods of measuring pH may be used. For example, the pH of the reference sample can be measured by a pH probe inserted directly into the reference sample, or can be measured by a pH probe inserted into a continuous or discretely sampled slip stream drawn from the reference sample.

In some embodiments, the amount of titrant added to the reference sample is normalized by the following formula:

$$\text{normalized Titrant}_{n\_ref} = \frac{\text{Titrant}_{n\_ref} - \text{Titrant}_{1\_ref}}{\text{Titrant}_{2\_ref} - \text{Titrant}_{1\_ref}}. \quad \text{(Equation 17)}$$

In this formula, $Titrant_{1\_ref}$ is an amount of titrant added to the reference sample to reach a first $pH_{1\_ref}$, and $Titrant_{2\_ref}$ is an amount of titrant added to the reference sample to reach $pH_{2\_ref}$.

In some embodiments, for example when a single reference sample and corresponding titration curve are used to generate the model, $pH_{1\_ref}$ can be the same as the initial pH of the reference sample, and $pH_{2\_ref}$ can be identical to the final pH of the reference sample.

In alternative embodiments, a plurality of reference samples and corresponding titration curves are used to generate the model. When the plurality of titration curves do not have the same initial and/or final pH values, $pH_{1\_ref}$ is not the same as the some or all of the initial pH values of the reference samples, and $pH_{2\_ref}$ is not the same as some or all of the final pH values of the reference samples. Each reference titration curve comprises a $pH_{initial\_ref}$ and $pH_{final\_ref}$, and $pH_{1\_ref}$ is a $pH_{initial\_ref}$ from one of the plurality of reference titration curves, $pH_{2\_Ref}$ is a $pH_{final\_ref}$ from one of the plurality of reference titration curves, and $pH_{1\_ref}$ and $pH_{2\_ref}$ are selected to encompass a maximal difference in value while still encompassing pH values covered by all of the plurality of reference titration curves. Thus, $pH_{1\_ref}$ and $pH^2$ are as far apart as possible, but offset by some degree from $pH_{initial}$ and $pH_{final}$. As an example, where the reference titration curves comprises raising pH, $pH_{1\_ref}$ can be the $pH_{initial\_ref}$ of the reference titration curve with the highest initial pH, and $pH_{2\_ref}$ the $pH_{final\_ref}$ of the reference titration curve with the lowest final pH. The skilled artisan will appreciate that when the reference titration curves comprise lowering pH, the opposite relationship would hold.

In some embodiments, the initial pH of the sample ($pH_{initial}$) and $pH_{1\_ref}$ are about the same.

As an example, pH values can be considered about the same if they are within about 0.05 units of each other. Alternatively, pH values within 10%, 5% or 3% of each other may be considered to be about the same.

In some embodiments, the initial pH of the sample ($pH_{initial}$) and $pH_{1\_ref}$ are not the same, i.e. the difference between $pH_{initial}$ and $pH_{1\_ref}$ is about 0.05 to 1.5, is about 0.05 to 1, about 0.1 to 1, about 0.1 to 0.5, or about 0.1 to 0.3 pH units. In some embodiments, the difference between $pH_{initial}$ and $pH_{1\_ref}$ is about 0.1 to 0.5 pH units.

In some embodiments, the final pH of the sample ($pH_{final}$) and $pH_{2\_ref}$ are about the same.

In some embodiments, $pH_{final}$ and $pH_{2\_ref}$ are not the same, i.e., the difference between $pH_{final}$ and $pH_{2\_ref}$ is about 0.5 to 1.5, is about 0.05 to 1, about 0.1 to 1, about 0.1 to 0.5, or about 0.1 to 0.3 pH units. In some embodiments, the difference between $pH_{final}$ and $pH_{2\_ref}$ is about 0.5 to 1.5 pH units. In some embodiments, the difference between $pH_{final}$ and $pH_{2\_ref}$ is about 0.5 to 1.0 pH units. In some embodiments, the difference between $pH_{final}$ and $pH_{2\_ref}$ is about 0.1 to 0.5 pH units.

In some embodiments, $pH_{initial}$, $pH_{initial\_ref}$ and $pH_{1\_ref}$ are the same, and wherein $pH_{final}$, $pH_{final}$ ref and $pH_{2\_ref}$ are the same.

The person of ordinary skill will appreciate that the selection of $pH_{1\_ref}$ and $pH_{2\_ref}$ depends on the particular reference samples, the corresponding reference titration curves, and the amount of variation contained therein with regard to initial and final pH values.

In some embodiments, the final pH of the sample ($pH_{final}$) is less than the initial pH of the sample ($pH_{initial}$), and the titrant is an acid. In some embodiments, the sample, and a plurality of reference samples, comprise proteins of interest. In some embodiments, $pH_{1\_ref}$ is about 4.0, 4.1, 4.2, 4.3, 4.4, 4.5, 4.6 4.7, 4.8 or 4.9, and $pH_{2\_ref}$ is about 3.1, 3.2, 3.3, 3.4, 3.5, 3.6, 3.8 or 3.9. In some embodiments, $pH_{1\_ref}$ is about 4.1, and $pH_{2\_ref}$ is about 3.6. In some embodiments, the initial pH of the sample and the plurality of reference samples is between about 4.1 and 4.5. In some embodiments, the final pH of the sample and plurality of reference samples is between about 3.5 and 3.7, optionally about 3.6. In some embodiments, the amount of titrant added to the plurality of reference samples is normalized to a scale of about −0.76 to about 1.49. In some embodiments, generating the model from the plurality of reference samples comprises fitting a polynomial. In some embodiments, the polynomial comprises a $4^{th}$ order polynomial of the formula:

$$\text{normalized Titrant}_n = a + b*pH_n + c*pH_n^2 + d*pH_n^3 + e*pH_n^4. \quad \text{(Equation 18)}$$

In some embodiments, the polynomial comprises:

$$\text{normalized Titrant}_n = 283.35764 - 279.43987*pH_n + 104.25395*pH_n^2 - 17.257125*pH_n^3 + 1.0589067*pH_n^4. \quad \text{(Equation 19)}$$

The polynomial described above, generated from the model, can be used to calculate normalized titrant added to a sample from a measured pH value.

In some embodiments, wherein the final pH of the sample ($pH_{final}$) is greater than the initial pH ($pH_{initial}$), and the titrant is a base. In some embodiments, the sample, and a plurality of reference samples, comprise proteins of interest. In some embodiments, $pH_{1\_ref}$ is between about 3.1 and 3.8. In some embodiments, $pH_{1\_ref}$ is between about 3.4 and 4.1. In some embodiments, $pH_{1\_ref}$ is about 3.1, 3.2, 3.3, 3.4, 3.5, 3.6, 3.8 or 3.9. In some embodiments, $pH_{1\_ref}$ is about 3.6. In some embodiments, $pH_{1\_ref}$ is about 3.7. In some embodiments, $pH_{2\_ref}$ is between about 7.5 and 8.5. In some embodiments, $pH_{2\_ref}$ is about 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3 or 8.4. In some embodiments, $pH_{2\_ref}$ is about 7.6. In some embodiments, $pH_{initial}$ is between about 3.5 and 3.7. In some embodiments, $pH_{final}$ is between about 5.1 and 8.5. In some embodiments, $pH_{final}$ is between about 7.5 and 8.0. In some embodiments, $pH_{final}$ is between about 7.5 and 8.0. In some embodiments, $pH_{final}$ is between about 7.0 and 8.0, between about 7.1 and 7.9, between about 7.2 and 7.8, between about 7.3 and 7.7, or between about 7.4 and 7.6. In some embodiments, the amount of titrant added to the reference sample is normalized to a scale of about −0.06 to about 1.53. n some embodiments, generating the model from the plurality of reference samples comprises fitting a polynomial. In some embodiments, the polynomial comprises a $5^{th}$ order polynomial of the formula:

$$\text{normalized Titrant}_n = a + b*pH_n + c*pH_n^2 + d*pH_n^3 + e*pH_n^4 + f*pH_n^5. \quad \text{(Equation 20)}$$

In some embodiments, the polynomial comprises:

$$\text{normalized Titrant}_n = 12.256725 - 10.723277*pH_n + 3.3662386*pH_n^2 - 0.4588175*pH_n^3 + 0.0255417*pH_n^4 - 0.0003153*pH_n^5. \quad \text{(Equation 21)}$$

The polynomial described above, generated from the model, can be used to calculate normalized titrant added to a sample from a measured pH value.

The models described above are intended to be exemplary and non-limiting. The skilled artisan will appreciate that depending on the initial and final pH values of the reference sample or samples, and the sample, other models, including other polynomials, generated from the reference samples by the methods described herein will be suitable for use in the methods described herein.

The models described above related normalized titrant to pH value. The disclosure provides methods comprising comparing one or measured pH values of sample to a model. In some embodiments, the methods comprise measuring an initial pH, adding a first conservative amount of titrant, measuring a first additional pH value, and then applying the model to determine a first normalized amount of titrant, for example the normalized amount of titrant corresponding the initial pH and/or the pH after the addition of the first amount of titrant. In some embodiments, the methods comprise determining a second conservative amount of titrant corresponding to a pH between the pH after the addition of the first amount of titrant and a final target pH, adding the second conservative amount of titrant, measuring a second additional pH value, and comparing the second pH value as measured to the second pH value predicted by the model. If the second measured pH value differs from that predicted by the model following fitting the data for the initial pH, first additional pH and normalized titrant to the model, for example by >0.01 pH units, >0.02 pH units, >0.03 pH units, >0.04 pH units, >0.05 pH units, >0.06 pH units, >0.07 pH units, >0.08 pH units, >0.09 pH units or >0.10 pH units, then the model pH and the sample pH do not correspond, indicating an error in the pH meter. Conversely, if the predicted pH and the sample pH differ by, for example, ≤0.01 pH units, ≤0.02 pH units, ≤0.03 pH units, ≤0.04 pH units, ≤0.05 pH units, ≤0.06 pH units, ≤0.07 pH units, ≤0.08 pH units, ≤0.09 pH units or ≤0.10 pH units, following the fitting of the sample data to the model, then the model pH and the sample pH correspond, indicating that the pH meter is functioning properly. In some embodiments, the methods comprise determining a third conservative amount of titrant corresponding to a pH between the pH after the addition of the second amount of titrant and a final target pH, adding the third amount of titrant, measuring the third pH value, and comparing the third pH value as measured to the third pH value predicted by the model. In some embodiments, the methods comprise adding 1, 2, 3, 4, 5, 6, 7, 8, 9 or 10 additional amounts of titrant, measuring the pH value after each addition of titrant, comparing the measured pH value to the pH value predicted the model, and determining if the measured pH value and the pH value predicted by the model correspond. If the 1, 2, 3, 4, 5, 6, 7, 8, 9 or 10 additional pH measurement differs from the pH predicted by the model for the addition of the 1, 2, 3, 4, 5, 6, 7, 8, 9 or 10 additional amount of titrant by >0.01 pH units, >0.02 pH units, >0.03 pH units, >0.04 pH units, >0.05 pH units, >0.06 pH units, >0.07 pH units, >0.08 pH units, >0.09 pH units or >0.10 pH units, then the model pH and the sample pH do not correspond, indicating an error in the pH meter.

Proteins of Interest

The disclosure provides samples comprising proteins of interest, for use in the methods described herein. The protein of interest can be a therapeutic protein, i.e. a protein administered to a subject for the treatment of a disease or disorder. Exemplary proteins of interest include, but are not limited to antibodies, receptor Fc fusion proteins, such as trap proteins, cytokines, chemokines, growth factors and the like.

In some embodiments, the protein of interest is an antigen binding protein, such as an antibody.

The phrase "antigen-binding protein" includes a protein that has at least one complementarity determining region (CDR) and is capable of selectively recognizing an antigen, i.e., is capable of binding an antigen with a KD that is at least in the micromolar range. Therapeutic antigen-binding proteins (e.g., therapeutic antibodies) frequently require a KD that is in the nanomolar or the picomolar range. Typically, an antigen-binding protein includes two or more CDRs, e.g., 2, 3, 4, 5, or 6 CDRs. Examples of antigen binding proteins include antibodies, antigen-binding fragments of antibodies such as polypeptides containing the variable regions of heavy chains and light chains of an antibody (e.g., Fab fragment, F(ab')2 fragment), and proteins containing the variable regions of heavy chains and light chains of an antibody and containing additional amino acids from the constant regions of heavy and/or light chains (such as one or more constant domains, i.e., one or more of CL, CH1, hinge, CH2, and CH3 domains).

"Antibody" refers to an immunoglobulin molecule consisting of four polypeptide chains, two heavy (H) chains and two light (L) chains inter-connected by disulfide bonds. Each heavy chain has a heavy chain variable region (HCVR or VH) and a heavy chain constant region. The heavy chain constant region contains three domains, CH1, CH2 and CH3. Each light chain has a light chain variable region (VL) and a light chain constant region. The light chain constant region consists of one domain (CL). The VH and VL regions can be further subdivided into regions of hypervariability, termed complementarity determining regions (CDR), interspersed with regions that are more conserved, termed framework regions (FR). Each VH and VL is composed of three CDRs and four FRs, arranged from the amino-terminus to the carboxy-terminus in the following order: FR1, CDR1, FR2, CDR2, FR3, CDR3, and FR4. The term "antibody" includes both glycosylated and non-glycosylated immunoglobulins of any isotype or subclass. The term "antibody" includes antibody molecules prepared, expressed, created or isolated by recombinant means, such as antibodies isolated from a host cell transfected with a nucleotide sequence in order to express the antibody. The term "antibody" also includes a bispecific antibody, which includes a heterotetrameric immunoglobulin that can bind to more than one epitope. The term "antibody," as used herein, also includes antigen-binding fragments of full antibody molecules and fusion proteins comprising antibodies or antigen-binding fragments.

The term "antigen-binding portion" of an antibody (or antibody fragment) refers to one or more fragments of an antibody that retain the ability to specifically bind to an antigen. Non-limiting examples of protein binding fragments encompassed within the term "antigen-binding portion" of an antibody include (i) a Fab fragment, a monovalent fragment consisting of the VL, VH, CL and CH1 domains; (ii) a F(ab')2 fragment, a bivalent fragment comprising two Fab fragments linked by a disulfide bridge at the hinge region; (iii) a Fd fragment consisting of the VH and CH1 domains; (iv) a Fv fragment consisting of the VL and VH domains of a single arm of an antibody, (v) a dAb fragment (Ward et al., Nature (1989) 241:544-546), which consists of a VH domain, (vi) an isolated CDR, and (vii) an scFv, which consists of the two domains of the Fv fragment, VL and VH, joined by a synthetic linker to form a single protein chain in which the VL and VH regions pair to form monovalent molecules. Other forms of single chain antibodies, such as diabodies are also encompassed under the term "antibody". See, e.g., Holliger et al., PNAS USA (1993) 90:6444-6448; Poljak et al., Structure (1994) 2:1121-1123.

Still further, an antibody or antigen-binding portion thereof may be part of a larger immunoadhesion molecule, formed by covalent or noncovalent association of the antibody or antibody portion with one or more other proteins or peptides. Non-limiting examples of such immunoadhesion molecules include use of the streptavidin core region to make a tetrameric scFv molecule (Kipriyanov et al., Human Antibodies and Hybridomas (1995) 6:93-101) and use of a cysteine residue, a marker peptide and a C-terminal polyhistidine tag to make bivalent and biotinylated scFv molecules (Kipriyanov et al. Mol. Immunol. (1994) 31:1047-1058). Antibody portions, such as Fab and F(ab')2 fragments, can be prepared from whole antibodies using conventional techniques, such as via papain or pepsin digestion of whole antibodies. Moreover, antibodies, antibody portions and immunoadhesion molecules can be obtained using standard recombinant DNA techniques commonly known in the art (see Sambrook et al., 1989).

The term "human antibody" is intended to include antibodies having variable and constant regions derived from human germline immunoglobulin sequences. Human antibodies of the present disclosure may include amino acid residues not encoded by human germline immunoglobulin sequences (e.g., mutations introduced by random or site-specific mutagenesis in vitro or by somatic mutation in vivo), for example in the CDRs and in particular CDR3.

The term "recombinant human antibody", as used herein, is intended to include all human antibodies that are prepared, expressed, created or isolated by recombinant means, such as antibodies expressed using a recombinant expression vector transfected into a host cell, antibodies isolated from a recombinant, combinatorial human antibody library, antibodies isolated from an animal (e.g., a mouse) that is transgenic for human immunoglobulin genes (see, e.g., Taylor et al. Nucl. Acids Res. (1992) 20:6287-6295) or antibodies prepared, expressed, created or isolated by any other means that involves splicing of human immunoglobulin gene sequences to other DNA sequences. Such recombinant human antibodies have variable and constant regions derived from human germline immunoglobulin sequences. In certain embodiments, however, such recombinant human antibodies are subjected to in vitro mutagenesis (or, when an animal transgenic for human Ig sequences is used, in vivo somatic mutagenesis), and thus the amino acid sequences of the VH and VL regions of the recombinant antibodies are sequences that, while derived from and related to human germline VH and VL sequences, may not naturally exist within the human antibody germline repertoire in vivo.

Additional therapeutic proteins are contemplated as within the scope of the instantly disclosed methods of cell culture and therapeutic protein production. In certain embodiments, the therapeutic protein is an antibody, a human antibody, a humanized antibody, a chimeric antibody, a monoclonal antibody, a multispecific antibody, a bispecific antibody, an antigen binding antibody fragment, a single chain antibody, a diabody, triabody or tetrabody, a Fab fragment or a F(ab')2 fragment, an IgD antibody, an IgE antibody, an IgM antibody, an IgG antibody, an IgG1 antibody, an IgG2 antibody, an IgG3 antibody, or an IgG4 antibody. In certain embodiments, the antibody is an IgG1 antibody, an IgG2 antibody, an IgG4 antibody, a chimeric IgG2/IgG4 antibody, a chimeric IgG2/IgG1 antibody or a chimeric IgG2/IgG1/IgG4 antibody.

In some embodiments, the antibody is selected from the group consisting of an anti-Programmed Cell Death 1 antibody (e.g., an anti-PD1 antibody as described in U.S. Pat. Appln. Pub. No. US2015/0203579A1), an anti-Programmed Cell Death Ligand-1 (e.g., an anti-PD-L1 antibody as described in U.S. Pat. Appln. Pub. No. US2015/0203580A1), an anti-Dll4 antibody, an anti-Angiopoetin-2 antibody (e.g., an anti-ANG2 antibody as described in U.S. Pat. No. 9,402,898), an anti-Angiopoetin-Like 3 antibody (e.g., an anti-AngPtl3 antibody as described in U.S. Pat. No. 9,018,356), an anti-platelet derived growth factor receptor antibody (e.g., an anti-PDGFR antibody as described in U.S. Pat. No. 9,265,827), an anti-Erb3 antibody, an anti-Prolactin Receptor antibody (e.g., anti-PRLR antibody as described in U.S. Pat. No. 9,302,015), an anti-Complement 5 antibody (e.g., an anti-C5 antibody as described in U.S. Pat. Appln. Pub. No US2015/0313194A1), an anti-TNF antibody, an anti-epidermal growth factor receptor antibody (e.g., an anti-EGFR antibody as described in U.S. Pat. No. 9,132,192 or an anti-EGFRvIII antibody as described in U.S. Pat. Appln. Pub. No. US2015/0259423A1), an anti-Proprotein Convertase Subtilisin Kexin-9 antibody (e.g. an anti-PCSK9 antibody as described in U.S. Pat. No. 8,062,640 or U.S. Pat. Appln. Pub. No. US2014/0044730A1), an anti-Growth And Differentiation Factor-8 antibody (e.g., an anti-GDF8 antibody, also known as anti-myostatin antibody, as described in U.S. Pat. No. 8,871,209 or 9,260,515), an anti-Glucagon Receptor (e.g., anti-GCGR antibody as described in U.S. Pat. Appln. Pub. Nos. US2015/0337045A1 or US2016/0075778A1), an anti-VEGF antibody, an anti-IL1R antibody, an interleukin 4 receptor antibody (e.g., an anti-IL4R antibody as described in U.S. Pat. Appln. Pub. No. US2014/0271681A1 or U.S. Pat. No. 8,735,095 or 8,945,559), an anti-interleukin 6 receptor antibody (e.g., an anti-IL6R antibody, as described in U.S. Pat. Nos. 7,582,298, 8,043,617 or 9,173,880), an anti-IL1 antibody, an anti-IL2 antibody, an anti-IL3 antibody, an anti-IL4 antibody, an anti-IL5 antibody, an anti-IL6 antibody, an anti-IL7 antibody, an anti-interleukin 33 (e.g., anti-IL33 antibody as described in U.S. Pat. Appln. Pub. Nos. US2014/0271658A1 or US2014/0271642A1), an anti-Respiratory syncytial virus antibody (e.g., anti-RSV antibody as described in U.S. Pat. Appln. Pub. No. US2014/0271653A1), an anti-Cluster of differentiation 3 (e.g., an anti-CD3 antibody, as described in U.S. Pat. Appln. Pub. Nos. US2014/0088295A1 and US20150266966A1, and in U.S. Application No. 62/222,605), an anti-Cluster of differentiation 20 (e.g., an anti-CD20 antibody as described in U.S. Pat. Appln. Pub. Nos. US2014/0088295A1 and US20150266966A1, and in U.S. Pat. No. 7,879,984), an anti-CD19 antibody, an anti-CD28 antibody, an anti-Cluster of Differentiation-48 (e.g., anti-CD48 antibody as described in U.S. Pat. No. 9,228,014), an anti-Fel d1 antibody (e.g., as described in U.S. Pat. No. 9,079,948), an anti-Middle East Respiratory Syndrome virus (e.g., an anti-MERS antibody as described in U.S. Pat. Appln. Pub. No. US2015/0337029A1), an anti-Ebola virus antibody (e.g., as described in U.S. Pat. Appln. Pub. No. US2016/0215040), an anti-Zika virus antibody, an anti-Lymphocyte Activation Gene 3 antibody (e.g., an anti-LAG3 antibody, or an anti-CD223 antibody), an anti-Nerve Growth Factor antibody (e.g., an anti-NGF antibody, as described in U.S. Pat. Appln. Pub. No. US2016/0017029 and U.S. Pat. Nos. 8,309,088 and 9,353,176) and an anti-Activin A antibody. In some embodiments, the bispecific antibody is selected from the group consisting of an anti-CD3×anti-CD20 bispecific antibody (as described in U.S. Pat. Appln. Pub. Nos. US2014/0088295A1 and US20150266966A1), an anti-CD3×anti-Mucin 16 bispecific antibody (e.g., an anti-CD3×anti-Muc16 bispecific antibody), and an anti-CD3×anti-Prostate-specific membrane antigen bispecific antibody (e.g., an anti-CD3×anti-PSMA bispecific antibody). In some embodiments, the protein of interest is selected from the group consisting of alirocumab, sarilumab, fasinumab, nesvacumab, dupilumab, trevogrumab, evinacumab, and rinucumab. All publications mentioned throughout this disclosure are incorporated herein by reference in their entirety.

In other embodiments, the therapeutic protein is a recombinant protein that contains an Fc moiety and another domain, (e.g., an Fc-fusion protein). In some embodiments, an Fc-fusion protein is a receptor Fc-fusion protein, which contains one or more extracellular domain(s) of a receptor coupled to an Fc moiety. In some embodiments, the Fc moiety comprises a hinge region followed by a CH2 and CH3 domain of an IgG. In some embodiments, the receptor Fc-fusion protein contains two or more distinct receptor chains that bind to either a single ligand or multiple ligands. For example, an Fc-fusion protein is a trap protein, such as for example an IL-1 trap (e.g., rilonacept, which contains the IL-1RAcP ligand binding region fused to the Il-1R1 extracellular region fused to Fc of hIgG1; see U.S. Pat. No. 6,927,004, which is herein incorporated by reference in its entirety), a VEGF trap (e.g., aflibercept or ziv-aflibercept, which contains the Ig domain 2 of the VEGF receptor Flt1 fused to the Ig domain 3 of the VEGF receptor Flk1 fused to Fc of hIgG1; see U.S. Pat. Nos. 7,087,411 and 7,279,159; or conbercept, which contains the Ig domain 2 of the VEGF receptor Flt1 fused to the Ig domain 3 of the VEGF receptor Flk1 fused to the Ig domain 4 of the VEGF receptor Flk1 fused to Fc of hIgG1; see U.S. Pat. No. 8,216,575), or a TNF trap (e.g., etanercept, which contains the TNF receptor fused to Fc of hIgG1; see U.S. Pat. No. 5,610,279). In other embodiments, an Fc-fusion protein is a ScFv-Fc-fusion protein, which contains one or more of one or more antigen-binding domain(s), such as a variable heavy chain fragment and a variable light chain fragment, of an antibody coupled to an Fc moiety.

In some embodiments, the protein of interest is a glycoprotein. Glycoproteins with asparagine-linked (N-linked) glycans are ubiquitous in eukaryotic cells. Biosynthesis of these glycans and their transfer to polypeptides takes place in the endoplasmic reticulum (ER). N-glycan structures are further modified by a number of glycosidases and glycosyltransferases in the ER and the Golgi complex. Glycosylation of therapeutic proteins can be critical for therapeutic protein quality and effectiveness. For example, antibody glycosylation is a common post-translational modification, and may play a role in antibody effector function, as well as antibody stability. Methods of analyzing glycosylation patterns, and the percentage glycosylated protein in a sample of protein, will be known to the skilled artisan.

Protein Purification

Methods of purifying proteins of interest produced by the cells and cell culture methods described herein to produce the protein of interest will be known to persons of skill in the art. Methods of purifying proteins of interest from cell culture media, or from cells, include chromatographic and non-chromatographic methods. Chromatographic methods comprise passing a solution comprising the antibody through a solid phase (e.g., silica resin or beads, monolithic columns, or cellulose membranes) and allowing the proteins of interest to bind or pass through depending on whether “bind-and-elute” or “flow-through” chromatographic methods are employed. Chromatographic methodologies include, but are not limited to, affinity-tag binding, protein A binding, ion-exchange chromatography (such as anion exchange chromatography), size-exclusion chromatography, or immunoaffinity chromatography. Purification can also be achieved through the use of genetically fused purification tags, such as polyHistidine tags or FLAG tags.

An exemplary protein purification protocol comprises obtaining a clarified solution comprising the protein of interest, and performing a combination of different purification techniques, including ion exchange separation steps and hydrophobic interaction separation steps. The separation steps separate mixtures of proteins on the basis of their charge, degree of hydrophobicity, or size. In one aspect of the invention, separation is performed using chromatography, including cationic, anionic, and hydrophobic interaction. Different chromatography resins are available for each of these steps, allowing accurate tailoring of the purification scheme to the particular protein involved. The essence of each of the separation methods is that proteins can be caused either to traverse at different rates down a column, achieving a physical separation that increases as they pass further down the column, or to adhere selectively to the separation medium, being then differentially eluted by different solvents. In some cases, the protein of interest is separated from impurities when the impurities specifically adhere to the column and the protein of does not, i.e., the protein of interest is present in the flow through.

In some embodiments, purification of the protein of interest involves a primary recovery step. In some embodiments, the primary recovery step involves a chromatography column, such as an affinity column. Following the primary recovery step can also be a point at which viruses are inactivated using the methods described herein, for example by subjecting the pool of protein of interest in the eluate to the pH changes described herein.

In some embodiments, the protein sample recovered from the primary recovery step is subjected to additional purification steps, to further purify the protein of interest. For example, affinity chromatography may be used. Non-limiting examples of chromatographic material that can be used that include: Protein A, Protein G, chromatographic material comprising the antigen bound by an antibody of interest, or an antibody that binds to the protein of interest, and chromatographic material comprising an Fc binding protein. As a further example, a hydrophobic interaction column may be used to remove impurities such as aggregates.

Any purification step involving changing the pH of a sample can be subjected to the methods of pH meter calibration and error correction described herein. Potential viruses can be inactivated after any suitable purification step using the pH control processes that include the methods described herein. In addition, or the pH of a solution comprising the protein of interest can be changed using pH control process that include the methods described herein, for example to change the pH to a pH desired for the next purification step or other downstream application, using the methods described herein.

Cells and Cell Culture

The disclosure provides populations of cells for use in producing a protein of interest described herein. Suitable cells include bacterial cells, yeast cells and mammalian cells.

In some embodiments, the population of cells is isolated or derived from a cell line capable of producing a protein of interest. Non-limiting examples of cell lines that are used to produce therapeutic proteins include, inter alia, primary cells, BSC cells, HeLa cells, HepG2 cells, LLC-MK cells, CV-1 cells, COS cells, VERO cells, MDBK cells, MDCK cells, CRFK cells, RAF cells, RK cells, TCMK-1 cells, LLCPK cells, PK15 cells, LLC-RK cells, MDOK cells, baby hamster kidney (BHK) cells, BHK-21 cells, CHO cells, CHO-K1 cells, NS-1 cells, MRC-5 cells, WI-38 cells, BHK cells, 3T3 cells, 293 cells, RK cells, Per.C6 cells and chicken embryo cells. In some embodiments, the population of cells comprises CHO cells. In some embodiments, the CHO cells comprise CHO cells from one or more of several specific CHO cell variants optimized for large-scale protein production, e.g., CHO-K1, the CHO-K1-derived EESYR® (enhanced expression and stability regions) cells (U.S. Pat. No. 7,771,997), or the FASTR technology described in U.S. Pat. No. 6,919,183, which provides for the isolation of cells producing secreted proteins.

In some embodiments, the population of cells that is cultured and expresses the protein of interest is a population of cells obtained by clonal expansion of a cell (i.e., the progenitor cell) that harbors and expresses a polynucleotide encoding the therapeutic protein of interest. In some embodiments, at least 50%, at least 60%, at least 70%, at least 80%, at least 90%, at least 95%, at least 98%, at least 99%, or about 100% of the constituent cells of the population of cells obtained or descended by clonal expansion from the progenitor cell contain the protein-encoding polynucleotide and express the protein of interest.

In some embodiments, the population of cells that is cultured and expresses the therapeutic protein is produced by culturing cells that have been frozen and stored. Mammalian cells can be frozen and cryopreserved, for example in cryopreservation media containing dimethylsulfoxide (DMSO) and cell culture media. In an exemplary cryopreservation protocol, mammalian cells are transferred to cryopreservation media, and slowly frozen before being stored under liquid nitrogen. For example, cells can be expanded and cryopreserved to create a cell bank, which is a bank of cells created from a single pool of cells with desired characteristics.

The present disclosure provides methods for culturing cells expressing protein of interest, prior to purification.

"Cell culture" or "culture" means the growth and propagation of cells outside of a multicellular organism or tissue. Suitable culture conditions for mammalian cells are known in the art. See, e.g., Animal cell culture: A Practical Approach, D. Rickwood, ed., Oxford University Press, New York (1992). Mammalian cells may be cultured in suspension, or while attached to a solid substrate. Fluidized bed bioreactors, hollow fiber bioreactors, roller bottles, shake flasks, or stirred tank bioreactors, with or without microcarriers, and operated in a batch, fed batch, continuous, semi-continuous, or perfusion mode are available for mammalian cell culture.

In some embodiments, culturing a population of cells expressing the protein of interest comprises an expansion, or growth, phase, in which the population of cells is expanded to sufficient size to produce the desired quantity of the protein of interest in a production stage.

In some embodiments, culturing a population of cells expressing the protein of interest comprises a production phase, wherein the population of cells is cultured in a production cell culture medium under conditions sufficient to produce the protein of interest. A production phase can be conducted at any scale of culture, from individual flasks and shaker flasks or wave bags, to one-liter bioreactors, and to large scale industrial bioreactors. A large scale process can be conducted in a volume of about 100 liters to 20,000 liters or more. One or more of several means may be used to control protein production, such as temperature shift or chemical induction. A growth phase may occur at a higher temperature than a production phase. For example, a growth phase may occur at a first temperature of about 35° C. to 38° C., and a production phase may occur at a second temperature of about 29° C. to 37° C., optionally from about 30° C. to 36° C. or from about 30° C. to 34° C. In addition, chemical inducers of protein production, such as caffeine, butyrate, tamoxifen, estrogen, tetracycline, doxycycline, and hexamethylene bisacetamide (HMBA), may be added concurrent with, before, or after a temperature shift. If inducers are added after a temperature shift, they can be added from one hour to five days after the temperature shift, such as from one to two days after the temperature shift. Production cell cultures may be run as continuous feed culture system, as in a chemostat (see C. Altamirano et al., Biotechnol Prog. 2001 November-December; 17(6):1032-41), or according to a fed-batch process (Huang, 2010).

As used herein, the terms "cell culture media", "media", "cell media", "cell culture medium" or "culture medium" refers to any nutrient solution used for growing cells, e.g., animal or mammalian cells, and which generally provides at least one or more components from the following: an energy source (usually in the form of a carbohydrate such as glucose); one or more of all essential amino acids, and generally the twenty basic amino acids; vitamins and/or other organic compounds typically required at low concentrations; lipids or free fatty acids; and trace elements, e.g., inorganic compounds or naturally occurring elements that are typically required at very low concentrations, usually in the micromolar range. In some embodiments, a cell culture media is formed by combining a soy or other plant protein hydrolysate with one or more additional ingredients.

As used herein, "additional ingredient" includes any one or more of cell culture media components including but not limited to water, an energy source, one or more of all essential amino acids, and generally the twenty basic amino acids; vitamins and/or other organic compounds typically required at low concentrations, lipids or free fatty acids, trace elements and polyamines, such as ornithine and putrescine. For example, a cell culture media can be formed by combining soy hydrolysates with a base cell culture medium and supplementing the media with additional polyamines.

In some embodiments, the cell culture medium contains a base medium that is chemically defined, such as a custom formulation or a commercially available base medium.

Commercially available culture media will be known to persons of skill in the art, and include, inter alia, Eagle's MEME (minimal essential media) (Eagle, Science, 1955, 112(3168):501-504), Ham's F12 (Ham, Proc. Nat'l. Acad. Sci. USA, 1965, 53:288-293), F-12 K medium, Dulbecco's medium, Dulbecco's Modified Eagle Medium (Proc. Natl. Acad. Sci. USA., 1952 August; 38(8): 747-752), DMEM/Ham's F12 1:1, Trowell's T8, A2 media Holmes and Wolf, Biophys. Biochem. Cytol., 1961, 10:389-401), Waymouth media (Davidson and Waymouth, Biochem. J., 1945, 39(2): 188-199), Williams E media (William's et al., Exp. Cell Res., 1971, 69:105 et seq.), RPMI 1640 (Moore et al., J. Amer. Med. Assoc., 1967, 199:519-524), MCDB 104/110 media (Bettger et al., Proc. Nat'l. Acad. Sci. USA, 1981, 78(9):5588-5592), Ventrex HL-1 media, albumin-globulin media (Orr et al., Appl. Microbiol., 1973, 25(1):49-54), RPM I-1640 Medium, RPMI-1641 Medium, Iscove's Modified Dulbecco's Medium, McCoy's 5 A Medium, Leibovitz's L-15 Medium, and serum-free media such as EX-CELL™ 300 Series (JRH Biosciences, Lenexa, Kans.), protamine-zinc-insulin media (Weiss et al., 1974, U.S. Pat. No. 4,072,565), biotin-folate media (Cartaya, 1978, U.S. Re30,985), Transferrin-fatty acid media (Baker, 1982, U.S. Pat. No. 4,560,655), transferrin-EGF media (Hasegawa, 1982, U.S. Pat. No. 4,615,977; Chessebeuf, 1984, U.S. Pat. No. 4,786,599), and other media permutations (see Inlow, U.S. Pat. No. 6,048,728; Drapeau, U.S. Pat. No. 7,294,484; Mather, U.S. Pat. No. 5,122,469; Furukawa, U.S. Pat. No. 5,976,833; Chen, U.S. Pat. No. 6,180,401; Chen, U.S. Pat. No. 5,856,179; Etcheverry, U.S. Pat. No. 5,705,364; Etcheverry, U.S. Pat. No. 7,666,416; Ryll, U.S. Pat. No. 6,528,286; Singh, U.S. Pat. No. 6,924,124; Luan, U.S. Pat. No. 7,429,491; and the like).

In some embodiments, the cell culture medium is serum free. In some embodiments, the cell culture medium is serum free and hydrolysate free.

In some embodiments, the medium, which is at its useful concentration (i.e., 1×) contains at least 40±6 mM or at least 55±10.5 mM of a mixture of amino acids or amino acid salts. In one embodiment, the medium contains at least 40 mM of a mixture of amino acids. In this or another embodiment, the medium contains at least 55 mM of a mixture of amino acids. In one embodiment, the mixture of amino acids (with the exception of glutamine, which may be added back to the medium as a point of use addition) contains alanine, arginine, asparagine, aspartic acid, cysteine, glutamic acid, glycine, histidine, isoleucine, leucine, lysine, methionine, phenylalanine, proline, serine, threonine, tryptophan, tyrosine, and valine.

In some embodiments, the medium contains one or more fatty acids. In one particular embodiment, the medium contains a mixture of fatty acids (or fatty acid derivatives) and alpha tocopherol. Fatty acids or fatty acid derivatives are selected from the group consisting of linoleic acid, linolenic acid, thioctic acid, oleic acid, palmitic acid, stearic acid, arachidic acid, acid, lauric acid, behenic acid, decanoic acid, dodecanoic acid, hexanoic acid, lignoceric acid, myristic acid, and octanoic acid.

In some embodiments, the medium contains a mixture of nucleosides. In one embodiment, the medium contains adenosine, guanosine, cytidine, uridine, thymidine, and hypoxanthine.

In some embodiments, the medium contains a mixture of salts. Salts include divalent cations, such as calcium and magnesium. In one embodiment, the medium contains calcium chloride and magnesium sulfate. Other salts may include those of phosphate.

Depending on the cell culture process, different cell culture media may be used at different times during cell culture. For example, an expansion cell culture media may be used when expanding an initial population of cells from a frozen aliquot to produce a population of cells for protein of interest production. A second, production cell culture medium may be used to culture the expanded population of cells for production of the protein of interest, and a third "feed" cell culture medium may be used to feed the cell culture during production. Alternatively, the same cell culture media may be used throughout the cell culture process. As a further alternative, the expansion media may be different from the production and feed media, which have the same or similar composition.

In some embodiments, one or more point-of-use additions may be added to any of the cell culture media during cell culture, as described herein.

In some embodiments, culturing the population of cells comprises adding a feed medium to the production cell culture. As used herein, "feed media" refers to media added to cultured cells to replenish depleted nutrients. Feed media may be concentrated. For example one or all components of the feed medium may be concentrated when compared to the production cell culture medium. Alternatively, feed media may be at a similar concentration to the production cell culture medium. Feed media may be added to the culture continuously, or at intervals during the culture, for example every day, every other day, or the cell culture may be fed when the concentration of a specific medium component, which is being monitored, falls outside a desired range.

In some embodiments, the media is supplemented at intervals during cell culture according to a fed-batch process. Fed-batch culturing is generally known in the art and employed to optimized protein production. See, e.g., Y. M. Huang et al., Biotechnol Prog. (2010) 26(5) pp. 1400-1410.

Percent viable cells can be measured at any point during the cell culture methods described herein. Methods of determining viable cell count and cell density, include, but are not limited to, imaging cells, and quantifying cell number, density, diameter and biomarker expression.

Mammalian cells, such as CHO cells, may be cultured in small scale cell culture containers, such as in 125 ml containers having about 25 ml of media, 250 ml containers having about 50 to 100 ml of media, or 500 ml containers having about 100 to 200 ml of media. For example, these small scale containers can be shake flasks. Cell culture flasks are known in the art, and are available, for example from Corning, Fisher Scientific and other suppliers.

Alternatively, cell cultures can be grown at bench scale. These include, for example, 1000 ml containers having about 300 to 1000 ml of media, 3000 ml containers having about 500 ml to 3000 ml of media, 8000 ml containers having about 2000 ml to 8000 ml of media, and 15000 ml containers having about 4000 ml to 15000 ml of media. Suitable cell culture systems are available commercially.

Cultures for manufacturing (i.e., production cell cultures) can contain 10,000 L of media or more. Large scale cell cultures or "production cell cultures", such as for manufacturing of protein therapeutics, are typically maintained for days, or even weeks, while the cells produce the desired protein(s). During this time the culture can be supplemented with a concentrated feed medium containing components, such as nutrients and amino acids, which are consumed during the course of the culture.

In some embodiments, the cell culture media is supplemented with one or more "point-of-use additions", also known as additions, point-of-use ingredients, or point-of-use chemicals, during the course of cell growth or protein production. Point-of-use additions include any one or more of a growth factor or other proteins, a buffer, an energy source, a salt, an amino acid, a metal, an osmolyte, and a chelator. Other proteins include transferrin and albumin. Growth factors, which include cytokines and chemokines, are generally known in the art and are known to stimulate cell growth, or in some cases, cellular differentiation. A growth factor is usually a protein (e.g., insulin), a small peptide, or a steroid hormone, such as estrogen, DHEA, testosterone, and the like.

In some embodiments, the cell culture media is supplemented with any one or more, or all, of the following point-of-use additions: Sodium Bicarbonate, Dextrose, L-Glutamine, L-Tyrosine, a mixture of amino acids, and Sodium Phosphate.

Buffers are generally known in the art. The invention is not restricted to any particular buffer or buffers, and any one of ordinary skill in the art can select an appropriate buffer or buffer system for use with a particular cell line producing a particular protein.

Energy sources for use as a point-of-use addition in cell culture are also well known in the art. Without limitation, in some embodiments, the point-of-use addition energy source is glucose. In other embodiments, the point-of-use addition energy source is dextrose.

Chelators are likewise well known in the art of cell culture and protein production. Tetrasodium EDTA dehydrate and citrate are two common chelators used in the art, although other chelators may be employed in the practice of this invention.

Other point-of-use additions include one or more of various metal salts, such as salts of iron, nickel, zinc and copper. In one embodiment, the cell culture media is supplemented with any one or more of copper sulfate, zinc sulfate, ferric chloride; and nickel sulfate.

Apparatuses

The disclosure provides apparatuses for use in the methods described herein.

In some embodiments, the apparatus can be used to control pH and implement pH sequences (sequences changing the pH of a sample) while also detecting and correcting errors in a pH meter used in the process. The apparatus can be used to effectively inactivate viruses in protein samples in reactors. Drawing a sample from a reactor and measuring the pH of the sample can address several issues that arise from using a probe inserted in a reactor. For example, probes often cannot be calibrated after sterilization. Sterilization can impact a probe calibration curve. Sterilization by autoclave often includes coordination with a third party, and is thus time consuming. A probe can be stored in a dry environment after sterilization, which can reduce probe performance and shelf life. Use of a probe often includes use of an additional sterile connection port. Additionally, the use of a probe includes a risk of a probe breaking and leaking reference solution into the protein product being measured by the probe.

Figure 19:
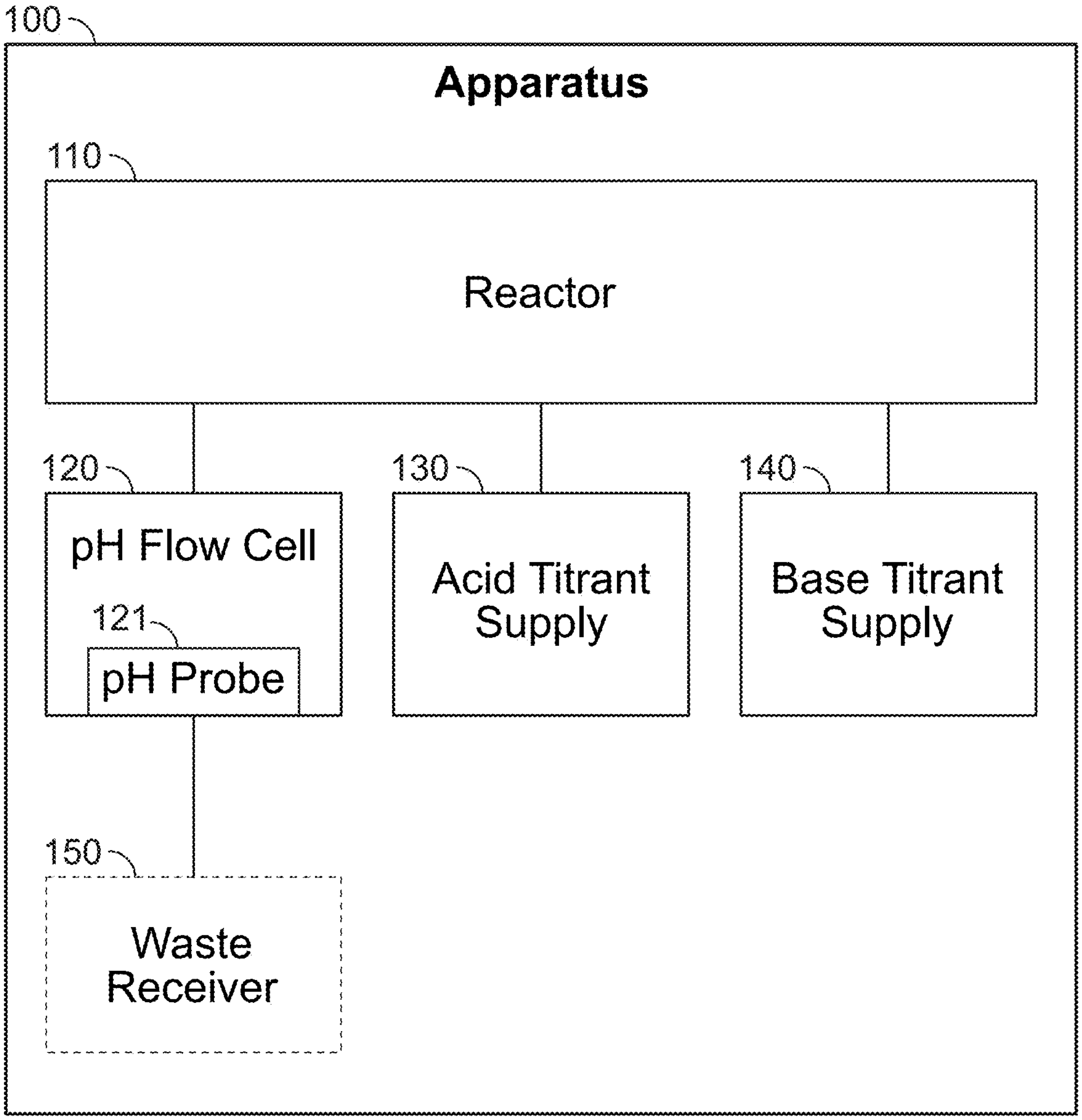
FIG. 19 is a block diagram of an apparatus for pH control, according to an embodiment.

FIG. 19 is a block diagram of an apparatus 100 for pH control, according to an embodiment. As shown, the apparatus 100 includes a reactor 110, a pH flow cell 120, an acid titrant supply 130, a base titrant supply 140, and optionally, a waste receiver 150. The pH flow cell 120 contains a pH probe 121 disposed therein to measure pH of a fluid sample in the flow cell. Lines between components represent fluidic couplings. The apparatus 100 can include one or more controllers to control any of the process units thereof. Controllers can control sequences of steps (e.g., deployment of acid titrant/base titrant). In some embodiments, the one or more controllers control sequences that can be based on pH measurements in the pH flow cell. Controllers can be accessible via a user interface. In some embodiments, the user interface can include a computer, a laptop, a mobile device, a tablet, a mobile phone, or any other suitable device.

In the reactor 110, the pH is controlled based on a user-defined sequence, for example a user-defined sequence of pH changes designed to inactivate viruses in a sample comprising purified, or partially purified protein. In some embodiments, the reactor 110 can be a batch reactor or have properties of a batch reactor. In some embodiments, the reactor 110 can be a constantly stirred tank reactor (CSTR) or have properties of a CSTR. In some embodiments, the reactor 110 can be a plug flow reactor (PFR) or have properties of a PFR. In some embodiments, the reactor 110 can include a mixer disposed therein. In some embodiments, the mixer can include an impeller. The mixer can homogenize the contents of the reactor 110 immediately before, after or during the addition of an acid titrant and/or a base titrant. In some embodiments, the mixer is controlled by the controller, i.e. the controller sends signals to the mixer to start the impeller, stop the impeller, or control the rate of the impeller. In some embodiments, the apparatus 100 can include a mixer disposed outside of the reactor 110. In other words, the mixer can be a separate unit from the reactor 110. In some embodiments, an acid mixer (not shown) can be fluidically coupled to the acid titrant supply 130 and mix acid titrant prior to adding to the reactor 110. In some embodiments, a base mixer (not shown) can be fluidically coupled to the base titrant supply 140 and mix base titrant prior to adding to the reactor 110. In some embodiments, the reactor 110 can be absent of a pH measurement probe disposed therein. The reactor 110 can be held at a desired pH via delivery of acid titrant and/or base titrant from the acid titrant supply 130 and/or the base titrant supply 140.

In some embodiments, the controller sends signals to the mixer to start the mixer before starting the acid titrant pump (for acid titrant additions), or before starting the base titrant pump (for base titrant additions). In some embodiments, the controller sends signals to the mixer to stop a fixed period of time after the acid titrant pump or the base titrant pump stops. For example, the controller can send a signal to the mixer to stop 15 seconds, 30 seconds, 1 minute, 2 minutes, 3 minutes, 4 minutes, 5 minutes, 6 minutes, 7 minutes, 8 minutes, 9 minutes, 10 minutes, 15 minutes, 30 minutes, 45 minutes or 1 hour after the acid titrant pump or base titrant pump stops.

In some embodiments, the reactor 110 can have a volume of at least about 1 L, at least about 2 L, at least about 3 L, at least about 4 L, at least about 5 L, at least about 6 L, at least about 7 L, at least about 8 L, at least about 9 L, at least about 10 L, at least about 20 L, at least about 30 L, at least about 40 L, at least about 50 L, at least about 60 L, at least about 70 L, at least about 80 L, at least about 90 L, at least about 100 L, at least about 200 L, at least about 300 L, at least about 400 L, at least about 500 L, at least about 600 L, at least about 700 L, at least about 800 L, at least about 900 L, at least about 1 $m^3$, at least about 2 $m^3$, at least about 3 $m^3$, at least about 4 $m^3$, at least about 5 $m^3$, at least about 6 $m^3$, at least about 7 $m^3$, at least about 8 $m^3$, at least about 9 $m^3$, at least about 10 $m^3$, at least about 20 $m^3$, at least about 30 $m^3$, at least about 40 $m^3$, at least about 50 $m^3$, at least about 60 $m^3$, at least about 70 $m^3$, at least about 80 $m^3$, or at least about 90 $m^3$. In some embodiments, the reactor 110 can have a volume of no more than about 100 $m^3$, no more than about 90 $m^3$, no more than about 80 $m^3$, no more than about 70 $m^3$, no more than about 60 $m^3$, no more than about 50 $m^3$, no more than about 40 $m^3$, no more than about 30 $m^3$, no more than about 20 $m^3$, no more than about 10 $m^3$, no more than about 9 $m^3$, no more than about 8 $m^3$, no more than about 7 $m^3$, no more than about 6 $m^3$, no more than about 5 $m^3$, no more than about 4 $m^3$, no more than about 3 $m^3$, no more than about 2 $m^3$, no more than about 1 $m^3$, no more than about 900 L, no more than about 800 L, no more than about 700 L, no more than about 600 L, no more than about 500 L, no more than about 400 L, no more than about 300 L, no more than about 200 L, no more than about 100 L, no more than about 90 L, no more than about 80 L, no more than about 70 L, no more than about 60 L, no more than about 50 L, no more than about 40 L, no more than about 30 L, no more than about 20 L, no more than about 10 L, no more than about 9 L, no more than about 8 L, no more than about 7 L, no more than about 6 L, no more than about 5 L, no more than about 4 L, no more than about 3 L, or no more than about 2 L.

Combinations of the above-referenced volumes of the reactor 110 are also possible (e.g., at least about 1 L and no more than about 100 $m^3$ or at least about 10 L and no more than about 500 L), inclusive of all values and ranges therebetween. In some embodiments, the reactor 110 can have a volume of about 1 L, about 2 L, about 3 L, about 4 L, about 5 L, about 6 L, about 7 L, about 8 L, about 9 L, about 10 L, about 20 L, about 30 L, about 40 L, about 50 L, about 60 L, about 70 L, about 80 L, about 90 L, about 100 L, about 200 L, about 300 L, about 400 L, about 500 L, about 600 L, about 700 L, about 800 L, about 900 L, about 1 $m^3$, about 2 $m^3$, about 3 $m^3$, about 4 $m^3$, about 5 $m^3$, about 6 $m^3$, about 7 $m^3$, about 8 $m^3$, about 9 $m^3$, about 10 $m^3$, about 20 $m^3$, about 30 $m^3$, about 40 $m^3$, about 50 $m^3$, about 60 $m^3$, about 70 $m^3$, about 80 $m^3$, about 90 $m^3$, or about 100 $m^3$. In some embodiments, the reactor 110 can include a level indicator.

In some embodiments, the pH probe 121 can be disposed in the pH flow cell 120. In some embodiments, the pH in the reactor 110 can be determined or ascertained based on a reading from the pH probe 121 in the pH flow cell 120. The pH probe 121 in the pH flow cell 120 measures a difference in electrical potential between a reference electrode and a hydrogen ion selective electrode when inserted in the effluent from the reactor 110. In other words, the hydrogen ion activity in the effluent influences the electrochemical potential between the reference electrode and the hydrogen ion selective electrode, and a pH transmitter (not shown) is calibrated to correlate a potential difference with a pH. In some embodiments, the apparatus 100 can include a pH transmitter (not shown). In some embodiments, the pH transmitter is coupled to the pH probe 121 and is configured to receive a signal produced by the pH probe 121. In some embodiments, the pH transmitter converts the signal received from the pH probe 121 to a pH measurement. In some embodiments the pH transmitter comprises a user interface configured to display a pH measurement. In some embodiments, the pH transmitter can be a separate component from the pH flow cell 120. In some embodiments, the pH transmitter can communicate the pH reading from the pH probe 121 to the controller. In some embodiments, controller sends the pH reading from the pH transmitter to a user interface (not shown) configured to display the pH reading. Based on the pH communicated by the pH transmitter, the apparatus 100 can either maintain its current operation or initiate a change in operation (e.g., addition of acid titrant from the acid titrant supply 130). In some embodiments, the change in operation can be implemented automatically. In some embodiments, the change in operation can be implemented via user input.

In some embodiments, the pH probe 121 disposed in the pH flow cell 120 can measure pH between a lower bound pH value and an upper bound pH value. In some embodiments, the lower bound pH value can be about 1.0, about 1.1, about 1.2, about 1.3, about 1.4, about 1.5, about 1.6, about 1.7, about 1.8, about 1.9, or about 2.0, inclusive of all values and ranges therebetween. In some embodiments, the upper bound pH value can be about 8.5, about 8.7, about 8.8, about 8.9, about 9.0, about 9.1, about 9.2, about 9.3, about 9.4, about 9.5, about 9.6 about 9.7, about 9.8, about 9.9, about 10.0, about 10.2, about 10.5, about 10.7, about 11.0, about 11.5, about 12.0, or about 12.5, inclusive of all values and ranges therebetween.

The pH probe measures the pH of a sample volume in the pH flow cell 120, from the reactor 110. In some embodiments, the sample volume can be at least about 0.1 mL, at least about 0.2 mL, at least about 0.3 mL, at least about 0.4 mL, at least about 0.5 mL, at least about 0.6 mL, at least about 0.7 mL, at least about 0.8 mL, at least about 0.9 mL, at least about 1 mL, at least about 2 mL, at least about 3 mL, at least about 4 mL, at least about 5 mL, at least about 6 mL, at least about 7 mL, at least about 8 mL, at least about 9 mL, at least about 10 mL, at least about 20 mL, at least about 30 mL, at least about 40 mL, at least about 50 mL, at least about 60 mL, at least about 70 mL, at least about 80 mL, at least about 90 mL, at least about 100 mL, at least about 110 mL, at least about 120 mL, at least about 130 mL, at least about 140 mL or at least about 150 mL. In some embodiments, the sample volume can be no more than about 150 mL, nor more than about 140 mL, no more than about 130 mL, no more than about 120 mL, no more than about 110 mL, no more than about 100 mL, no more than about 90 mL, no more than about 80 mL, no more than about 70 mL, no more than about 60 mL, no more than about 50 mL, no more than about 40 mL, no more than about 30 mL, no more than about 20 mL, no more than about 10 mL, no more than about 9 mL, no more than about 8 mL, no more than about 7 mL, no more than about 6 mL, no more than about 5 mL, no more than about 4 mL, no more than about 3 mL, no more than about 2 mL, no more than about 1 mL, no more than about 0.9 mL, no more than about 0.8 mL, no more than about 0.7 mL, no more than about 0.6 mL, no more than about 0.5 mL, no more than about 0.4 mL, no more than about 0.3 mL, or no more than about 0.2 mL. Combinations of the above-referenced sample volumes are also possible (e.g., at least about 0.1 mL and no more than about 100 mL or at least about 10 mL and no more than about 20 mL), inclusive of all values and ranges therebetween. In some embodiments, the sample volume can be about 0.1 mL, about 0.2 mL, about 0.3 mL, about 0.4 mL, about 0.5 mL, about 0.6 mL, about 0.7 mL, about 0.8 mL, about 0.9 mL, about 1 mL, about 2 mL, about 3 mL, about 4 mL, about 5 mL, about 6 mL, about 7 mL, about 8 mL, about 9 mL, about 10 mL, about 20 mL, about 30 mL, about 40 mL, about 50 mL, about 60 mL, about 70 mL, about 80 mL, about 90 mL, or about 100 mL.

In some embodiments, the sample volume can be a fixed volume. In some embodiments, the sample volume can be a variable volume. In some embodiments, the sample volume can change based on multiple factors, including but not limited to amount of fluid in the reactor 110, type of protein in the reactor 110, and/or size of reactor 110. In some embodiments, samples can be drawn from the reactor 110 and measured at prescribed intervals. In some embodiments, samples can be drawn from the reactor 110 and measured at spontaneous user-designated intervals.

In some embodiments, one or more controllers can trigger action(s) based on the pH value measured by the pH flow cell 120. For example, a controller can trigger delivery of acid titrant from the acid titrant supply 130 to the reactor 110 if the pH measured by the pH flow cell 120 is greater than a desired pH value. In some embodiments, a controller can trigger delivery of base titrant from the base titrant supply 140 to the reactor 110 if the pH measured by the pH flow cell 120 is less than a desired pH value. In some embodiments, the controller(s) can hold the pH at a desired value for a desired period of time. In some embodiments, the action can be triggered manually (i.e., via user interference). In some embodiments, the action can be triggered automatically (i.e., based on a prescribed sequence). In some embodiments, the prescribed sequence can include decreasing the pH in the reactor 110 to a first pH value, and then increasing the pH in the reactor to a second pH value. In some embodiments, the first pH value can be between about 3.0 and about 4.5, between about 3.5 and about 4.3, between about 3.5 and about 4.0, between about 3.1 and about 3.9, between about 3.2 and about 3.8, between about 3.3 and about 3.7, between about 3.4 and about 3.7, between about 3.3 and about 3.6, between about 3.4 and about 3.6, between about 3.4 and about 3.5, or between about 3.5 and about 3.6. In some embodiments, the second pH value can be between about 7 and about 8.5, between about 7.1 and about 8.4, between about 7.2 and about 8.3, between about 7.3 and about 8.2, between about 7.4 and about 8.2, between about 7.4 and about 8.1, between about 7.4 and about 8.0, between about 7.5 and about 8.2, between about 7.5 and about 8.1, between about 7.5 and about 8.0, between about 7.6 and about 8.1, between about 7.6 and about 8.0, between about 7.6 and about 7.9, between about 7.7 and about 8.0, between about 7.7 and about 7.9, or between about 7.7 and about 7.8.

In some embodiments, the delivery of acid titrant to reach the first pH value can be in multiple phases. In other words, the acid titrant can be added with granularity, such that the pH of the contents of the reactor 110 can be monitored finely. In some embodiments, the delivery of acid titrant to reach the first pH value can be in 1, 2, 3, 4, 5, 6, 7, 8, 9, 10, about 15, about 20, about 35, about 30, about 35, about 40, about 45, about 50, about 55, about 60, about 65, about 70, about 75, about 80, about 85, about 90, about 95, or about 100 phases, inclusive of all values and ranges therebetween. In some embodiments, the delivery of acid titrant to reach the first pH value can be in 1, 2, 3 or 4 phases. This can address the difficulty of checking pH meters, as small additions of titrant can more predictably alter the pH of the contents of the reactor 110.

In some embodiments, the delivery of base titrant to reach the second pH value can be in multiple phases. In other words, the base titrant can be added with granularity, such that the pH of the contents of the reactor 110 can be monitored finely. In some embodiments, the delivery of base titrant to reach the second pH value can be in 1, 2, 3, 4, 5, 6, 7, 8, 9, 10, about 15, about 20, about 35, about 30, about 35, about 40, about 45, about 50, about 55, about 60, about 65, about 70, about 75, about 80, about 85, about 90, about 95, or about 100 phases, inclusive of all values and ranges therebetween. In some embodiments, the delivery of base titrant to reach the second pH value can be in 1, 2, 3, or 4 phases.

Acid titrant can be delivered from the acid titrant supply 130 when desired. In some embodiments, the acid titrant can be delivered via a pump (not shown). In some embodiments, the acid titrant supply 130 can include a container. In some embodiments, the acid titrant supply 130 can include a tank. In some embodiments, the acid titrant supply 130 can have a volume of at least about 10 mL, at least about 20 mL, at least about 30 mL, at least about 40 mL, at least about 50 mL, at least about 60 mL, at least about 70 mL, at least about 80 mL, at least about 90 mL, at least about 100 mL, at least about 200 mL, at least about 300 mL, at least about 400 mL, at least about 500 mL, at least about 600 mL, at least about 700 mL, at least about 800 mL, at least about 900 mL, at least about 1 L, at least about 2 L, at least about 3 L, at least about 4 L, at least about 5 L, at least about 6 L, at least about 7 L, at least about 8 L, at least about 9 L, at least about 10 L, at least about 20 L, at least about 30 L, at least about 40 L, at least about 50 L, at least about 60 L, at least about 70 L, at least about 80 L, at least about 90 L, at least about 100 L, at least about 200 L, at least about 300 L, at least about 400 L, at least about 500 L, at least about 600 L, at least about 700 L, at least about 800 L, at least about 900 L, at least about 1 $m^3$, at least about 2 $m^3$, at least about 3 $m^3$, at least about 4 $m^3$, at least about 5 $m^3$, at least about 6 $m^3$, at least about 7 $m^3$, at least about 8 $m^3$, or at least about 9 $m^3$. In some embodiments, the acid titrant supply 130 can have a volume of no more than about 10 $m^3$, no more than about 9 $m^3$, no more than about 8 $m^3$, no more than about 7 $m^3$, no more than about 6 $m^3$, no more than about 5 $m^3$, no more than about 4 $m^3$, no more than about 3 $m^3$, no more than about 2 $m^3$, no more than about 1 $m^3$, no more than about 900 L, no more than about 800 L, no more than about 700 L, no more than about 600 L, no more than about 500 L, no more than about 400 L, no more than about 300 L, no more than about 200 L, no more than about 100 L, no more than about 90 L, no more than about 80 L, no more than about 70 L, no more than about 60 L, no more than about 50 L, no more than about 40 L, no more than about 30 L, no more than about 20 L, no more than about 10 L, no more than about 9 L, no more than about 8 L, no more than about 7 L, no more than about 6 L, no more than about 5 L, no more than about 4 L, no more than about 3 L, no more than about 2 L, no more than about 1 L, no more than about 900 mL, no more than about 800 mL, no more than about 700 mL, no more than about 600 mL, no more than about 500 mL, no more than about 400 mL, no more than about 300 mL, no more than about 200 mL, no more than about 100 mL, no more than about 90 mL, no more than about 80 mL, no more than about 70 mL, no more than about 60 mL, no more than about 50 mL, no more than about 40 mL, no more than about 30 mL, or no more than about 20 mL.

Combinations of the above-referenced volumes of the acid titrant supply 130 are also possible (e.g., at least about 10 mL and no more than about 10 $m^3$ or at least about 1 L and no more than about 5 L), inclusive of all values and ranges therebetween. In some embodiments, the acid titrant supply 130 can have a volume of about 10 mL, about 20 mL, about 30 mL, about 40 mL, about 50 mL, about 60 mL, about 70 mL, about 80 mL, about 90 mL, about 100 mL, about 200 mL, about 300 mL, about 400 mL, about 500 mL, about 600 mL, about 700 mL, about 800 mL, about 900 mL, about 1 L, about 2 L, about 3 L, about 4 L, about 5 L, about 6 L, about 7 L, about 8 L, about 9 L, about 10 L, about 20 L, about 30 L, about 40 L, about 50 L, about 60 L, about 70 L, about 80 L, about 90 L, about 100 L, about 200 L, about 300 L, about 400 L, about 500 L, about 600 L, about 700 L, about 800 L, about 900 L, about 1 $m^3$, about 2 $m^3$, about 3 $m^3$, about 4 $m^3$, about 5 $m^3$, about 6 $m^3$, about 7 $m^3$, about 8 $m^3$, or about 9 $m^3$, or about 10 $m^3$.

In some embodiments, the acid titrant supply 130 can be maintained at a pH of at least about 0.5, at least about 1, at least about 1.5, at least about 2, at least about 2.5, at least about 3, at least about 3.5, at least about 4, at least about 4.5, at least about 5, at least about 5.5, at least about 6, or at least about 6.5. In some embodiments, the acid titrant supply 130 can be maintained at a pH of no more than about 7, no more than about 6.5, no more than about 6, no more than about 5.5, no more than about 5, no more than about 4.5, no more than about 4, no more than about 3.5, no more than about 3, no more than about 2.5, no more than about 2, no more than about 1.5, no more than about 1, or no more than about 0.5. Combinations of the above-referenced pH values in the acid titrant supply 130 are also possible (e.g., at least about 0.5 and no more than about 7 or at least about 2 and no more than about 6), inclusive of all values and ranges therebetween. In some embodiments, the acid titrant supply 130 can be maintained at a pH of about 0, about 0.5, about 1, about 1.5, about 2, about 2.5, about 3, about 3.5, about 4, about 4.5, about 5, about 5.5, about 6, about 6.5, or about 7.

Base titrant can be delivered from the base titrant supply 140 when desired. In some embodiments, the base titrant can be delivered via a pump (not shown). In some embodiments, the base titrant supply 140 can include a container. In some embodiments, the base titrant supply 140 can include a tank. In some embodiments, the base titrant supply 140 can have a volume of at least about 10 mL, at least about 20 mL, at least about 30 mL, at least about 40 mL, at least about 50 mL, at least about 60 mL, at least about 70 mL, at least about 80 mL, at least about 90 mL, at least about 100 mL, at least about 200 mL, at least about 300 mL, at least about 400 mL, at least about 500 mL, at least about 600 mL, at least about 700 mL, at least about 800 mL, at least about 900 mL, at least about 1 L, at least about 2 L, at least about 3 L, at least about 4 L, at least about 5 L, at least about 6 L, at least about 7 L, at least about 8 L, at least about 9 L, at least about 10 L, at least about 20 L, at least about 30 L, at least about 40 L, at least about 50 L, at least about 60 L, at least about 70 L, at least about 80 L, at least about 90 L, at least about 100 L, at least about 200 L, at least about 300 L, at least about 400 L, at least about 500 L, at least about 600 L, at least about 700 L, at least about 800 L, at least about 900 L, at least about 1 $m^3$, at least about 2 $m^3$, at least about 3 $m^3$, at least about 4 $m^3$, at least about 5 $m^3$, at least about 6 $m^3$, at least about 7 $m^3$, at least about 8 $m^3$, or at least about 9 $m^3$. In some embodiments, the base titrant supply 140 can have a volume of no more than about 10 $m^3$, no more than about 9 $m^3$, no more than about 8 $m^3$, no more than about 7 $m^3$, no more than about 6 $m^3$, no more than about 5 $m^3$, no more than about 4 $m^3$, no more than about 3 $m^3$, no more than about 2 $m^3$, no more than about 1 $m^3$, no more than about 900 L, no more than about 800 L, no more than about 700 L, no more than about 600 L, no more than about 500 L, no more than about 400 L, no more than about 300 L, no more than about 200 L, no more than about 100 L, no more than about 90 L, no more than about 80 L, no more than about 70 L, no more than about 60 L, no more than about 50 L, no more than about 40 L, no more than about 30 L, no more than about 20 L, no more than about 10 L, no more than about 9 L, no more than about 8 L, no more than about 7 L, no more than about 6 L, no more than about 5 L, no more than about 4 L, no more than about 3 L, no more than about 2 L, no more than about 1 L, no more than about 900 mL, no more than about 800 mL, no more than about 700 mL, no more than about 600 mL, no more than about 500 mL, no more than about 400 mL, no more than about 300 mL, no more than about 200 mL, no more than about 100 mL, no more than about 90 mL, no more than about 80 mL, no more than about 70 mL, no more than about 60 mL, no more than about 50 mL, no more than about 40 mL, no more than about 30 mL, or no more than about 20 mL.

Combinations of the above-referenced volumes of the base titrant supply 140 are also possible (e.g., at least about 10 mL and no more than about 10 $m^3$ or at least about 1 L and no more than about 5 L), inclusive of all values and ranges therebetween. In some embodiments, the base titrant supply 140 can have a volume of about 10 mL, about 20 mL, about 30 mL, about 40 mL, about 50 mL, about 60 mL, about 70 mL, about 80 mL, about 90 mL, about 100 mL, about 200 mL, about 300 mL, about 400 mL, about 500 mL, about 600 mL, about 700 mL, about 800 mL, about 900 mL, about 1 L, about 2 L, about 3 L, about 4 L, about 5 L, about 6 L, about 7 L, about 8 L, about 9 L, about 10 L, about 20 L, about 30 L, about 40 L, about 50 L, about 60 L, about 70 L, about 80 L, about 90 L, about 100 L, about 200 L, about 300 L, about 400 L, about 500 L, about 600 L, about 700 L, about 800 L, about 900 L, about 1 $m^3$, about 2 $m^3$, about 3 $m^3$, about 4 $m^3$, about 5 $m^3$, about 6 $m^3$, about 7 $m^3$, about 8 $m^3$, or about 9 $m^3$, or about 10 $m^3$.

In some embodiments, the base titrant supply 140 can be maintained at a pH of at least about 7, at least about 7.5, at least about 8, at least about 8.5, at least about 9, at least about 9.5, at least about 10, at least about 10.5, at least about 11, at least about 11.5, at least about 12, at least about 12.5, at least about 13, or at least about 13.5. In some embodiments, the base titrant supply 140 can be maintained at a pH of no more than about 14, no more than about 13.5, no more than about 13, no more than about 12.5, no more than about 12, no more than about 11.5, no more than about 11, no more than about 10.5, no more than about 10, no more than about 9.5, no more than about 9, no more than about 8.5, no more than about 8, or no more than about 7.5. Combinations of the above-referenced pH values in the base titrant supply 140 are also possible (e.g., at least about 7.5 and no more than about 14 or at least about 8 and no more than about 10), inclusive of all values and ranges therebetween. In some embodiments, the base titrant supply 140 can be maintained at a pH of about 7, about 7.5, about 8, about 8.5, about 9, about 9.5, about 10, about 10.5, about 11, about 11.5, about 12, about 12.5, about 13, about 13.5, or about 14.

The waste receiver 150 is optional and can receive effluent from a sample measured in the pH flow cell 120. In some embodiments, the waste receiver 150 can include a container, a tank, a treatment facility, or any other suitable device that can receive the effluent from the pH flow cell 120.

Figure 20:
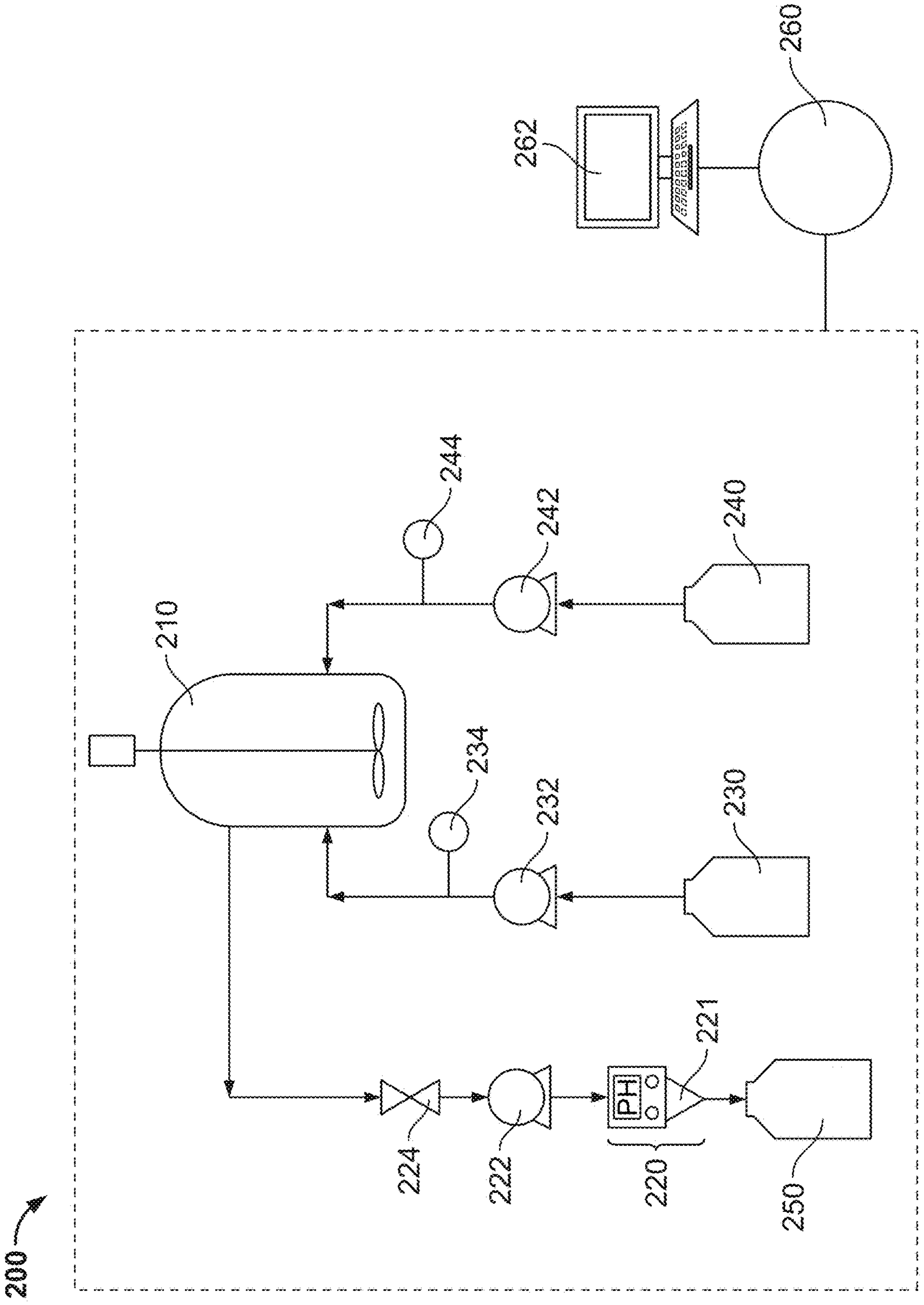
FIG. 20 is a schematic diagram of an apparatus for pH control, according to an embodiment.

FIG. 20 is a schematic diagram of an apparatus 200 for pH control, according to an embodiment. As shown, the apparatus 200 includes a reactor 210, a pH flow cell 220 with a pH probe 221, a sampling pump 222, a check valve 224 (also known as a non-return valve), an acid titrant supply 230, an acid titrant pump 232, an acid titrant flowmeter 234, a base titrant supply 240, a base titrant pump 242, a base titrant flowmeter 244, a waste receiver 250, a controller 260, and a user interface 262. In some embodiments, the check value 224 allows flow in only one direction, out of the reactor 210, thereby preventing contamination of the reactor 210 by the volume of sample in the pH flow cell 220. In some embodiments, the reactor 210, the pH flow cell 220, the acid titrant supply 230, the base titrant supply 240, and the waste receiver 250 can be the same or substantially similar to the reactor 110, the pH flow cell 120, the acid titrant supply 130, the base titrant supply 140, and the waste receiver 150, as described above with reference to FIG. 19. Thus, certain aspects of the reactor 210, the pH flow cell 220, the acid titrant supply 230, the base titrant supply 240, and the waste receiver 250 are not described in greater detail herein. As shown, arrows represent flow of fluids.

As shown, a stream can flow from the reactor 210 to the waste receiver 250. The reactor 210 receives streams from the acid titrant supply 230 and the base titrant supply 240. In some embodiments, the reactor 210 can include a mixer disposed therein. In some embodiments, the apparatus 200 can include one or more mixers external to the reactor 210.

In some embodiments, the pH flow cell 220 can be a Mettler Toledo pH flow cell. In some embodiments, the pH probe 221 can be disposed in the pH flow cell 220. Exemplary pH probes suitable for the apparatuses described herein include in-line pH probes from Mettler Toledo, Thermo Fisher Scientific or Cole-Parmer. In some embodiments, the pH probe 221 is coupled to a pH transmitter. The pH transmitter can be, for example, a Mettler Toledo M400 pH transmitter. In some embodiments, the pH transmitter can visually display a pH reading thereon. In some embodiments, the pH transmitter conveys the pH reading to the controller 260. In some embodiments, the controller 260 communicates the pH reading to the user interface 262, which displays the pH reading. In some embodiments, the pH transmitter can communicate the pH reading to the user interface 262. Flow through the flow cell 220 can be controlled by the sampling pump 222.

The sampling pump 222 pumps a volume of sample fluid (i.e., a slip stream) from the reactor 210, such that the volume of sample fluid can enter the pH flow cell 220. In some embodiments, the sampling pump 222 can include a peristaltic pump, a diaphragm pump, a gear pump, a lobe pump, a piston pump, a centrifugal pump, or any other suitable pump or combinations thereof. In some embodiments, the sampling pump 222 can include a Watson-Marlow 120 pump.

The check valve 224 allows flow in only one direction, out of the reactor 210, thereby preventing contamination of the reactor 210 by the volume of sample in the flow cell 220. As shown, the valve 224 is upstream of the sampling pump 222. In some embodiments, the apparatus 200 can include a shutoff valve (not shown) downstream of the reactor 210 and fluidically coupled to the reactor 210. In some embodiments, the shutoff valve can be physically coupled to the reactor. The acid titrant supply 230 contains an acid titrant. The acid titrant can be drawn out of the acid titrant supply 230 via the acid titrant pump 232. The acid titrant pump 232 draws fluid from the acid titrant supply 230 and facilitates flow of the acid titrant to the reactor 210. In some embodiments, the acid titrant pump 232 can facilitate an acid titrant flow rate of at least about 1 mL/min, at least about 2 mL/min, at least about 3 mL/min, at least about 4 mL/min, at least about 5 mL/min, at least about 6 mL/min, at least about 7 mL/min, at least about 8 mL/min, at least about 9 mL/min, at least about 10 mL/min, at least about 20 mL/min, at least about 30 mL/min, at least about 40 mL/min, at least about 50 mL/min, at least about 60 mL/min, at least about 70 mL/min, at least about 80 mL/min, at least about 90 mL/min, at least about 100 mL/min, at least about 200 mL/min, at least about 300 mL/min, at least about 400 mL/min, at least about 500 mL/min, at least about 600 mL/min, at least about 700 mL/min, at least about 800 mL/min, at least about 900 mL/min, at least about 1 L/min, at least about 2 L/min, at least about 5 L/min, at least about 10 L/min, at least about 20 L/min, at least about 30 L/min, at least about 40 L/min, or at least about 50 L/min. In some embodiments, the acid titrant pump 232 can facilitate an acid titrant flow rate of no more than about 50 L/min, no more than about 40 L/min, no more than about 30 L/min, no more than about 20 L/min, no more than about 10 L/min, no more than about 5 L/min, no more than about 2 L/min, no more than about 1 L/min, no more than about 900 mL/min, no more than about 800 mL/min, no more than about 700 mL/min, no more than about 600 mL/min, no more than about 500 mL/min, no more than about 400 mL/min, no more than about 300 mL/min, no more than about 200 mL/min, no more than about 100 mL/min, no more than about 90 mL/min, no more than about 80 mL/min, no more than about 70 mL/min, no more than about 60 mL/min, no more than about 50 mL/min, no more than about 40 mL/min, no more than about 30 mL/min, no more than about 20 mL/min, no more than about 10 mL/min, no more than about 9 mL/min, no more than about 8 mL/min, no more than about 7 mL/min, no more than about 6 mL/min, no more than about 5 mL/min, no more than about 4 mL/min, no more than about 3 mL/min, or no more than about 2 mL/min.

Combinations of the above-referenced acid titrant flow rates are also possible (e.g., at least about 1 mL/min and no more than about 1 L/min or at least about 10 mL/min and no more than about 50 mL/min), inclusive of all values and ranges therebetween. In some embodiments, the acid titrant pump 232 can facilitate an acid titrant flow rate of about 1 mL/min, about 2 mL/min, about 3 mL/min, about 4 mL/min, about 5 mL/min, about 6 mL/min, about 7 mL/min, about 8 mL/min, about 9 mL/min, about 10 mL/min, about 20 mL/min, about 30 mL/min, about 40 mL/min, about 50 mL/min, about 60 mL/min, about 70 mL/min, about 80 mL/min, about 90 mL/min, about 100 mL/min, about 200 mL/min, about 300 mL/min, about 400 mL/min, about 500 mL/min, about 600 mL/min, about 700 mL/min, about 800 mL/min, about 900 mL/min, or about 1 L/min.

The flow rate of the acid titrant can be measured by the acid titrant flowmeter 234. In some embodiments, the acid titrant flowmeter 234 can include an ultrasonic meter, a vortex mixer, a magnetic meter, a Coriolis mater, or any other suitable flow meter or combinations thereof. Suitable acid titrant flowmeters are available commercially, for example the acid titrant flowmeter 234 can include a Sonotec ultrasonic flowmeter.

In some embodiments, the acid titrant pump 232 can include a peristaltic pump, a diaphragm pump, a gear pump, a lobe pump, a piston pump, a centrifugal pump, or any other suitable pump, or combinations thereof. Suitable acid titrant pumps (232) are available commercially, for example a Watson-Marlow 530 pump.

The base titrant supply 240 contains a base titrant. The base titrant can be drawn out of the base titrant supply 240 via the base titrant pump 242. The base titrant pump 242 draws fluid from the base titrant supply 240 and facilitates flow of the base titrant to the reactor 210. In some embodiments, the base titrant pump 242 can facilitate a base titrant flow rate of at least about 1 mL/min, at least about 2 mL/min, at least about 3 mL/min, at least about 4 mL/min, at least about 5 mL/min, at least about 6 mL/min, at least about 7 mL/min, at least about 8 mL/min, at least about 9 mL/min, at least about 10 mL/min, at least about 20 mL/min, at least about 30 mL/min, at least about 40 mL/min, at least about 50 mL/min, at least about 60 mL/min, at least about 70 mL/min, at least about 80 mL/min, at least about 90 mL/min, at least about 100 mL/min, at least about 200 mL/min, at least about 300 mL/min, at least about 400 mL/min, at least about 500 mL/min, at least about 600 mL/min, at least about 700 mL/min, at least about 800 mL/min, at least about 900 mL/min, at least about 1 L/min, at least about 2 L/min, at least about 5 L/min, at least about 10 L/min, at least about 20 L/min, at least about 30 L/min, at least about 40 L/min, or at least about 50 L/min. In some embodiments, the base titrant pump 242 can facilitate an acid titrant flow rate of no more than about 50 L/min, no more than about 40 L/min, no more than about 30 L/min, no more than about 20 L/min, no more than about 10 L/min, no more than about 5 L/min, no more than about 2 L/min, no more than about 1 L/min, no more than about 900 mL/min, no more than about 800 mL/min, no more than about 700 mL/min, no more than about 600 mL/min, no more than about 500 mL/min, no more than about 400 mL/min, no more than about 300 mL/min, no more than about 200 mL/min, no more than about 100 mL/min, no more than about 90 mL/min, no more than about 80 mL/min, no more than about 70 mL/min, no more than about 60 mL/min, no more than about 50 mL/min, no more than about 40 mL/min, no more than about 30 mL/min, no more than about 20 mL/min, no more than about 10 mL/min, no more than about 9 mL/min, no more than about 8 mL/min, no more than about 7 mL/min, no more than about 6 mL/min, no more than about 5 mL/min, no more than about 4 mL/min, no more than about 3 mL/min, or no more than about 2 mL/min.

Combinations of the above-referenced base titrant flow rates are also possible (e.g., at least about 1 mL/min and no more than about 1 L/min or at least about 10 mL/min and no more than about 50 mL/min), inclusive of all values and ranges therebetween. In some embodiments, the base titrant pump 242 can facilitate a base titrant flow rate of about 1 mL/min, about 2 mL/min, about 3 mL/min, about 4 mL/min, about 5 mL/min, about 6 mL/min, about 7 mL/min, about 8 mL/min, about 9 mL/min, about 10 mL/min, about 20 mL/min, about 30 mL/min, about 40 mL/min, about 50 mL/min, about 60 mL/min, about 70 mL/min, about 80 mL/min, about 90 mL/min, about 100 mL/min, about 200 mL/min, about 300 mL/min, about 400 mL/min, about 500 mL/min, about 600 mL/min, about 700 mL/min, about 800 mL/min, about 900 mL/min, or about 1 L/min.

The flow rate of the base titrant can be measured by the base titrant flowmeter 244. In some embodiments, the base titrant flowmeter 244 can include an ultrasonic meter, a vortex mixer, a magnetic meter, a Coriolis mater, or any other suitable flow meter or combinations thereof. Suitable base titrant flowmeters are available commercially, for example the base titrant flowmeter 244 can include a Sonotec ultrasonic flowmeter.

In some embodiments, the base titrant pump 242 can include a peristaltic pump, a diaphragm pump, a gear pump, a lobe pump, a piston pump, a centrifugal pump, or any other suitable pump, or combinations thereof. Suitable base titrant pumps are available commercially for example the base titrant pump 242 can include a Watson-Marlow 530 pump.

As shown, the dotted box surrounds the components, over which the user interface 262 can exhibit some level of control. In other words, the user interface 262 can act via the controller 260 or multiple controllers to control any of the components of the apparatus 200. In some embodiments, the user interface 262 can be in communication with and can exercise control over the reactor 210, the pH flow cell 220, the sampling pump 222, the valve 224, the acid titrant supply 230, the acid titrant pump 232, the acid titrant flowmeter 234, the base titrant supply 240, the base titrant pump 242, the base titrant flowmeter 244, and/or the waste receiver 250. In some embodiments, control of either of the aforementioned components can be user-initiated. In other words, the user can manually control either of the components of the apparatus 200 to initiate an action in at least one of the components. In some embodiments, control of either of the components of the apparatus 200 can be automatic in response to a condition in the apparatus 200 (e.g., the pH measured in the pH flow cell 220). In some embodiments, control of either of the components of the apparatus 200 can be without any user involvement. In some embodiments, the user can send instructions to the controller 260 via the user interface 262 to control or advance a pre-programmed pH sequence or add a pre-determined amount of acid titrant or base titrant.

In some embodiments, the controller 260 can be in communication with the acid titrant flowmeter 234, the base titrant flowmeter 244, the pH probe 221, the acid titrant pump 232, and/or the base titrant pump 242. In some embodiments, the controller 260 can receive a signal from the acid titrant flowmeter 244, whereby the controller 260 determines an amount of acid titrant to add to the sample. In some embodiments, the controller 260 can receive a signal from the base titrant flowmeter 244, whereby the controller 260 determines an amount of base titrant to add to the sample. In some embodiments, the controller 260 can receive a signal from the pH probe 221, whereby the signal conveys a pH measurement to the controller 260, and the controller 260 relates the pH measurement to the corresponding amount of acid titrant or base titrant to add to the sample. In some embodiments, the controller 260 can send a signal to the acid titrant pump 232 to start the pump, stop the pump, or change the pump speed. In some embodiments, the controller 260 can send a signal to the base titrant pump 242 to start the pump, stop the pump, or change the pump speed. In some embodiments, the controller 260 can apply a model to the pH measurement and the corresponding amount of acid or base titrant added to the sample.

In some embodiments, the user interface 262 can communicate with the reactor 210 and/or the mixer disposed therein via the controller 260. In some embodiments, the controller 260 can communicate with the mixer to control timing of mixing and mixing speed. For example, the controller 260 can send a signal to a mixer to initiate immediately before and during the addition of acid titrant and/or base titrant. Mixing during titrant addition can prevent volumes of high titrant concentration from occurring in the sample, which can potentially damage the sample. In some embodiments, the timing of the mixing can be modified based on how much acid titrant and/or base titrant was added. In some embodiments, the controller 260 can communicate with the valve 224 to stop or allow flow of sampling fluid therethrough. In some embodiments, the controller 260 can communicate with the sampling pump 222 to activate pumping of sampling fluid therethrough or to change the flow rate of sampling fluid therethrough. In some embodiments, orders to the sampling pump 222 and the valve 224 can be based on data communicated to the user interface 262 via the pH transmitter and controller 260. T The controller 260 is configured to receive signals from, and send instructions to, the components of the apparatuses described herein. In some embodiments, the controller 260 can communicate with the acid titrant pump 232 to pump acid titrant therethrough. For example, the controller 260 sends a signal that starts the acid titrant pump 232, stops the acid titrant pump, or changes the speed of the acid titrant pump. In some embodiments, communication to the acid titrant pump 232 can be based on data communicated to the controller 260 via the pH transmitter and/or the acid titrant flowmeter 234. In some embodiments, the controller 260 can communicate with the base titrant pump 242 to pump base titrant therethrough. For example, the controller 260 sends a signal that starts the base titrant pump 242, stops the base titrant pump, or changes the speed of the base titrant pump. In some embodiments, communication to the base titrant pump 242 can be based on data communicated to the controller 260 via the pH transmitter and/or the base titrant flowmeter 244. In some embodiments, the controller 260 is configured to receive a pH value from the pH probe 221 (for example, via the pH transmitter), and the controller 260 applies a mathematical model to the pH value to the corresponding amount of acid or base titrant added to the sample at the time the pH was measured. In some embodiments, the controller 260 is configured to apply the model described herein to one or more pH values, and corresponding amounts of titrant added to the sample. In some embodiments, the controller 260 is configured to determine the remaining amount of titrant to be added to the sample to reach a target pH from the measured pH value(s), the amount of titrant added to the sample, and the model. Optionally, these steps can be repeated one or more times until a final target pH is reached. For example, the controller 260 is configured to receive an initial pH reading, send a signal to the acid or base titrant pump 242 whereby a predetermined amount of acid or base titrant is added to the sample, after which the pH probe 221 takes a reading and sends to the measured pH value to the controller 260 via the pH transmitter. The controller 260 then applies the model to the initial pH value, measured pH value after titrant addition, and amount of titrant added to the sample, and determines an additional amount of titrant to add to the sample. In some embodiments, for example where there is a pre-determined pH sequence, the controller 260 can send instructions to advance the pH sequence automatically. In other embodiments, the user instructs the controller 260 to advance the pH sequence through the user interface, and the controller 260 relays said instructions to the apparatus, e.g. by activating the acid titrant pump 232 or base titrant pump 242, taking a pH reading and the like.

In some embodiments, the controller 260 can include a server, computer, a laptop, a mobile device, a tablet, a mobile phone, or any other suitable device. The controller 260 can include one or more central processing units ("processors"), memory, and input/output devices. In certain embodiments, the controller 260 includes one or more memory and/or storage devices. The memory and storage devices can be one or more computer-readable storage media that may store computer-executable instructions that implement at least portions of the various embodiments described herein. In some embodiments, the controller 260 includes a computer-readable storage medium which stores computer-executable instructions that include, but are not limited to, instructions to activate, stop or change the speed of the acid titrant pump 232, instructions to activate, stop or change the speed of the base titrant pump 242, instructions to receive and store pH values from the pH probe 221 and/or pH transmitter, and instructions to receive and store data from the acid titrant flowmeter 234 and/or the base titrant flowmeter 244. In some embodiments, the computer-executable instructions include instructions to receive and store user entered pH values, for example offline pH values measured and entered by the user when an error in the pH probe 221 disposed in the pH flow cell 220 is detected. In some embodiments, the computer-executable instructions include instructions to calculate an amount of acid or base titrant added to the sample from data from the acid titrant flowmeter 234 or the base titrant flowmeter 244 and, optionally, the acid titrant pump 232 or the base titrant pump 242. In some embodiments, the computer-executable instructions include instructions to apply the models described herein to the pH values and amounts of titrant added the sample. In some embodiments, the computer-executable instructions include instructions to execute one or more steps of a pH sequence, optionally in response to commands from a user through the user interface. In some embodiments, the controller 260 includes a processor configured to execute the instructions described supra.

The disclosure provides a user interface 262 configured to receive signals from, and send instructions to, the controller 260. In some embodiments, the user interface 262 is an industrial human machine interface. Suitable user interfaces include visual interfaces (computer monitors, flat screens, touch screens and the like), as well as a keyboard, pointing device such as a mouse, and equivalents. In some embodiments, the user interface 262 is configured to display pH measurements from the controller 260. In some embodiments, the user interface 262 is configured to receive one or more offline pH measurements from the user. In some embodiments, the user interface 262 is configured to receive instructions from the user whereby instructions are sent to the controller 260 to advance a pH sequence.

In some embodiments, the user interface is configured to display a warning signal and/or pause the pH sequence or addition of titrant when the pH measurement from the pH probe differs from a pH measurement predicted by a model. For example, when the user interface comprises a graphical interface, the user interface can display a warning signal on the graphical interface. In some embodiments, the warning signal is displayed when the difference between pH measurement and the model is >0.01 pH units, >0.02 pH units, >0.03 pH units, >0.04 pH units, >0.05 pH units, >0.06 pH units, >0.07 pH units, >0.08 pH units, >0.09 pH units or >0.10 pH units. In some embodiments, the warning signal is displayed when the difference between pH measurement and the model is >0.05 pH units.

The present description sets forth numerous exemplary configurations, methods, parameters, and the like. It should be recognized, however, that such description is not intended as a limitation on the scope of the present disclosure, but is instead provided as a description of exemplary embodiments. Embodiments of the present subject matter described above may be beneficial alone or in combination, with one or more other aspects or embodiments. Without limiting the foregoing description, certain non-limiting embodiments of the disclosure are provided below. As will be apparent to those of skill in the art upon reading this disclosure, each of the individually numbered embodiments may be used or combined with any of the preceding or following individually numbered embodiments. This is intended to provide support for all such combinations of embodiments and is not limited to combinations of embodiments explicitly provided below.

Enumerated Embodiments

The invention can be understood with respect to the following enumerated embodiments:

1. A method comprising:
   (a) measuring an initial pH ($pH_{initial}$) of a sample;
   (b) adding a first amount of titrant ($Titrant_n$) to the sample and measuring a first additional pH value ($pH_n$), $Titrant_n$ being the amount of titrant added to the sample to reach $pH_n$, wherein $pH_n$ is different from $pH_{initial}$;
   (c) applying a model to determine a normalized initial amount of Titrant ($Titrant_{initial}$) and normalized $Titrant_n$, wherein the model relates the normalized titrant added to the sample to pH of the sample;
   (d) adding a second amount of titrant to the sample to reach a second pH value ($pH_{n+1}$), wherein the second amount of titrant is determined from $pH_{initial}$, $pH_n$, normalized $Titrant_{initial}$ and normalized $Titrant_n$;
   (e) measuring the pH of the sample after the addition of the second amount of titrant to determine $pH_{n+1}$ as measured; and
   (f) correcting a pH meter used to measure the pH of the sample when a difference between $pH_{n+1}$ as measured and $pH_{n+1}$ from the model indicates a calibration error in the pH meter.
2. The method of embodiment 1, wherein the difference between $pH_{n+1}$ as measured and $pH_{n+1}$ from the model is >0.01 pH units, >0.02 pH units, >0.03 pH units, >0.04 pH units, >0.05 pH units, >0.06 pH units, >0.07 pH units, >0.08 pH units, >0.09 pH units or >0.10 pH units.
3. The method of embodiment 1, wherein the difference between $pH_{n+1}$ as measured and $pH_{n+1}$ from the model is >0.05 pH units.
4. The method of any one of embodiments 1-3, comprising adding a third amount of titrant ($Titrant_{n+2}$) to the sample and measuring a third additional pH ($pH_{n+2}$), and repeating steps (c) through (e), wherein a difference between $pH_{n+2}$ as measured and $pH_{n+2}$ from the model indicates a calibration error in the pH meter.
5. The method of embodiment 4, wherein the difference between $pH_{n+2}$ and the model is >0.01 pH units, >0.02 pH units, >0.03 pH units, >0.04 pH units, >0.05 pH units, >0.06 pH units, >0.07 pH units, >0.08 pH units, >0.09 pH units or >0.10 pH units.

6. The method of embodiment 4, wherein the difference between $pH_{n+2}$ and the model is >0.05 pH units.
7. The method of embodiment 1, comprising repeating steps (d) through (f) until a final pH is reached.
8. The method of embodiment 7, comprising repeating steps (d) through (f) at least 1, 2, 3, 4, 5, 6, 7, 8, 9 or 10 times.
9. The method of embodiment 7 or 8, wherein a difference between the pH as measured and a pH from the model at any repetition that is >0.01 pH units, >0.02 pH units, >0.03 pH units, >0.04 pH units, >0.05 pH units, >0.06 pH units, >0.07 pH units, >0.08 pH units, >0.09 pH units or >0.10 pH units indicates a calibration error in the pH meter.
10. The method of any one of embodiments 1-9, comprising:
  (i) generating at least one reference titration curve from at least one reference sample relating an amount of titrant added to the reference sample to the pH of the reference sample;
  (ii) optionally normalizing the at least one reference titration curve; and
  (ii) generating the model to fit the at least one reference titration curve.
11. The method of embodiment 10, wherein generating the at least one reference titration curve comprises:
  (i) measuring an initial pH of the reference sample ($pH_{initial\_ref}$);
  (ii) adding an amount of titrant to the reference sample ($Titrant_{n\_ref}$) and measuring an additional reference pH value ($pH_{n\_ref}$), $Titrant_{n\_ref}$ being the amount of titrant added to the sample to reach $pH_{n\_ref}$, wherein $pH_{n\_ref}$ is different from $pH_{initial\_ref}$;
  (iii) repeating step (ii) until the at least one reference sample reaches a final pH ($pH_{final\_ref}$) by adding a total amount of titrant to the reference sample ($Titrant_{tot\_ref}$); and
  (iv) plotting amount of titrant added versus pH of the reference sample.
12. The method of embodiment 10 or 11, wherein titrant is added to the reference sample in discrete steps during a plurality of time periods.
13. The method of embodiment 10 or 11, wherein titrant is added continuously to the reference sample.
14. The method of any one of embodiments 10-12, wherein the pH of the reference sample is measured by a pH probe inserted directly into the reference sample.
15. The method of any one of embodiments 10-12, wherein the pH of the reference sample is measured by a pH probe inserted into a continuous or discretely sampled slip stream from the reference sample.
16. The method of anyone of embodiments 10-15, comprising correcting for pH meter calibration when generating the model.
17. The method of embodiment 16, wherein correcting for pH meter calibration comprises:
(a) removing a first portion of the reference sample prior to the addition of titrant, and measuring the pH of said first portion with an independently calibrated pH meter thereby generating an offline initial pH value ($pH_{initial\_off\_ref}$);
(b) removing a second portion of the reference sample after the addition of the total amount of titrant and measuring the pH of said second portion with an independently calibrated pH meter thereby generating an offline final pH value ($pH_{final\_off\_ref}$); and (c) applying the relationship between the offline pH value and measured pH value to determine a corrected pH for the reference sample.
18. The method of embodiment 17, wherein a corrected $pH_{n\_ref}$ for the reference sample is determined by:

$$pH_{initial\_off\_ref} + (pH_{final\_off\_ref} - pH_{initial\_off\_ref}) \times \left( \frac{pH_{n\_ref} - pH_{initial\_ref}}{pH_{final\_ref} - pH_{initial\_ref}} \right). \quad \text{(Equation 22)}$$

19. The method of any one of embodiments 10-18, wherein an amount of titrant added to the reference sample is normalized by:

$$\text{normalized } Titrant_{n\_ref} = \frac{Titrant_{n\_ref} - Titrant_{1\_ref}}{Titrant_{2\_ref} - Titrant_{1\_ref}}, \quad \text{(Equation 17)}$$

wherein $Titrant_{1\_ref}$ is an amount of titrant added to the reference sample to reach $pH_{1\_ref}$, and $Titrant_{2\_ref}$ is an amount of titrant added to the reference sample to reach $pH_{2\_ref}$.
20. The method of any one of embodiments 10-19, wherein the at least one reference titration curve comprises a single titration curve, and wherein $pH_{1\_ref}=pH_{initial\_ref}$, and $pH_{2\_ref}=pH_{final\_ref}$.
21. The method of any one of embodiments 10-19, wherein the at least one reference titration curve comprises a plurality of reference titration curves.
22. The method of embodiment 21, wherein each reference titration curve comprises a $pH_{initial\_ref}$ and $pH_{final\_ref}$, and wherein:
(a) $pH_{1\_ref}$ is a $pH_{initial\_ref}$ from one of the plurality of reference titration curves,
(b) $pH_{2\_Ref}$ is a $pH_{final\_ref}$ from one of the plurality of reference titration curves, and
  wherein $pH_{1\_ref}$ and $pH_{2\_ref}$ are selected to encompass a maximal difference in value while still encompassing pH values covered by all of the plurality of reference titration curves.
23. The method of any one of embodiments 19-22, wherein the initial pH of the sample ($pH_{initial}$) and $pH_{1\_ref}$ are about the same.
24. The method of any one of embodiments 19-22, wherein the initial pH of the sample ($pH_{initial}$) and $pH_{1\_ref}$ are not the same.
25. The method of embodiment 24, wherein the difference between $pH_{initial}$ and $pH_{1\_ref}$ is about 0.05 to 1, about 0.1 to 1, about 0.1 to 0.5, or about 0.1 to 0.3 pH units.
26. The method of any one of embodiments 19-25, wherein the final pH of the sample ($pH_{final}$) and $pH_{2\_ref}$ are about the same.
27. The method of any one of embodiments 19-25, wherein $pH_{final}$ and $pH_{2\_ref}$ are not the same.
28. The method of embodiment 27, wherein the difference between $pH_{final}$ and $pH_{2\_ref}$ is about 0.05 to 1, about 0.1 to 1, about 0.1 to 0.5, or about 0.1 to 0.3 pH units.
29. The method of any one of embodiments 19-28, wherein $pH_{initial}$, $pH_{initial\_ref}$ and $pH_{1\_ref}$ are the about the same, and wherein $pH_{final}$, $pH_{final\_ref}$ and $pH_{2\_ref}$ are the about the same.
30. The method of any one of embodiments 1-29, wherein the final pH of the sample ($pH_{final}$) is less than the initial pH of the sample ($pH_{initial}$), and the titrant is an acid.

31. The method of embodiment 30, wherein the amount of titrant added to the reference sample is normalized to a scale of about −0.76 to about 1.49.
32. The method of embodiment 30 or 31, wherein $pH_{1\_ref}$ is between about 4.0 and 4.3, and $pH_{2\_ref}$ is between about 3.4 and 3.9.
33. The method of embodiment 30 or 31, wherein $pH_{1\_ref}$ is about 4.1, and $pH_{2\_ref}$ is about 3.7.
34. The method of any one of embodiments 30-32, wherein $pH_{initial}$ is between about 4.0 to 4.5, between about 4.1 and 4.5, between about 4.2 and 4.5, between about 4.3 and 4.5, between about 4.1 and 4.4 or between about 4.2 and 4.4.
35. The method of any one of embodiments 30-34, wherein $pH_{final}$ is between about 3.0 and 3.8, between about 3.1 and 3.8, between about 3.2 and 3.8, between about 3.3 and 3.7, between about 3.4 and 3.7 or between about 3.5 and 3.7.
36. The method of any one of embodiments 30-34, wherein $pH_{final}$ is about 3.6.
37. The method of any one of embodiments 30-36, wherein the model comprises a polynomial.
38. The method of embodiment 37, wherein the model comprises a $4^{th}$ order polynomial of the formula: normalized $$\text{Titrant}_n = a + b*pH_n + c*pH_n^2 + d*pH_n^3 + e*pH_n^4. \quad \text{(Equation 18)}$$

39. The method of embodiment 37 or 38, wherein the polynomial comprises:

$$\text{normalized Titrant}_n = 283.35764 - 279.43987*\text{pH}_n + 104.25395*\text{pH}_n^2 - 17.257125*\text{pH}_n^3 + 1.0589067*\text{pH}_n^4. \quad \text{(Equation 19)}$$

40. The method of any one of embodiments 1-29, wherein the final pH of the sample ($pH_{final}$) is greater than the initial pH ($pH_{initial}$), and the titrant is a base.
41. The method of embodiment 40, wherein the amount of titrant added to the reference sample is normalized to a scale of about −0.06 to about 1.53.
42. The method of embodiment 40 or 41, wherein $pH_{1\_ref}$ is between about 3.0 and 3.8, or between about, between about 3.1 and 3.8, between about 3.2 and 3.8, between about 3.3 and 3.7, between about 3.4 and 3.7 or between about 3.5 and 3.7, and $pH_{2\_ref}$ is between about 5.3 and 8.5, between about 5.1 and 8.1, between about 5.5-8.0, or between about 7.5 and 8.0.
43. The method of embodiment 40 or 41, wherein $pH_{1\_ref}$ is about 3.7, and $pH_{2\_ref}$ is about 7.6.
44. The method of any one of embodiments 40-43, wherein $pH_{initial}$ is between about 3.0 and 3.8, between about 3.1 and 3.8, between about 3.2 and 3.8, between about 3.3 and 3.7, between about 3.4 and 3.7 or between about 3.5 and 3.7.
45. The method of any one of embodiments 40-44, wherein $pH_{final}$ is between about 5.3 and 8.5, between about 5.1 and 8.1, between about 5.5-8.0, or between about 7.5 and 8.0.
46. The method of any one of embodiments 40-45, wherein the model comprises a polynomial.
47. The method of embodiment 46, wherein the model comprises a $5^{th}$ order polynomial of the formula:

$$\text{normalized Titrant}_n = a + b*\text{pH}_n + c*\text{pH}_n^2 + d*\text{pH}_n^3 + e*\text{pH}_n^4 + f*\text{pH}_n^5. \quad \text{(Equation 20)}$$

48. The method of embodiment 46 or 47, wherein the polynomial comprises:

$$\text{normalized Titrant}_n = 12.256725 - 10.723277*\text{pH}_n + 3.3662386*\text{pH}_n\hat{}2 - 0.4588175*\text{pH}_n\hat{}3 + 0.0255417*\text{pH}_n\hat{}4 - 0.0003153*\text{pH}_n\hat{}5. \quad \text{(Equation 21)}$$

49. The method of any one of embodiments 1-48, wherein correcting the pH meter comprises sending a signal to an operator indicating that a pH probe is faulty.
50. The method of any one of embodiments 1-49, wherein correcting the pH meter comprises recalibrating or replacing the pH probe.
51. The method of any one of embodiments 1-50, wherein the pH of the sample is measured using a pH probe inserted in a subsample removed from the sample, a discretely sampled slipstream, or a continuous slipstream.
52. The method of any one of embodiments 1-50, wherein the pH of the sample is not measured using a pH probe inserted directly into the sample.
53. The method of any one of embodiments 1-52, further comprising, prior to measuring $pH_{initial}$ at step (a), comparing $pH_{initial}$ to a $pH_{initial}$ previously measured for at least one reference sample, and correcting the pH meter when the difference between $pH_{initial}$ and the previously measured $pH_{initial}$ indicates a calibration error in the pH meter.
54. The method of any one of embodiments 1-53, further comprising comparing the $pH_{initial}$ from the sample to a $pH_{initial}$ value predicted by a statistical titration model, and correcting the pH meter when the difference between $pH_{initial}$ and the $pH_{initial}$ predicted by the statistical titration model indicates a calibration error in the pH meter.
55. The method of any one of embodiments 1-54, further comprising comparing the change in pH from $pH_{initial}$ to $pH_n$ to a change in pH predicted by a statistical titration model, and correcting the pH meter when the difference between the pH change as measured and the pH change predicted by the statistical titration model indicates a calibration error in the pH meter.
56. The method of any one of embodiments 1-55, wherein the sample comprises a first protein of interest and the at least one reference sample comprises a second protein of interest.
57. The method of embodiment 56, wherein the first protein of interest and the second protein of interest are the same.
58. The method of embodiment 56, wherein the first protein of interest and the second protein of interest are not the same, but respond similarly to the addition of the titrant to the sample and the reference sample.
59. The method of any one of embodiments 56-58, wherein the method prevents damage to the protein of interest caused by adding too much titrant to the sample.

60. An apparatus, configured to carry out the methods of any one of embodiments 1-59.

61. The apparatus of embodiment 60, comprising:
a reactor;
a pH flow cell comprising a pH probe disposed therein, the pH flow cell fluidically coupled to the reactor, the pH flow cell configured to receive a sampling slip stream from the reactor and measure the pH of the slip stream;
an acid titrant supply fluidically coupled to the reactor, the acid titrant supply configured to provide an acid titrant to the reactor to reduce the pH in the reactor; and/or
a base titrant supply fluidically coupled to the reactor, the base titrant supply configured to provide a base titrant to the reactor to increase the pH in the reactor.

62. An apparatus, comprising:
a reactor;
a pH flow cell comprising a pH probe disposed therein, the pH flow cell fluidically coupled to the reactor, the pH flow cell configured to receive a sampling slip stream from the reactor and measure the pH of the slip stream;
an acid titrant supply fluidically coupled to the reactor, the acid titrant supply configured to provide an acid titrant to the reactor to reduce the pH in the reactor; and/or
a base titrant supply fluidically coupled to the reactor, the base titrant supply configured to provide a base titrant to the reactor to increase the pH in the reactor.

63. The apparatus of embodiment 61 or 62, further comprising:
a sampling pump configured to deliver the slip stream from the reactor to the pH flow cell.

64. The apparatus of embodiment 61 or 62, further comprising:
a waste receiver configured to receive effluent from the pH flow cell.

65. The apparatus of embodiment 61 or 62, further comprising:
an acid titrant pump configured to deliver the acid titrant from the acid titrant supply to the reactor; and
an acid titrant flowmeter configured to measure a flow rate of the acid titrant from the acid titrant supply to the reactor.

66. The apparatus of embodiment 61 or 62, further comprising:
a base titrant pump configured to deliver the base titrant from the base titrant supply to the reactor; and
a base titrant flowmeter configured to measure a flow rate of the base titrant from the base titrant supply to the reactor.

67. The apparatus of any one of embodiments 61-66, further comprising a controller, the controller in communication with the acid titrant flowmeter, the base titrant flowmeter, the pH probe, the acid titrant pump, and the base titrant pump.

68. The apparatus of embodiment 67, wherein the controller is configured to:
(a) receive a signal from the acid titrant flowmeter, whereby the controller determines an amount of acid titrant added to the sample;
(b) receive a signal from the base titrant flowmeter, whereby the controller determines an amount of base titrant added to the sample;
(c) receive a signal from the pH probe, whereby the signal conveys a pH measurement to the controller, and the controller relates the pH measurement to the corresponding amount of acid titrant or base titrant added to the sample;
(d) send a signal to the acid titrant pump to start the pump, stop the pump, or change pump speed; and
(e) send a signal to the base titrant pump to start the pump, stop the pump, or change pump speed.

69. The apparatus of embodiment 67 or 68, wherein the controller is in communication with the sampling pump, wherein the controller is configured to send a signal to the sampling pump to start the pump, stop the pump, or change pump speed.

70. The apparatus of any one of embodiments 67-69, wherein the controller is configured to apply a model to the pH measurement and the corresponding amount of acid or base titrant added to the sample.

71. The apparatus of embodiment any one of embodiments 67-70, wherein the controller is configured to activate the acid titrant pump and add a pre-determined quantity of acid titrant when a pH measured in the pH flow cell is greater than a desired value, and the controller further configured to activate the base titrant pump and add a pre-determined quantity of base titrant when the pH measured in the pH flow cell is less than the desired value.

72. The apparatus of any one of embodiments 67-71, wherein the controller is configured to send a signal to the acid titrant pump to stop the pump when a predetermined amount of acid titrant has been added to the sample, and to send a signal to the base titrant pump to stop the pump when a predetermined amount of base titrant has been added to the sample 73. The apparatus of any one of embodiments 67-72, wherein the controller is configured to hold the pH at a desired value for a period of time.

74. The apparatus of embodiment 73, wherein the desired value changes over time, consistent with a pH sequence.

75. The apparatus of embodiment 74, wherein the pH sequence is suitable for inactivating viruses that may be present in the reactor.

76. The apparatus of embodiment 75, wherein the pH sequence comprises
(a) lowering pH to first target pH of between about 3.0 and 3.8, between about 3.1 and 3.8, between about 3.2 and 3.8, between about 3.3 and 3.7, between about 3.4 and 3.7 or between about 3.5 and 3.7,
(b) holding the pH at the first target pH for a period of time,
(c) raising the pH to a second target pH between about 5.3 and 8.5, between about 5.1 and 8.1, between about 5.5-8.0, or between about 7.5 and 8.0, and
(d) holding the pH at the second target pH.

77. The apparatus of embodiment 76, wherein lowering the pH at step (a) or raising the pH at step (c) comprises adding one or more amounts of titrant sufficient to change the pH of the sample and measuring the pH of the sample.

78. The apparatus of any one of embodiments 61-77, further comprising:
a check valve on the fluidic coupling between the reactor and the pH flow cell, the check valve configured to prevent contamination of the reactor by backflow from the pH flow cell.

79. The apparatus of any one of embodiments 61-78, wherein the reactor does not include a pH measurement probe disposed therein.

80. The apparatus of any one of embodiments 61-79, further comprising a mixer disposed in the reactor, configured to mix contents in the reactor immediately before, during and/or after addition of the acid titrant and/or the base titrant.
81. The apparatus of embodiment 80, wherein the controller is in communication with the mixer, and wherein the controller is configured to send a signal to the mixer activate the mixer prior to starting the acid pump or the base pump.
82. The apparatus of embodiment 81, wherein the controller is configured to send a signal to the mixer whereby the mixer is stopped a fixed period of time after stopping the acid pump or base pump.
83. The apparatus of any one of embodiments 61-82, further comprising a user interface configured to receive and display a pH measurement from the controller.
84. The apparatus of embodiment 83, wherein the user interface is configured to send a signal to the controller, whereby controller signals to the acid titrant pump or base titrant pump to add a predetermined volume of acid or base titrant to the sample.
85. The apparatus of embodiment 83 or 84, wherein the user interface is configured to send a signal to the controller whereby the user can or instruct the controller to advance a step in the pH sequence.
86. The apparatus of any one of embodiments 83-85, wherein the user interface is configured to receive one or more offline pH measurements from the user, wherein the one or more offline pH measurements comprise pH measurements of the sample that are independent of the pH probe disposed in the pH flow cell.
87. The apparatus of any one of embodiments 83-86, wherein the user interface is configured to display a warning signal when the pH measurement from the pH probe differs from a corresponding pH predicted by a model.
88. The apparatus of embodiment 87, wherein the warning signal is displayed when the difference between pH measurement and the model is >0.01 pH units, >0.02 pH units, >0.03 pH units, >0.04 pH units, >0.05 pH units, >0.06 pH units, >0.07 pH units, >0.08 pH units, >0.09 pH units or >0.10 pH units.
89. The apparatus of embodiment 87, wherein the warning signal is displayed when the difference between pH measurement and the model is >0.05 pH units.
90. The apparatus of any one of embodiments 67-89, wherein the controller is configured to automatically halt the pH sequence when the pH measurement from the pH probe differs from a corresponding pH predicted by a model.
91. The apparatus of any one of embodiments 67-90, wherein a volume of acid titrant or base titrant delivered to the reactor has a percent error of 10% or less.

EXAMPLES

Example 1: Modeling Titration to Lower pH of Protein Solution

Cells expressing five different proteins were grown in bioreactors, and the proteins were secreted into the cell culture media. After an initial harvest step to remove cells and cellular debris, the proteins were captured using a protein A chromatography system, washed, and eluted. The eluate containing the partially purified protein was then transferred to an automated system for viral inactivation by lowering the pH to 3.6.

To measure pH, a Mettler Toledo InPro 3253 pH probe was calibrated, then sterilized via autoclave or gamma irradiation in a sealed bellows with a Kleenpak connection to enable a sterile connection to the pool vessel containing the partially purified protein solution. The pH probe was inserted into the pool vessel, and acid solution was added until a target pH of 3.6 was achieved. Insertion of the pH probe directly into the pool vessel allowed for feedback control of titration to control the final pH. In this example, titrants were dosed continuously, and the pH was measured continuously. pH versus the amount of acid added was measured for 11 viral inactivation runs across 5 different proteins, and plotted in FIG. 1. In FIG. 1, the amount of base added is indicated in units of pump rotations per kg of product in the vessel prior to any titrant addition, and the pump speed data is time shifted to account for delay between base addition and pH response. As can be seen in FIG. 1, all titration curves were visually similar in shape. The titration curves were largely linear, with a slight downward curve observed. Titration curves also differed with respect to X and Y intercepts.

A linear transformation of the axes was applied to the titration curves shown in FIG. 1.

The Y axis (pH) was transformed to a scale of 1→0 (initial pH→final pH) using the following equation:

$$y = \frac{pH - pH_{final}}{pH_{initial} - pH_{final}}. \quad \text{(Equation 1)}$$

The X axis (acid added) was transformed to a scale of 0→1 (initial→final), using the following equation:

$$x = \frac{\text{acid added}}{\text{acid added}_{final}}. \quad \text{(Equation 2)}$$

Figure 2:
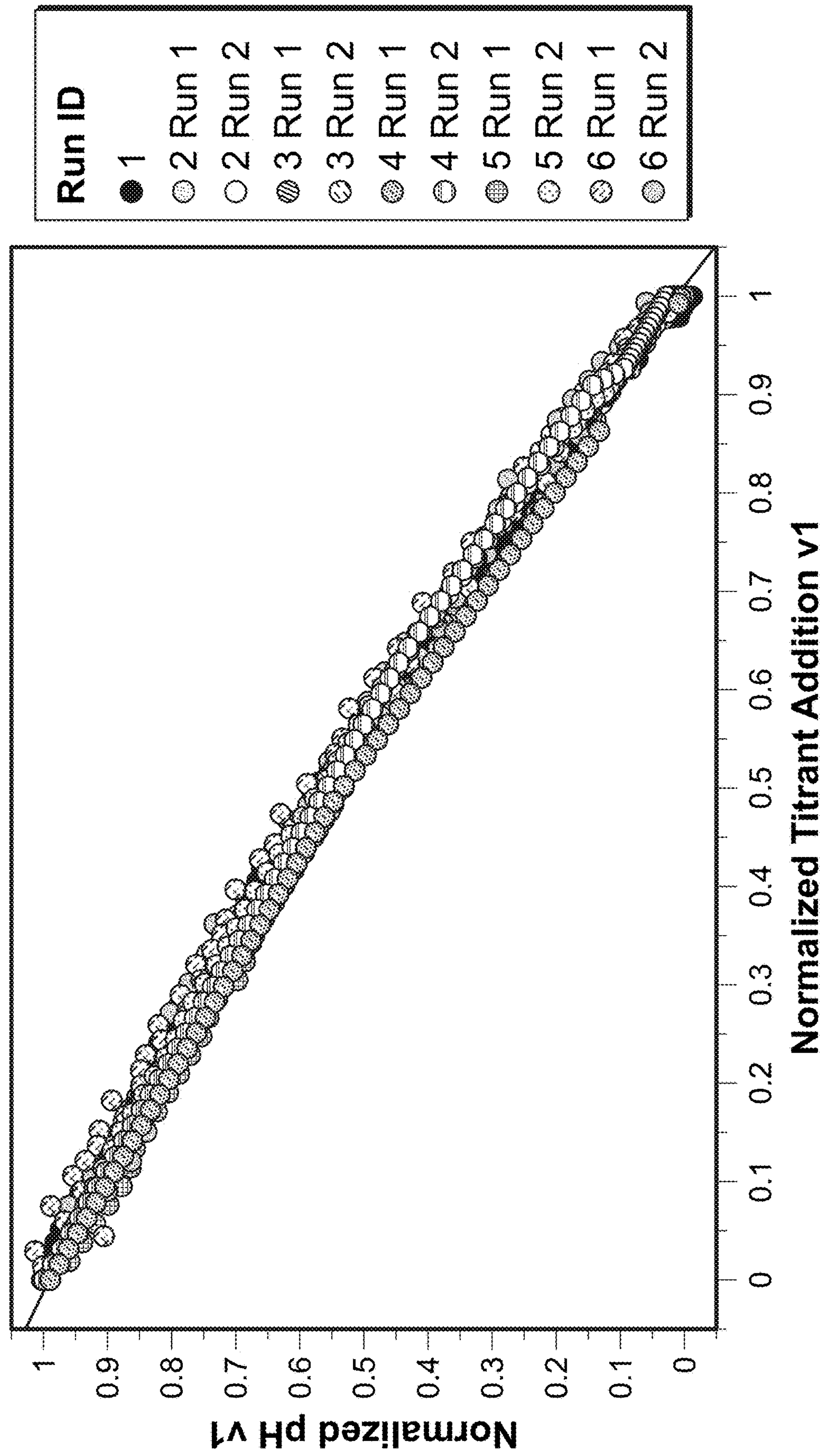
FIG. 2 is a plot showing the titration curves from FIG. 1 after linear transformation of the X and Y axes using Equation 1 (Y axis) and Equation 2 (X axis).

A linear transformation of the two axes that causes 2 points on each curve to converge, should result in all curves collapsing, as shown in FIG. 2. Modeling the resulting transformed data shown in FIG. 2 produced a second order polynomial:

Normalized pH $v1$=1.0584433−1.0049047*Normalized Titrant Addition $v1$−0.214062*(Normalized Titrant Addition $v1$−0.56403)^2 (Equation 3).

The summary of the fit of the polynomial is shown in Table 1 below:

TABLE 1

| Summary of Fit | |
|---|---|
| RSquare | 0.996943 |
| RSquare Adj | 0.996936 |
| Root Mean Square Error | 0.017471 |
| Mean of Response | 0.470191 |
| Observations (or Sum Wgts) | 830 |

The RMSE (Root Mean Square Error) of quadratic fit=0.0175 normalized pH Units, which in pH units is approximately:

$$0.0175*\left(\frac{4.2-3.6\,\text{pH}}{1}\right)=0.011\text{ pH}. \quad \text{(Equation 4)}$$

The initial and final pH values varied slightly between runs.

Example 2: Modeling of Titration to Raise pH of Protein Solution

Figure 4:
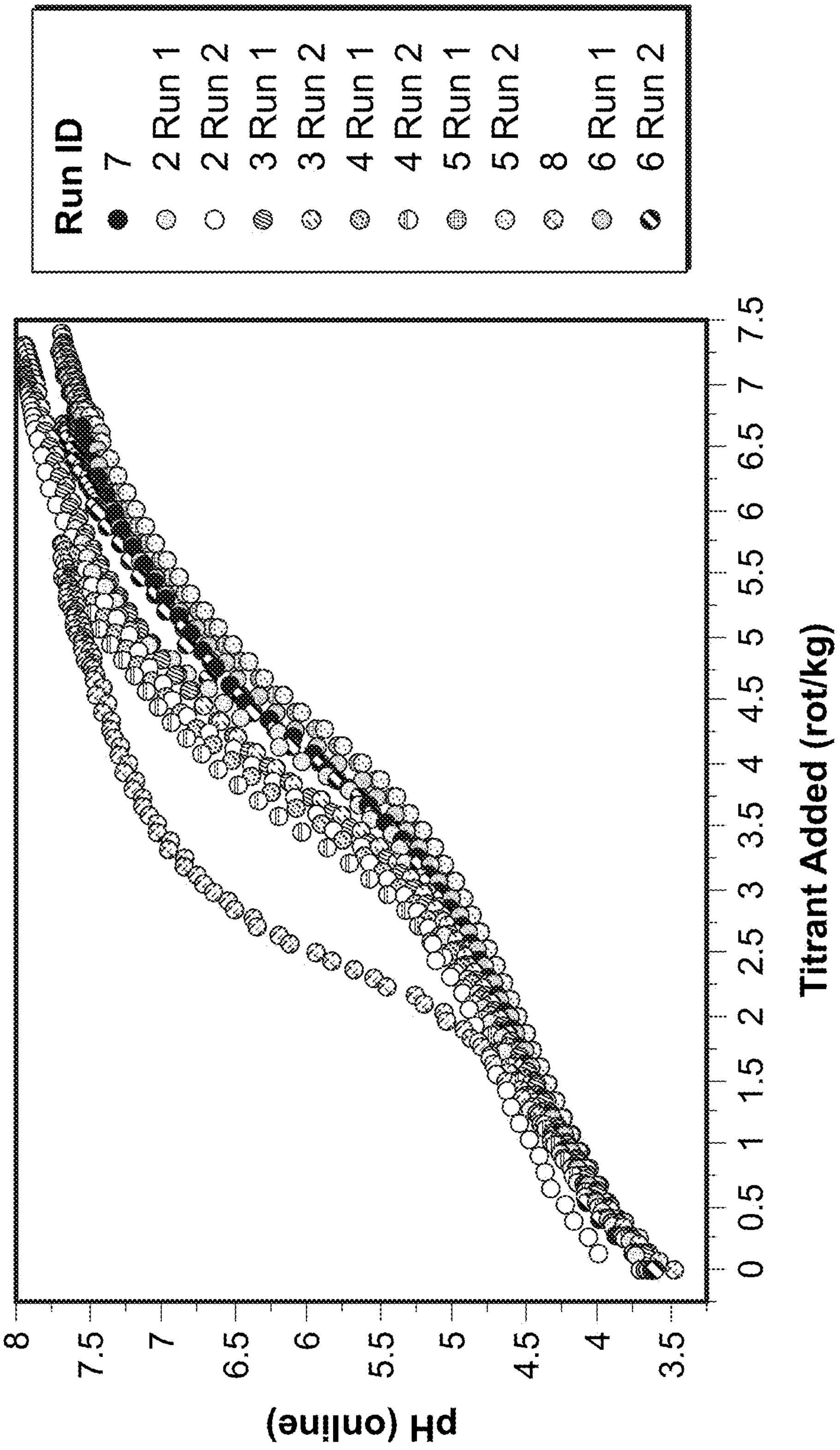
FIG. 4 is a plot showing 12 titration curves generated using 7 different proteins. pH was raised through the addition of base solution to reach a target pH of between 7.5 and 8.0, depending on the protein. pH is shown in the Y-axis, while the X-axis indicates the amount of acid titrant added in pump rotations per kilogram of eluate (rot/kg). A time shift was applied to the pump speed data to account for delay between acid addition and pH response.

Following viral inactivation, the pH of the solution was raised to neutral or near-neutral pH by the addition of a basic solution, using the same approach as described in Example 1.

pH versus the amount of base added was measured for 12 viral inactivation runs across 7 different proteins, and plotted in FIG. 4. In FIG. 4, the amount of base added is indicated in units of pump rotations per kg of product in the vessel prior to any titrant addition, and the pump speed data is time shifted to account for delay between base addition and pH response. As can be seen in FIG. 4, curves were similar in shape, with a consistent inflection point around pH 6. The location of this inflection point on the X-axis was variable.

A linear transformation of axes was applied to the titration curves shown in FIG. 4. In theory, a linear transformation that causes 2 well-chosen points on each curve to converge should result in all curves collapsing into a single curve. The initial approach was based on modeling acid titration, described in Example 1, above.

In this first approach, the Y axis (pH) was transformed to a scale of 0→1 (initial pH→final pH) using the following equation:

$$y=\frac{\text{pH}-\text{pH}_{initial}}{\text{pH}_{final}-\text{pH}_{initial}}. \quad \text{(Equation 5)}$$

The X axis (base added) was transformed to a scale of 0→1 (initial→final), using the following equation:

$$x=\frac{\text{base added}}{\text{base added}_{final}}. \quad \text{(Equation 6)}$$

Figure 5:
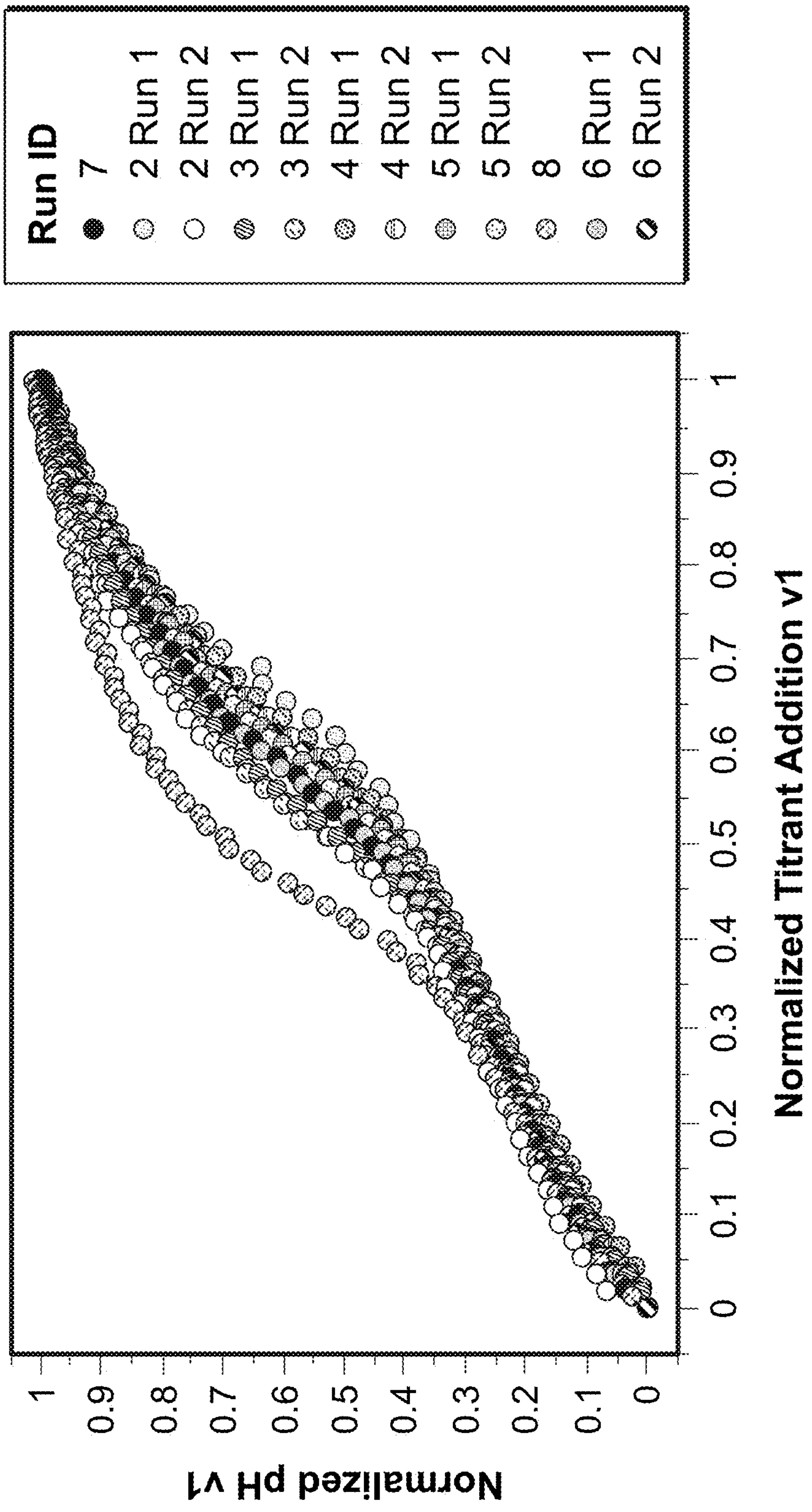
FIG. 5 is a plot showing the titration curves from FIG. 4 after linear transformation of the X and Y axes using Equation 5 (Y axis) and Equation 6 (X axis).

The results of this transformation are shown in FIG. 5. As can be seen in FIG. 5, this initial approach to normalization did not cause the base titration curves to collapse to the extent of the acid titration curves in Example 1 (compare FIG. 5 to FIG. 2).

One explanation for this variation is that while the target pH for the acid titration was the same across proteins (pH 3.6), the target pH for the basic titration differed between proteins, ranging from 7.7 to 8.0 depending on the protein. Thus, the final data points of the titration curves should not converge with normalization.

Accordingly, a second approach to normalization took into account that the titration end points should not converge. In this second approach, the Y axis was set to 0 at time=0, and pH 7.60, which is close to, but less than, the target pH, was set to 1. Similarly, the X axis was fixed at 0 for time=0, and 1 for an amount of titrant required to reach pH 7.60.

In this second approach, the Y axis (pH) was transformed to a scale of 0→1+(initial→pH 7.60) using the equation:

$$y=\frac{\text{pH}-\text{pH}_{initial}}{7.60-\text{pH}_{initial}}. \quad \text{(Equation 7)}$$

The X axis (base added) was transformed to a scale of 0→1+(initial→pH 7.60) using the equation:

$$x=\frac{\text{base added}}{\text{base added}_{@pH\,7.60}}. \quad \text{(Equation 8)}$$

Figure 6:
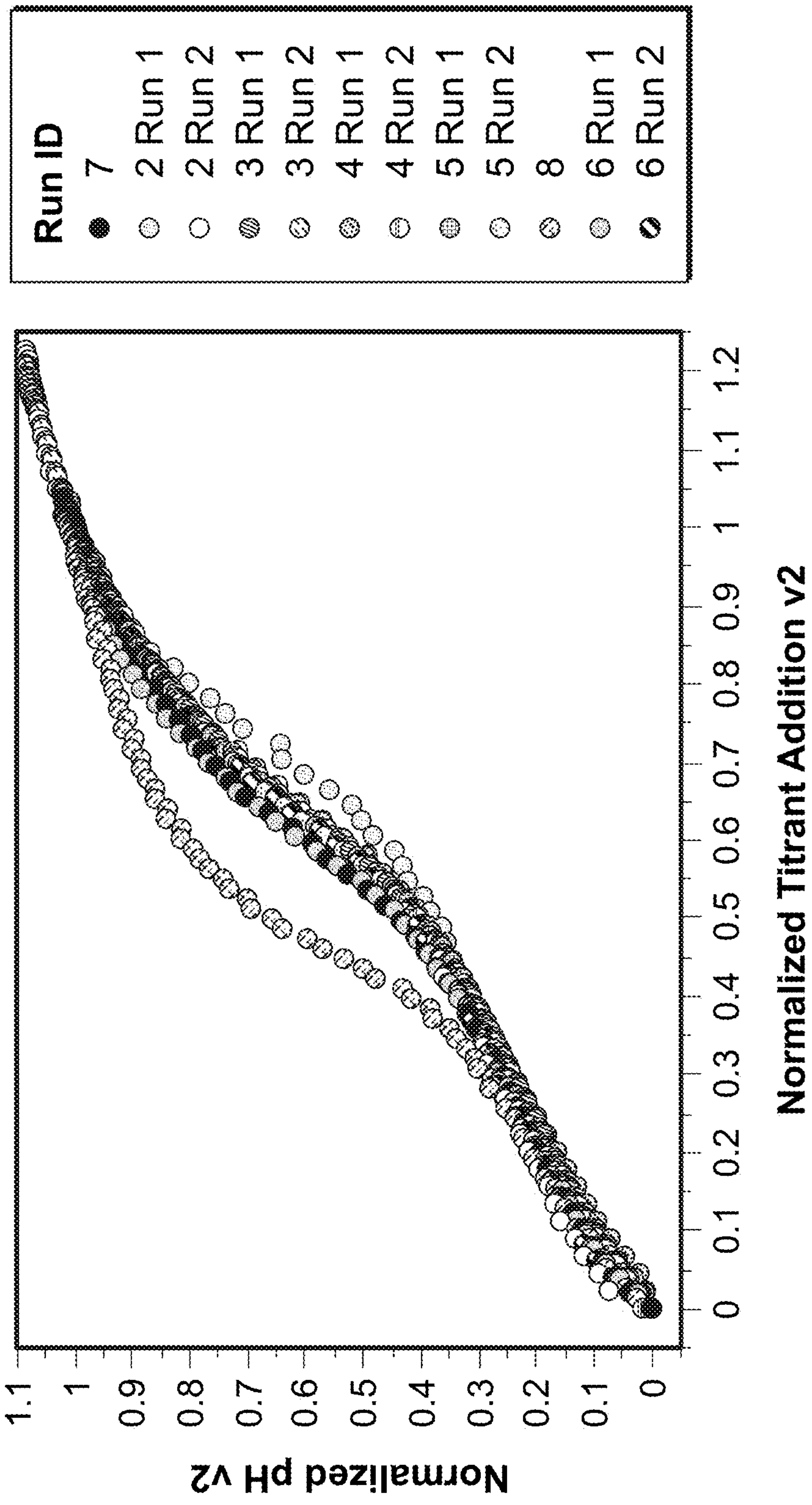
FIG. 6 is a plot showing the titration curves from FIG. 4 after linear transformation of the X and Y axes using Equation 7 (Y axis) and Equation 8 (X axis).

The results of this second transformation our shown in FIG. 6. As shown in FIG. 6, forcing convergence at time=0 and pH=7.60 substantially improves fit. However, two titration curves still deviate from the remaining curves.

Figure 7:
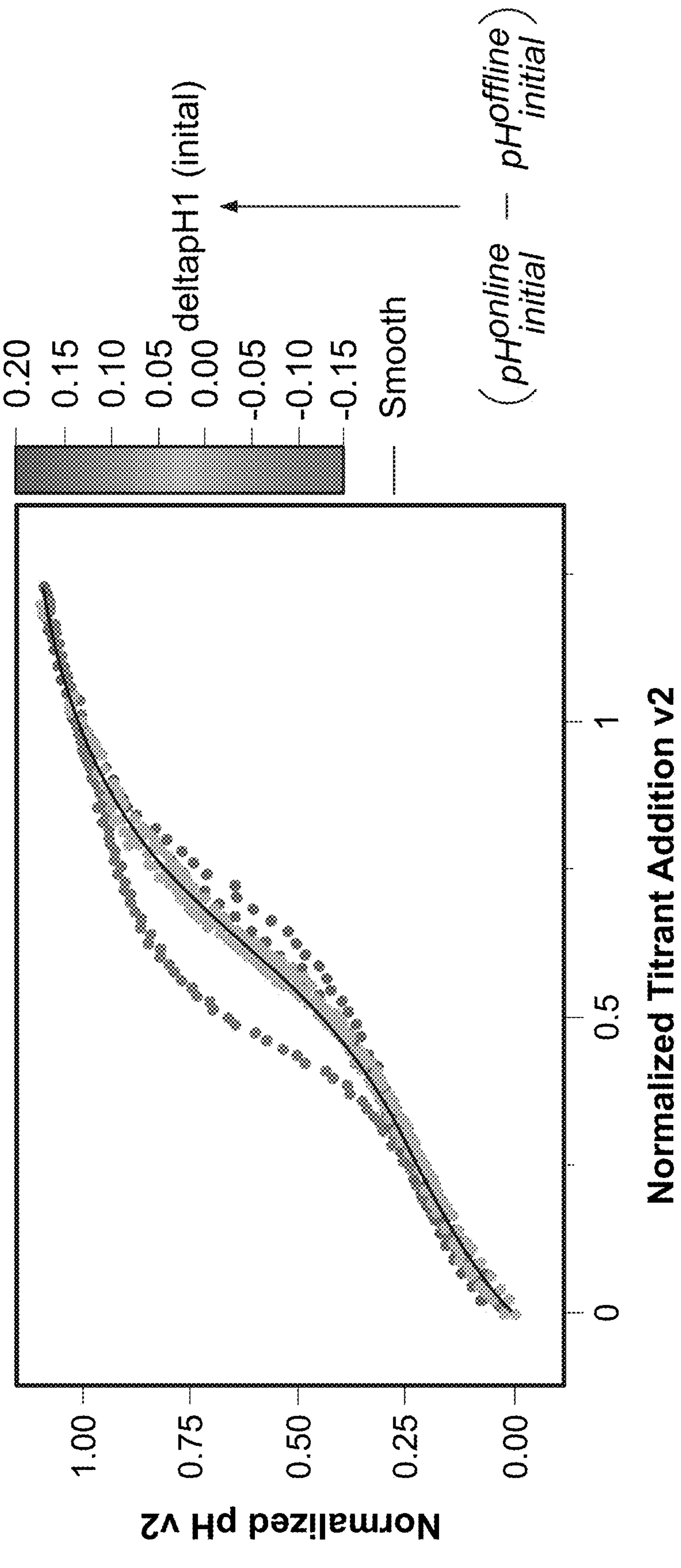
FIG. 7 is a plot showing the normalized titration curves from FIG. 6 color coded by difference between the initial online and offline measurement for the pH probe used to collect the data for each titration curve. The curves with the largest deviation from the model (black line) also had the largest differences in initial online and offline measurements.

This deviation could be caused by issues with pH probe calibration. For example, the pH probes used to generate the titration curves were sterilized in a sealed bag using an autoclave or gamma irradiation. Sterilization occurred after calibration but prior to use, so that the probe was dry for a period of time between calibration and when it took the first measurement. Issues with the pH probes could cause these two titration curves to deviate from the model. Offline pH was measured at the start and end of all pH titration runs. I.e., at the beginning and end of each run to either lower or raise pH, a small amount of the protein solution was removed from the pool, and the pH was measured separately with a probe that had not undergone sterilization. As seen in FIG. 7, the two runs with the biggest deviation from the model also showed the biggest difference in initial online and offline measurements, indicating that the issue was most likely with the probes used to generate these two titration curves.

Issues with online pH measurements can be corrected with a linear transformation using the two offline measurements (initial and final). This is equivalent to an after-the-fact 2-point pH standardization. The third approach to normalization took into account both (1) that the titration end points should not converge, and (2) the differences between online and offline measurements. A corrected online pH was calculated using the following equation:

$$\text{pH}^{online}_{corrected}=\text{pH}^{offline}_{initial}+\left(\text{pH}^{offline}_{final}-\text{pH}^{offline}_{initial}\right)*\left(\frac{\text{pH}^{online}-\text{pH}^{online}_{initial}}{\text{pH}^{online}_{final}-\text{pH}^{online}_{initial}}\right). \quad \text{(Equation 9)}$$

Figure 8:
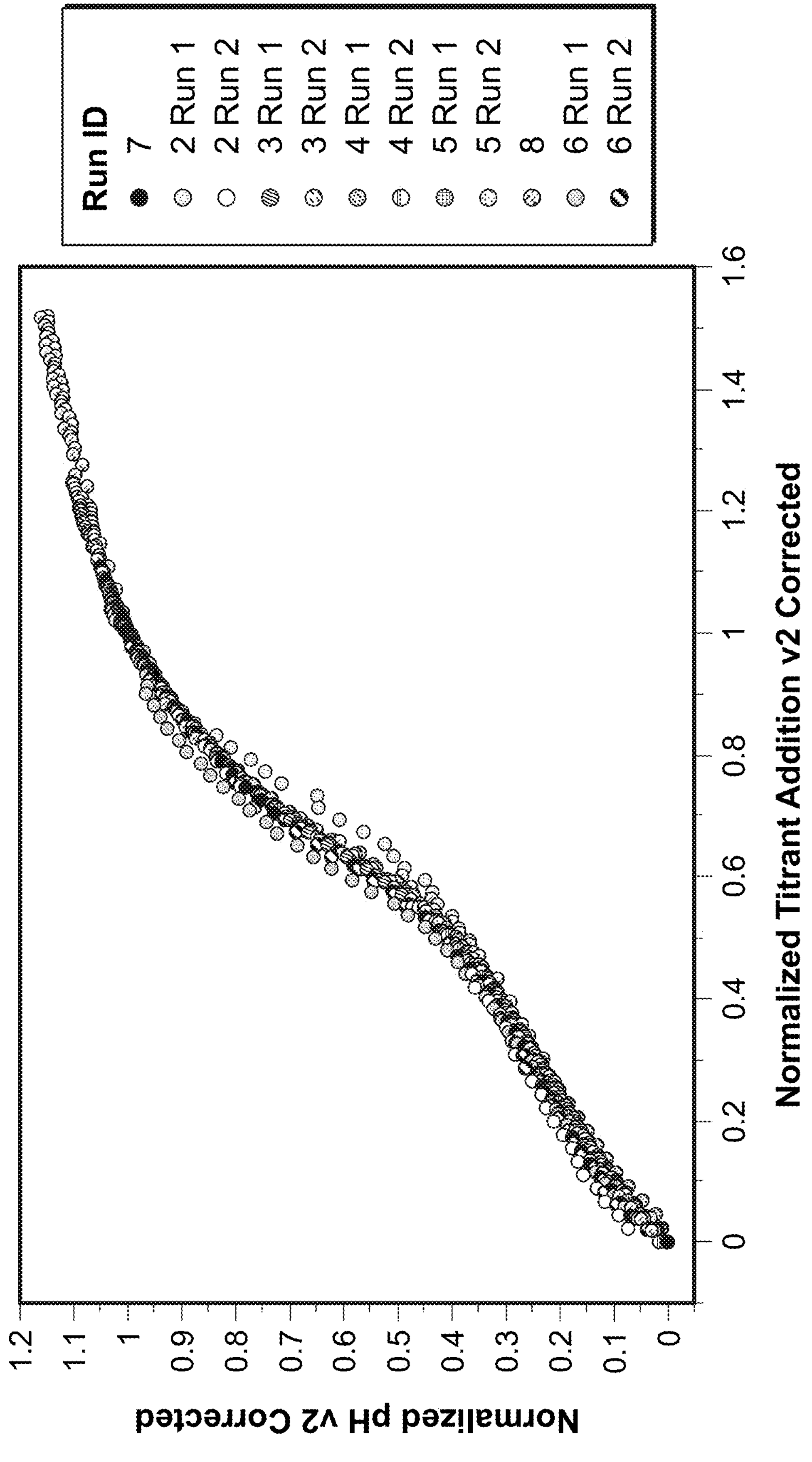
FIG. 8 is a plot showing the normalized titration curves from FIG. 6 after correction of online pH using Equation 9.
Figure 9:
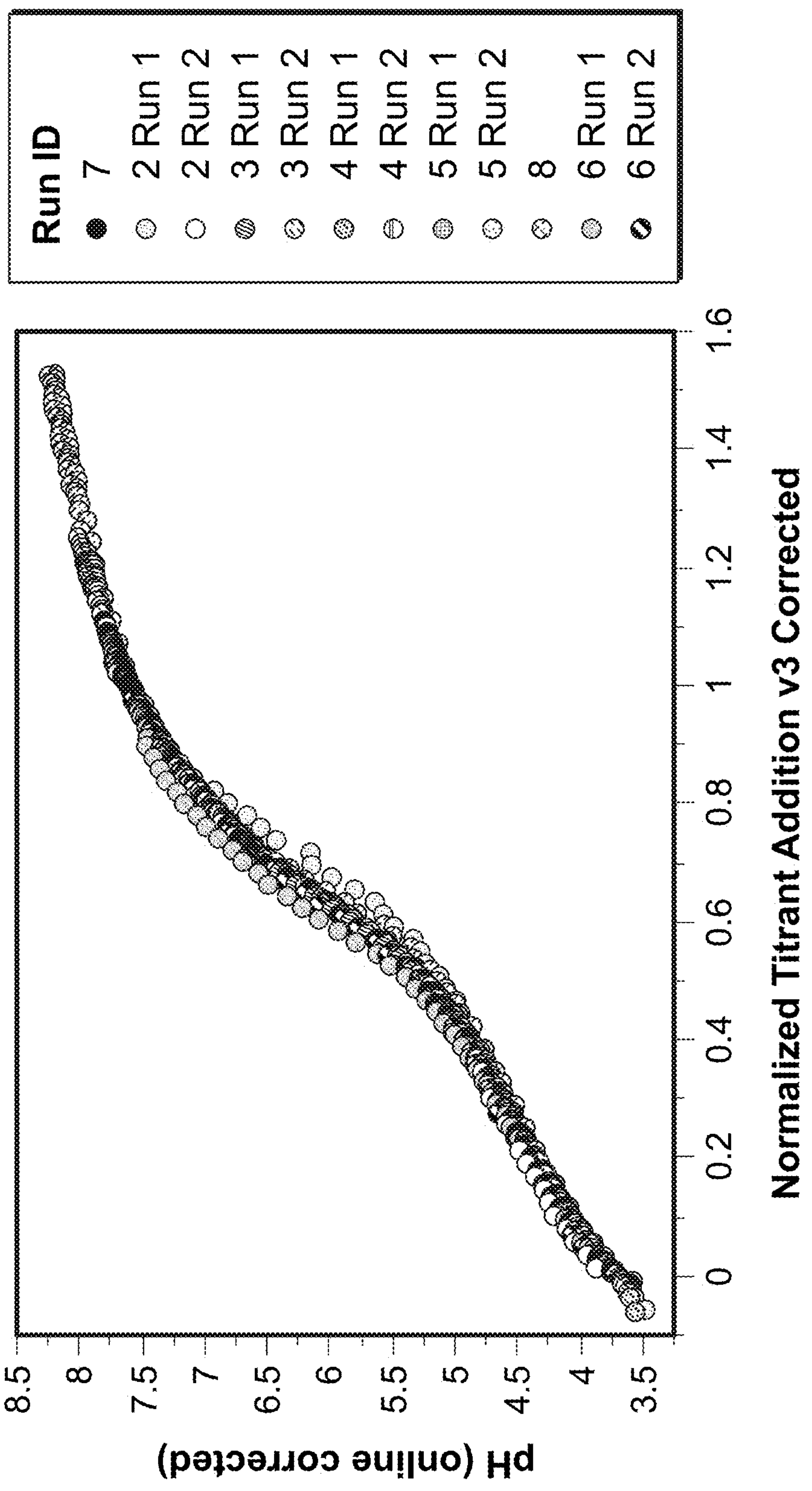
FIG. 9 is a plot showing titrations curves from FIG. 4 after forced convergence of 2 fixed pH values (pH 3.70 and pH 7.60) and linear transformation of the X axis using Equation 10. Online pH values (Y axis) were corrected using Equation 9.

The results are shown in FIG. 8. As shown in FIG. 8, correcting for online pH increases the fit.

A fourth approach was used to further tighten fit. Since different runs had slightly different initial pH, the different titration curves were forced to converge at 2 intermediate points, rather than a single intermediate point (pH 7.60) as in the previous attempts. Convergence was forced at 2 intermediate points: pH 3.70 and 7.60. No pH transformation (Y axis) was needed, since convergence was forced at 2 fixed pH values. The amount of base added (X axis) was transformed to a scale of ~0→1+(pH 3.70→pH 7.60) using the calculation below:

$$x=\frac{\text{base added}-\text{base added}_{@pH\,3.70}}{\text{base added}_{@pH\,7.60}-\text{base added}_{@pH\,3.70}}. \quad \text{(Equation 10)}$$

Figure 10:
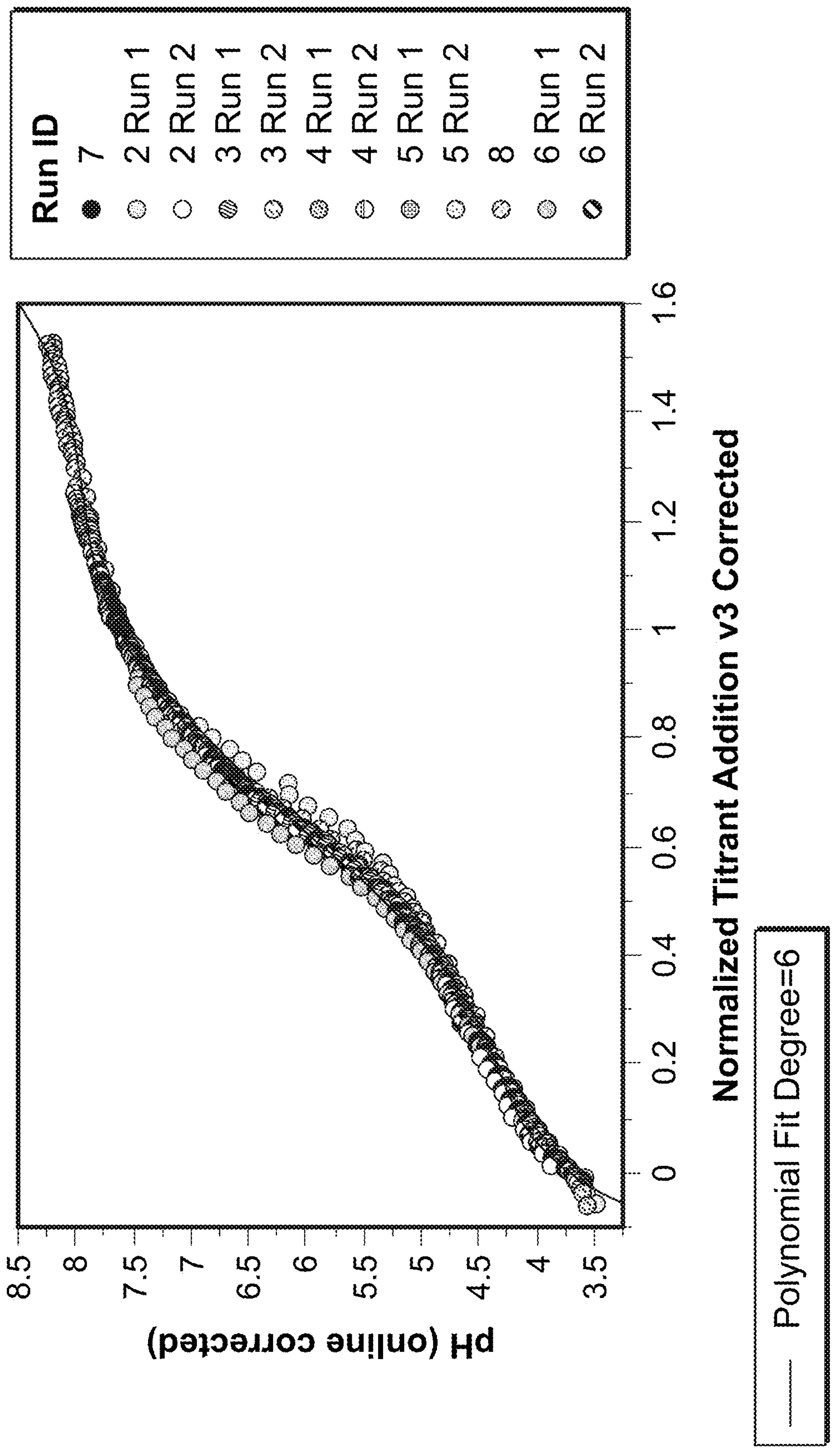
FIG. 10 is a plot showing titrations curves from FIG. 4 after forced convergence of 2 fixed pH values (pH 3.70 and pH 7.60) and linear transformation of the X axis using Equation 10. Online pH values (Y axis) were corrected using Equation 9. A 6 degree polynomial fitted to the data is shown as a solid line.

The results are shown in FIG. 10. This corrected, transformed dataset was used to generate the model for addition of base (line, FIG. 10). A 6+ order polynomial required for fit due to more complex curve shape for the base addition titration curves, compared to the acid addition titration curves:

$$pH(\text{online, corrected}) = 2.5460075 + 5.5157799*\text{Titrant}-0.1694419*(\text{Titrant}-0.63949)^{\wedge}2 - 11.009696*(\text{Titrant}-0.63949)^{\wedge}3 + 2.1806629*(\text{Titrant}-0.63949)^{\wedge}4 + 13.771715*(\text{Titrant}-0.63949)^{\wedge}5 - 7.7443576*(\text{Titrant}-0.63949)^{\wedge}6. \quad \text{(Equation 11)}$$

(Titrant values are the normalized values from Equation 10).

The base adjustment model RMSE=0.080 pH units. The summary of the fit is shown in Table 2, below.

TABLE 2

| Summary of Fit | |
|---|---|
| RSquare | 0.997091 |
| RSquare Adj | 0.997069 |
| Root Mean Square Error | 0.079609 |
| Mean of Response | 6.035137 |
| Observations (or Sum Wgts) | 773 |

In summary, the methods described in Example 1 and 2 enable accurate automated pH adjustments with a non-continuous slip stream measurement approach. A small number of samples can be taken when adjusting pH, and the pH model used to determine how much additional acid or base should be added to reach a target pH with a high degree of accuracy, and without a need for continuous sampling or measurement. Titration curves used in modeling can be can be developed with as little as one experimental dataset. This approach also enables titration to any pH value within the training dataset. Finally, pH control accuracy can be improved by adding additional intermediate sampling points.

Example 3: Development of System for pH Adjustment and Control

A system was developed to measure pH during viral inactivation, using a pH probe inserted into a discontinuous slipstream and a non-dimensional model to relate pH and titrant added to a sample. An exemplary list of parts used in this system is shown in FIG. 11. Diagrams of the system are shown in FIGS. 19-20.

In this example of the system, addition of acid and base titrant to reaction vessel containing the sample are each controlled a separate Watson Marlow 530 pump connected to a Sonotec CO.55 ultrasonic flowmeter. The pump receives titrant from a tube connected to a bag of titrant, then sends titrant to the reaction vessel through the flowmeter. A sampling line from the reaction vessel is connected to a sampling pump, through a check valve that can be used to prevent contamination of the reaction vessel in the event that the sampling assembly is installed incorrectly. The sampling pump sends the sample from the reaction vessel to a pH flow cell, into which a pH probe is inserted. The pH probe is connected to a pH transmitter. From the flow cell, the sample is sent to a waste receptacle. All pumps are connected to a controller, such that the programmed control logic of the controller can control volume and flow rate of the acid and base titrants and whether and how much sample drawn from the reaction vessel for analysis.

Advantages of this system include the following. When the probe is inserted into the reaction vessel, the probe cannot be calibrated after sterilization (and before insertion). Sterilization can impact the probe calibration curve. In this system, the probe is inserted into a separate flow cell, and no sterilization is required. No autoclaves or Kleenpak sterile connection ports are required, and the risk of breaking the probe in the reaction vessel or leaking probe solution into the protein product are eliminated. The sampling pump and the check valve produce discrete samples for pH measurement, reducing product waste. The system can also be connected to any reaction vessel via a sampling line, and so is highly flexible.

Figure 12:
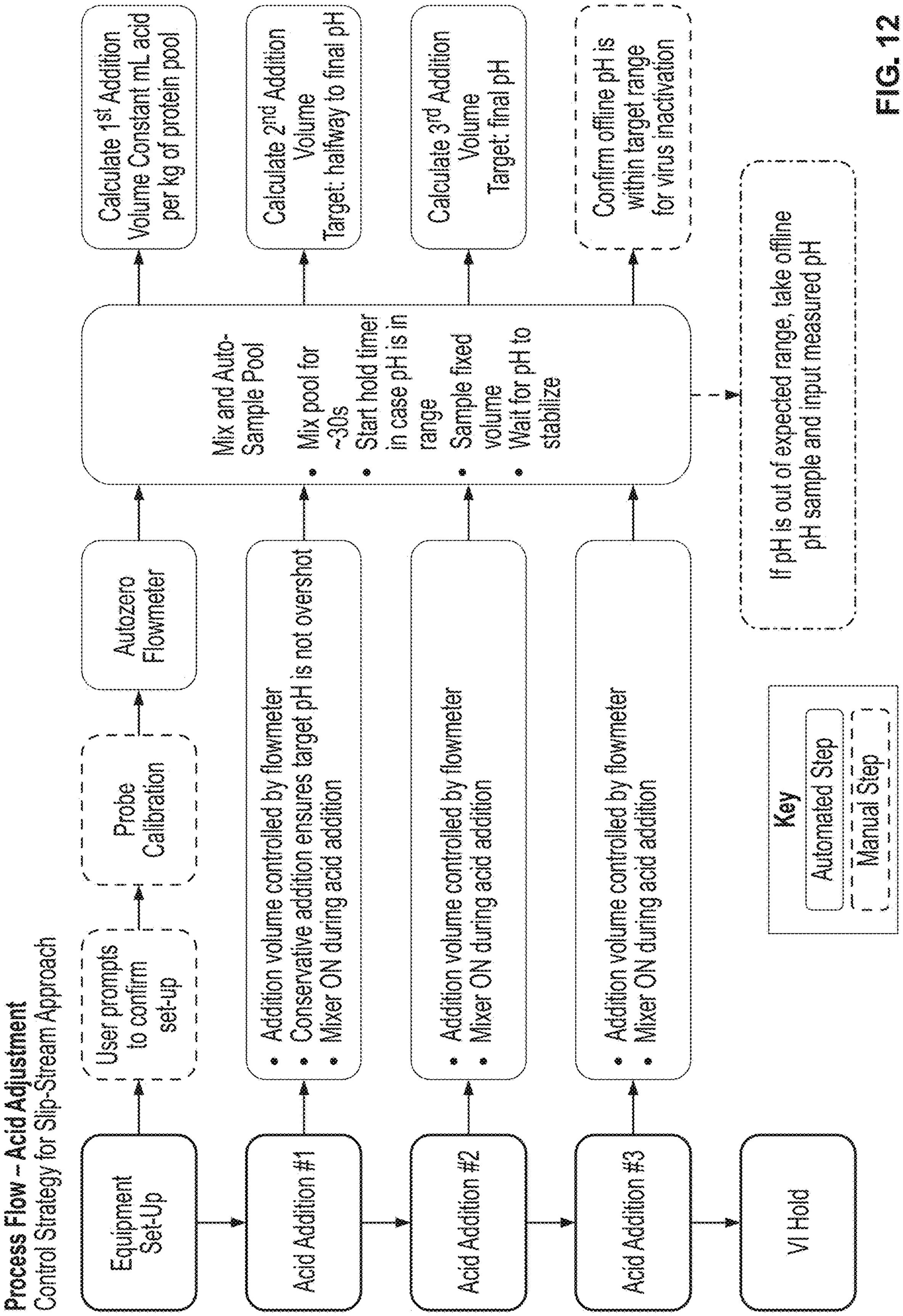
FIG. 12 is a flow chart showing an exemplary control strategy for lowering pH of a protein sample for viral inactivation. VI: viral inactivation.

An example of an acid adjustment workflow is shown in FIG. 12. After equipment set up, which includes probe calibration and autozeroing the flowmeters, an initial pH measurement is taken automatically before any addition of acid titrant, and a first amount of acid titrant is added to the sample. The addition volume is controlled using feedback from flow meter. This the initial amount of acid is usually conservative, to ensure the target pH is not overshot. Acid is added at a constant rate (mL acid per kg of protein pool in the reaction vessel), allowing the total initial addition volume to be calculated. pH is then measured automatically after the total volume of titrant in this initial addition has been added, and the initial and measured pH values, and the amount of acid added to get the second pH value, are fed into the model to determine the corresponding dimensionless titrant addition values. An intermediate target pH between the final target pH and the pH after the first addition of titrant is selected, and the model is used to calculate a corresponding dimensionless titrant addition value. The amount of dimensionless titrant that needs to be added to the sample to reach this intermediate pH is calculated according to the following formula:

$$\text{Titrant}_n \times \left[\left(\frac{(\text{normalized Titrant}_{total} - \text{normalized Titrant}_{initial})}{(\text{normalized Titrant}_n - \text{normalized titrant}_{initial})}\right) - 1\right]. \quad \text{(equation 15)}$$

In this formula, normalized $\text{Titrant}_{total}$ is the total amount of added to the sample to achieve the intermediate target pH, after normalization, normalized $\text{Titrant}_{initial}$ is the amount of titrant added to the sample for the initial pH after normalization (this value can be 0 prior to normalization), and normalized $\text{Titrant}_n$ is the amount of titrant added the sample to reach the first intermediate pH, normalized using the model. Note that the model is also used to calculate normalized $\text{Titrant}_{initial}$. With the two normalized titrants as well as the actual (dimensional) amount of titrant added, it is possible to convert between normalized and non-normalized titrant. After a low pH hold to inactivate virus, the pH is adjusted back to neutral using a similar series of steps. A second volume of acid is added, these steps are repeated to verify the accuracy of the model and the pH meter, and then the final volume of acid is added to reach the target pH.

A similar workflow for raising pH is shown in FIG. 13. After autozeroing the flow meters, a first amount of base titrant is added to the sample, pH is measured, and the first volume is calculated using a linear function relating mL/kg of base added to the target neutral pH. The initial pH, the measured pH and the volume of base titrant are fitted to the model. A second volume of base is added, these steps are repeated to verify the accuracy of the model and the pH meter, and then the final volume of base is added to reach the target pH.

In these processes, the slipstream pH value is compared to expected value after each measurement. If the measured pH is outside of expected range, the user is prompted to take a sample, measure offline pH on an independently calibrated pH meter, and input the offline value into the model. If the two measurements differ by >0.10 pH units, then the user should complete the process with offline pH measurements, use conservative volumes and additional measurement steps to complete the process. Conservative additions during the acid adjustment step compensate for the potential inaccuracy of the earlier auto-sampled pH measurements from the online pH probe.

While the process is still automated, instead of auto-sampling pH after each addition of titrant, the user interface prompts the user to take a sample, measure pH offline, e.g. with an independent pH probe, and input the offline value into the user interface. In other words, if the online probe in the pH flow cell is determined to be mis-calibrated in the middle of an adjustment step (e.g. during acid adjustment after the first acid addition has been performed), the remainder of that adjustment step (e.g. acid adjustment) is performed using conservative additions and offline pH measurements. In this scenario, the base adjustment is also performed using the dimensionless titration model, but the user should continue to use the independent pH probe, and offline pH values that are entered into the user interface, instead of measuring pH in the flow cell. The model is applied to the offline pH values to finish the pH sequence.

If difference is ≤0.10 pH units, then the process can continue using slipstream pH measurement approach. A summary of the process steps, volume calculation approach, and acceptable online pH are shown in Table 3 below:

TABLE 3

Acceptance Criteria for Online pH

| Process Step | Addition Volume Calculation Approach | Acceptable Online pH |
|---|---|---|
| Protein Pool pH Measurement | N/A | 4.00-4.50 |
| Addition #1 | Conservative addition<br>Acid-Constant mL acid per kg of capture pool<br>Base-mL/kg linear function of target neutral pH | ΔpH within possible range predicted by statistical VI model |
| Addition #2 | Nondimensional titration model<br>Target: halfway to final pH | ≤0.10 pH units from target |
| Addition #3 | Nondimensional titration model<br>Target: final pH | ≤0.10 pH units from target |

Table 3 applies to a pH sequence with 3 addition steps. If, for example, four (or more) additions were used, then the target pH for each addition, relative to the final pH, would be adjusted accordingly.

Example 4: Calibration of pH Meters Used in the Online Process

One issue that needed to be addressed with the current system was pH probe calibration, and how to perform calibration externally to the pH transmitter. Industrial pH transmitters (e.g. Mettler Toledo M400) are typically limited to a 2-point calibration process. However, a 4-point calibration spanning pH 2-10 to ensure accuracy is desirable, and standard procedure using the offline probes.

Therefore, 4 point calibration process for the online probe to receive calibration procedure equivalent to those received by the offline probes was developed.

A calibration procedure that was carried out within the control logic of the system (e.g., through MATLAB) instead of using the transmitter's calibration function was developed. In this calibration procedure, a transmitter sends raw probe mV and probe temperature signals to the controller instead of a calculated pH signal. The control logic walks the user through the calibration steps and records mV and temperature for each buffer standard. The following calibration acceptance criteria were used:

Slope: 95-105%

Offset: +(0-15 mV)

Temperature: 20-25° C. for all standards

Linearity test: All standards within 0.05 pH units after calibration

Figure 14:
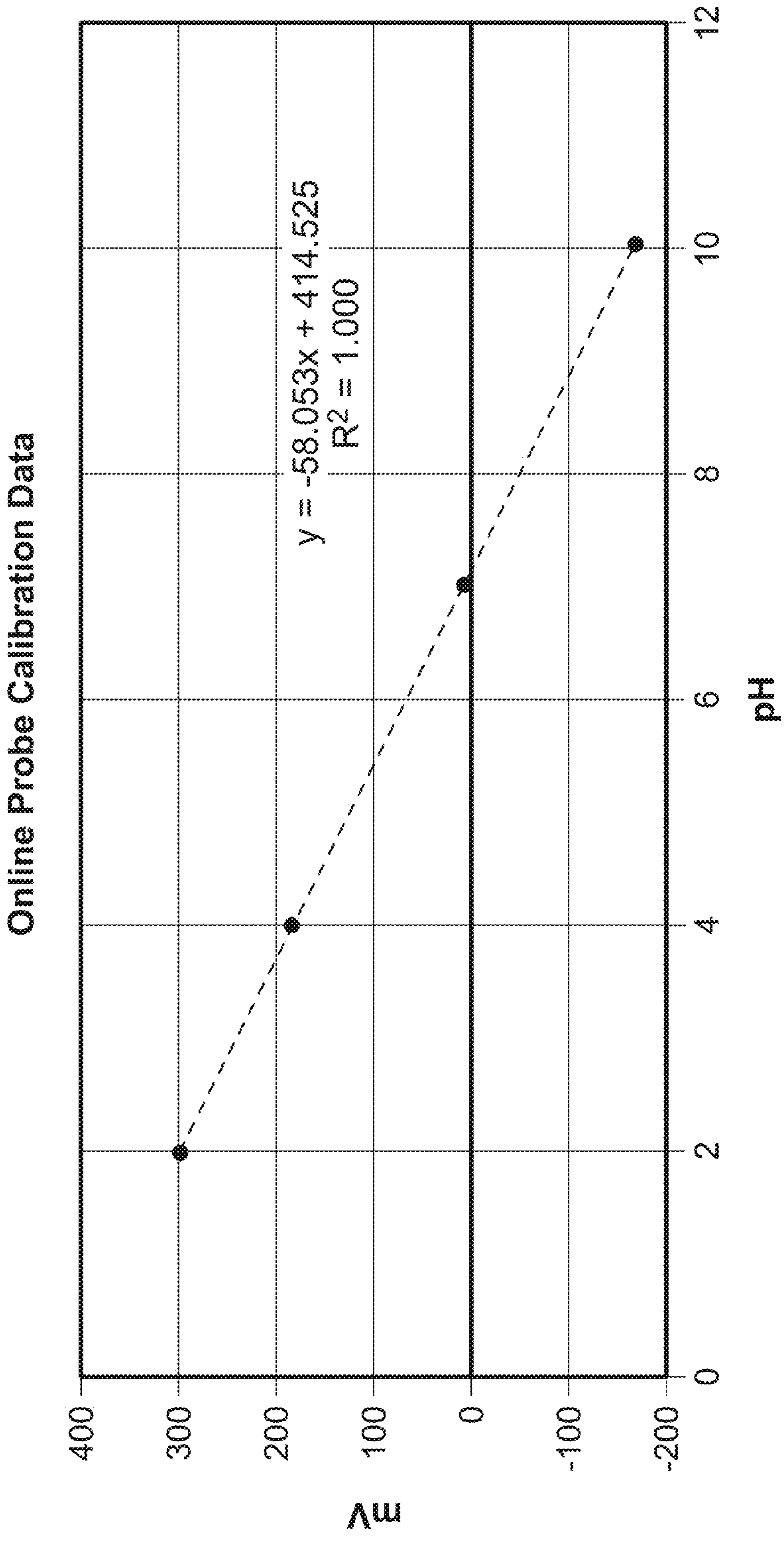
FIG. 14 shows an exemplary calibration curve for a pH meter used in exemplary methods of the disclosure.

During calibration, temperature compensation is also calculated within the control logic to account for the temperature dependence of the pH of the buffer standards. Temperature compensation is also calculated during in-process measurements during the titration process. An exemplary online probe calibration curve is shown in FIG. 14.

Example 5: Additional Model for pH Adjustment with No pH Normalization

An additional model for relating titrant to pH was developed, which did not use pH normalization for either the acid or base addition.

In this approach, for acid addition, two pH values from the historical titration curves described in Example 1 were chosen that were offset from the endpoints of the titration curves. These pH reference pH values ($pH_1$ and $pH_2$) were chosen such that they were as far apart as possible, while still being pH values included on every reference titration curve. Normalized titrant was then calculated by the following equation:

$$\text{Normalized titrant}=(\text{titrant added}-\text{titrant added at reference } pH_1)/(\text{titrant added at reference } pH_2-\text{titrant added at reference } pH_1) \quad \text{(Equation 12).}$$

For the acid titrant model, the reference $pH_1$ was 4.1 and reference $pH_2$ was 3.7. For the base titrant model, reference $pH_1$ was 3.7 and reference $pH_2$ was 7.6.

This normalized titrant ranges from below 0 to above 1. The dataset used for generating the acid adjustment model had ranged from −0.76 to 1.49, which resulted in the scale to which the acid titrant was normalized. The dataset used for generating the base adjustment model ranged from −0.06 to 1.53, which resulted in the scale to which the base titrant was normalized. The ranges used depend on the variability of initial and final pH values in the dataset. The two reference pH values selected for normalization were as far apart as possible while remaining within the bounds of the set of reference titration curves. One advantage of this approach is that the final pH of the sample can be anywhere along the titration curve generated by the reference samples, so long as it is contained with the reference titration curves. For example, the final pH for acid adjustment can be greater or equal to the final pH of the reference. Similarly, the final pH for the base adjustment can be less than or equal to the final pH of the reference.

Using this normalization strategy resulted in the following $4^{th}$ order polynomial for normalizing acid titrant during acid addition:

$$\text{Normalized Acid Titrant Addition} = 283.35764 - 279.43987 * pH + 104.25395 * pH^\wedge 2 - 17.257125 * pH^\wedge 3 + 1.0589067 * pH^\wedge 4. \quad \text{(Equation 13)}$$

A similar model, a $5^{th}$ order polynomial, was used for normalization base titrant during base addition:

$$\text{Normalized Base Titrant Addition} = 12.256725 - 10.723277 * pH + 3.3662386 * pH^\wedge 2 - 0.4588175 * pH^\wedge 3 + 0.0255417 * pH^\wedge 4 - 0.0003153 * pH^\wedge 5. \quad \text{(Equation 14)}$$

The apparatus described in Example 3, and the models described here, were used on a small scale protein pool to test performance. Slipstream pH measurement and ultrasonic flowmeter accuracy were tested. The results from five test runs are shown in FIG. 15. The ΔpH and Dosing Error (%) by Process Step, for each of the five test runs, are plotted in FIG. 16.

Figure 16:
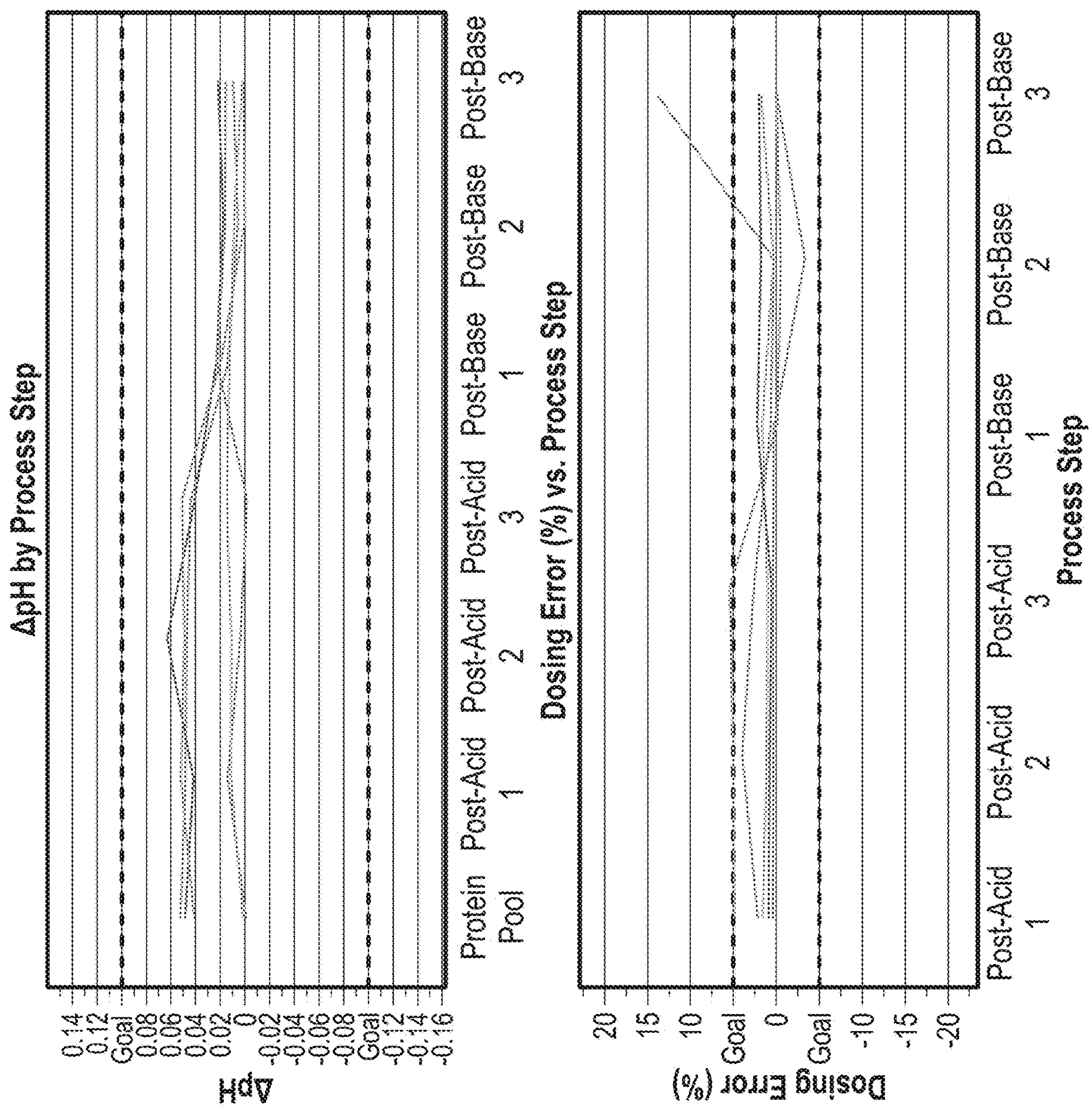
FIG. 16 is a pair of plots showing the difference in slipstream and offline pH (ΔpH) top and % Dosing Error (bottom). The formulas used to calculate ΔpH and % Dosing Error are shown in FIG. 15.

As shown in FIG. 15, the difference in pH observed between online and offline probes was 0.05 or less for all addition steps. The dosing error was generally less than 5%, except for the final base addition of the first test run. FIG. 16 shows the data from FIG. 15, with the difference between online and offline pH at top and dosing error at bottom, plotted across the viral inactivation pH sequence. Dosing error is the error in the volume of titrant added at each step, reported as the % difference between target volume and actual volume.

Figure 17:
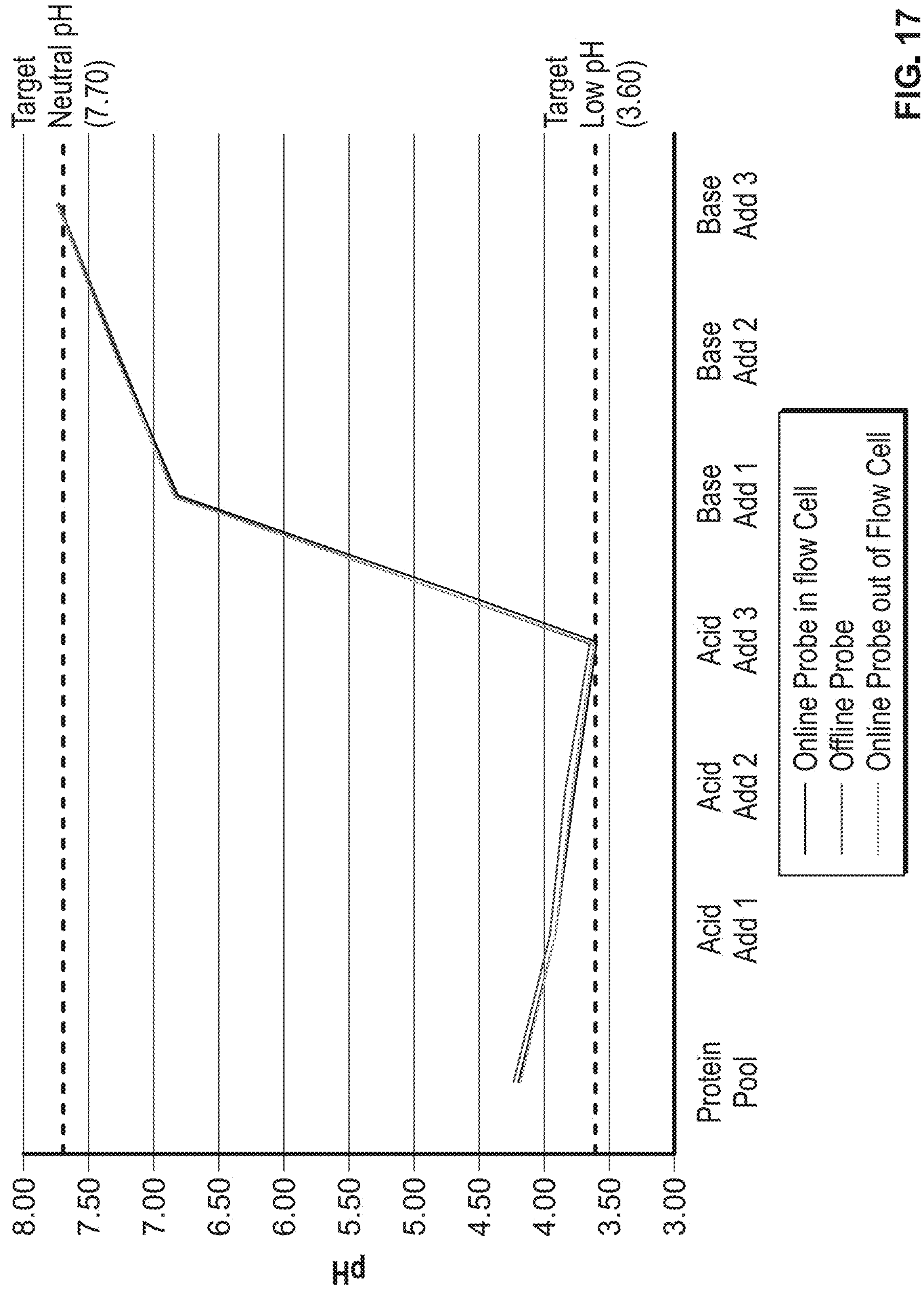
FIG. 17 is a plot comparing pH probe conditions in a viral inactivation test run using the apparatus and methods of an embodiment of the disclosure.

The impact of the flow cell on pH probe performance was also assayed in a test run, which compared the online probe used in this method, an offline probe, and online probe taking measurements outside of the flow cell. In this case, there were four acid addition steps, as the offline pH was not in range after the third acid addition step.

pH versus titrant addition step are plotted in FIG. 17 for each of the three probe conditions. After each slipstream pH measurement during the test run, the probe was removed from the flow cell and inserted directly into the sample to evaluate impact of flow cell on measurement. As shown in FIG. 17, pH measurements taken by the online probe in the flow cell, by the online probe outside the flow cell, and with an offline probe showed good correspondence.

Figure 18:
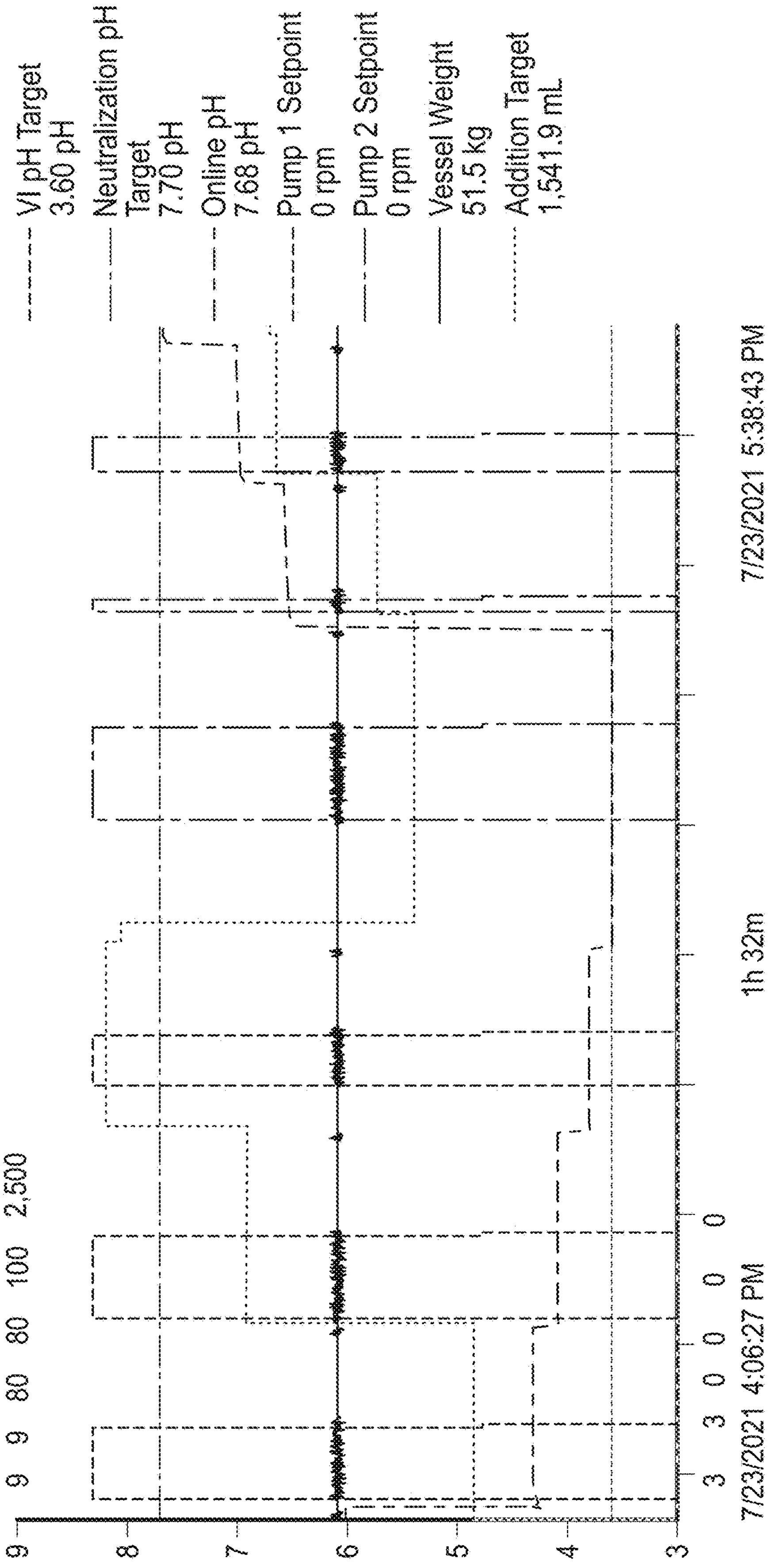
FIG. 18 shows real time process monitoring of a sample viral inactivation process.

A real time visualization of one of the test runs using a 55.1 kg protein pool is shown in FIG. 18.

Example 6: pH Adjustments with 3 or 4 Additions Using the Automated Titration System and Model The automated titration system described in Example 3 was used to perform low pH viral inactivation for 18 batches of protein, that represent 7 different protein products. The model described in Example 5, which does not use pH normalization, was used to relate the amount of titrant to pH during the pH adjustment process. In the viral inactivation of the 18 batches of protein, the goal was to achieve a pH that was less than 0.10 pH units from the final target pH, both when lowering the pH to inactivate potential viruses, and raising the pH back to neutral following viral inactivation.

Figure 21:
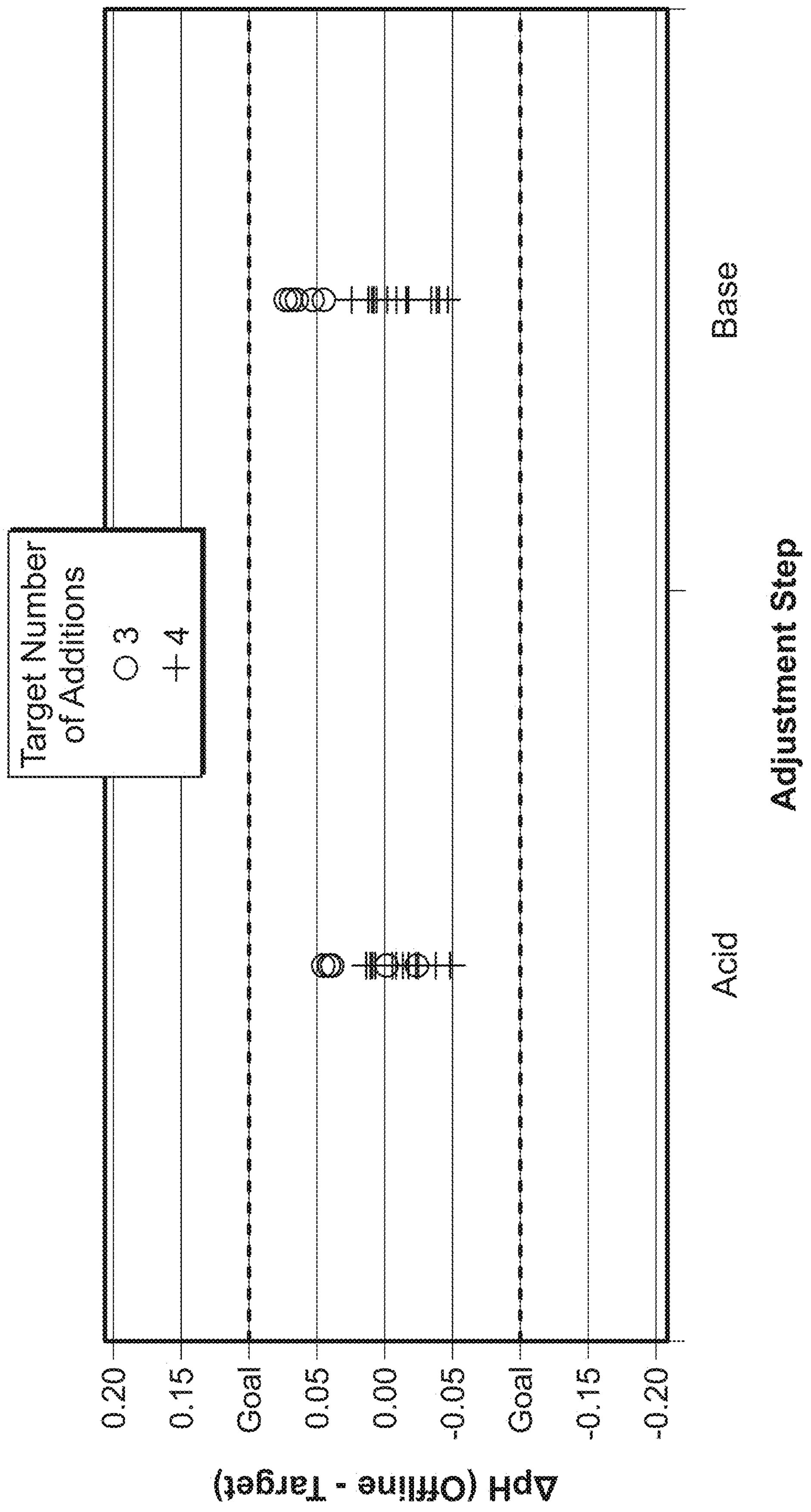
FIG. 21 is a plot showing the difference between actual pH (as measured by the offline reference probe) and target pH, for 18 batches of protein following pH adjustment using 3 (circles) or 4 (crosses) additions of acid or base. On the x-axis at left, the difference between measured and target pH is shown after pH was lowered for viral inactivation to a pH of between 3.50 and 3.60, depending on the protein. On the x-axis at right, the difference between actual and target pH is shown after raising pH to between 5.50 and 8.00, depending on the protein. Dashed lines indicate the goal of a final pH after addition that is within 0.10 pH units of the target pH.

When using 3 or 4 additions of acid or base per adjustment step, all 18 batches of protein met the goal of <0.10 pH units from the target pH, according to the offline reference probe for both acid and base adjustment steps. The results are shown in FIG. 21, which plots the difference between the pH measured by the offline reference probe and the target pH following acid (left) or base (right) adjustment. The acid or base, respectively, was added in 3 additions (circles) or 4 additions (crosses). The target acid pH for viral inactivation was between 3.50 and 3.60. The target neutralization pH following viral inactivation was between 5.50 and 8.00, depending on the protein.

Figure 22:
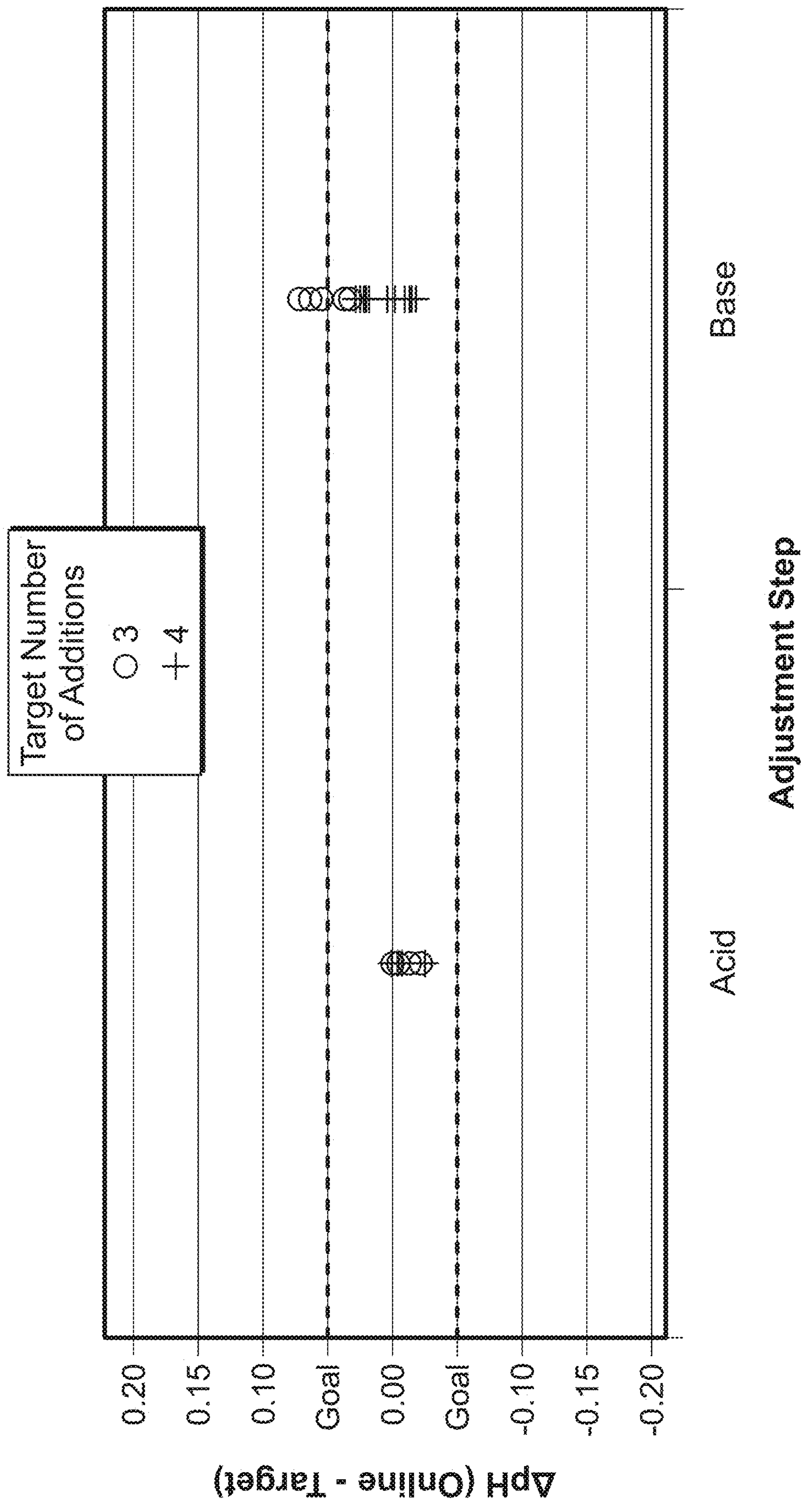
FIG. 22 is a plot showing the difference between pH as measured by the online controlling probe and target pH, for 18 batches of protein following pH adjustment using 3 (circles) or 4 (crosses) additions of acid or base. On the x-axis at left, the difference between measured and target pH is shown after pH was lowered for viral inactivation to a pH of 3.6. On the x-axis at right, the difference between actual and target pH is shown after raising pH to pH 7.7 to 8.0, depending on the protein. Dashed lines indicate the goal of a final pH after addition that is within 0.05 pH units of the target pH.

When 3 additions per adjustment step were used, all protein batches were within <0.10 pH units of the target pH after addition of acid or base (FIG. 21). However, when 3 additions per adjustment step were used, the more stringent goal of a final pH that was within less than 0.05 pH units of target pH, according to the online controlling probe, was not consistently met when adjusting the pH to neutral following the low-pH viral inactivation step (FIG. 22, right side).

A 4 addition strategy was implemented to improve the accuracy of the method. With this revised approach, the third addition of acid or base adjusted the pH to within 0.05 to 0.10 pH units of the target pH. A small fourth addition was performed to accurately achieve the target pH. As can be seen in FIGS. 21 and 22, the 4 addition strategy increased the accuracy of the methods, such that a final pH that was within 0.05 pH units of the target pH was consistently achieved for both acid and base adjustment steps. As can be seen in FIG. 22, all 13 batches that had their pH adjusted using the 4 addition step strategy met the goal of less 0.05 pH units from target according to the online probe.

Figure 23:
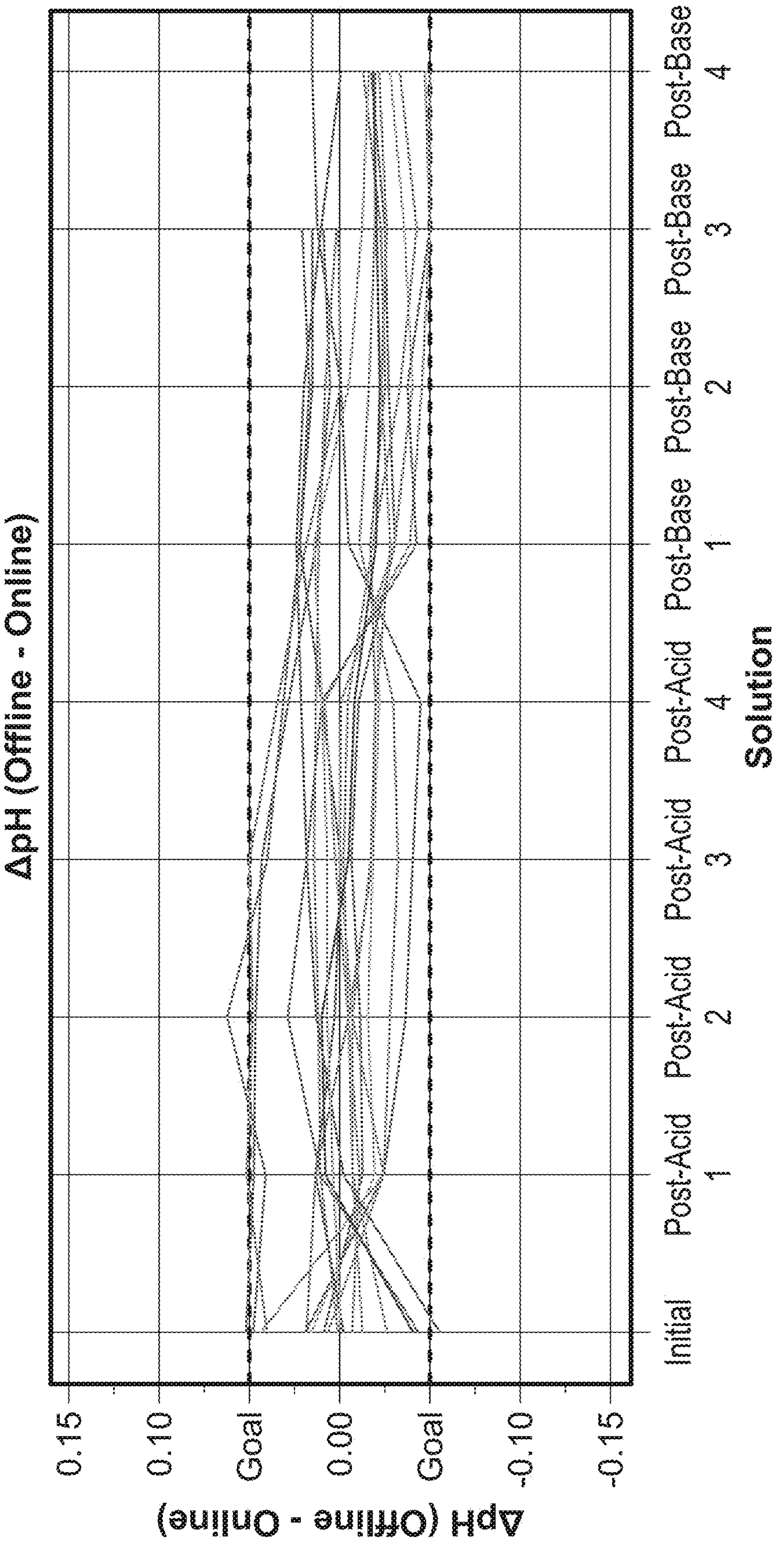
FIG. 23 is a plot showing the difference in pH measured by the offline reference probe and the online controlling probe installed in the flow cell (ΔpH) at each addition step for 18 batches of protein.

The automated system was also able to accurately measure the pH of the protein samples throughout the viral inactivation process. When the difference between pH, as measured by the offline reference probe, and pH as measured by the online controlling probe was determined at each addition step, it was found that 147 out of 151 discrete pH measurements were within a 0.05 pH unit difference between the offline reference probe and the online controlling probe inserted in the flow cell (FIG. 23). Thus, the model is able to accurately determine the amount of acid or base to add at each step, and the system can add the requisite amount of acid or base to consistently produce pH changes during both the acid or base titration process that are within 0.05 pH units of the target pH for any given addition step.

Figure 24:
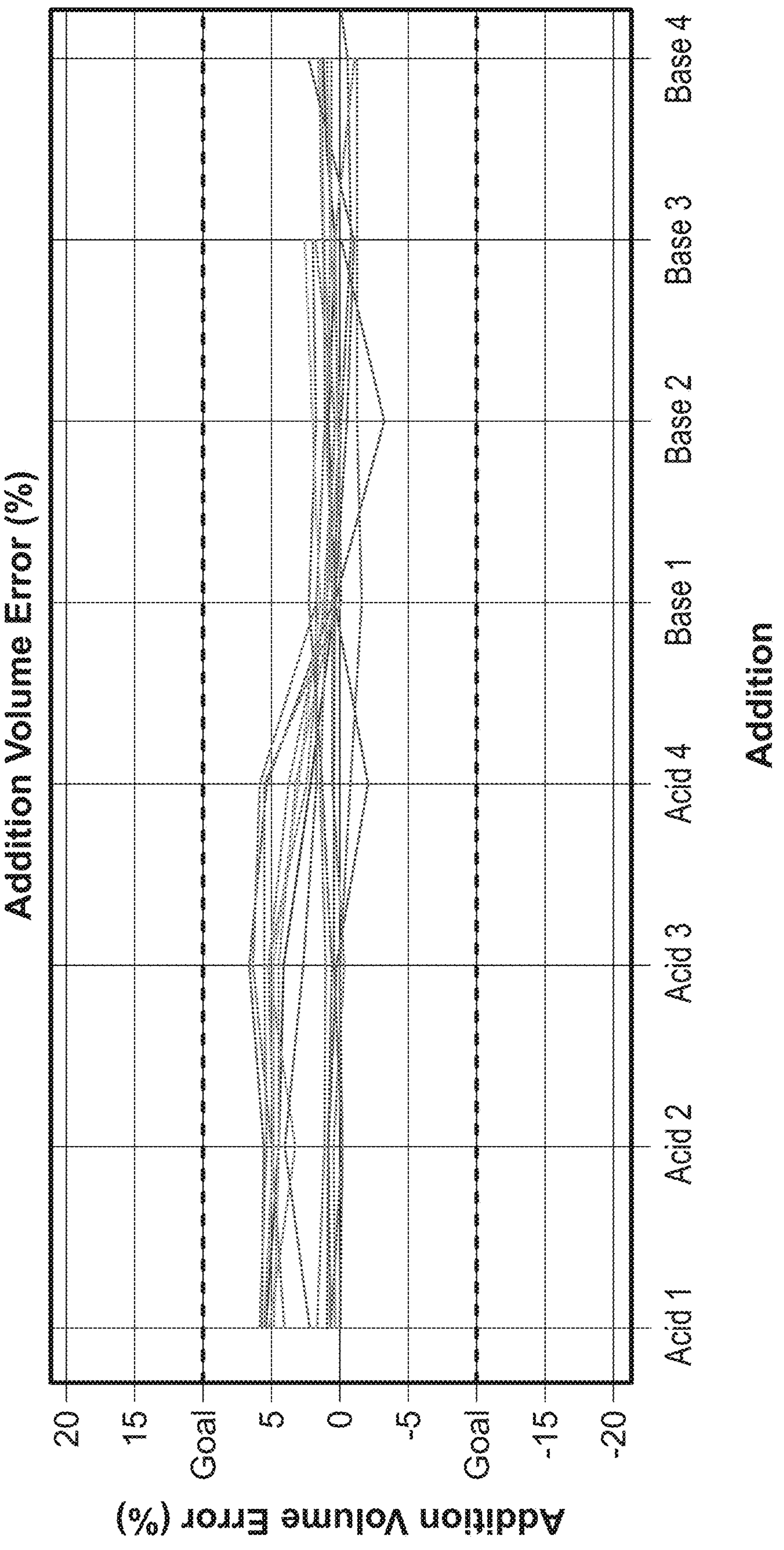
FIG. 24 is a plot showing the percent error in addition volume (sometimes referred to as dosing error) at each addition step for 18 batches of protein (133 additions total). The formula for percent error in addition volume is shown in FIG. 15.

In addition, the automated system is able to accurately add the volumes of acid or base titrant determined by the model. As shown in FIG. 24, 133 out of 133 additions had less than 10% error in the volume of titrant added.

What is claimed is:

1. A method comprising:

measuring an initial pH ($pH_{initial}$) of a sample;

adding a first amount of titrant ($Titrant_n$) to the sample and measuring a first additional pH value ($pH_n$), $Titrant_n$ being an amount of titrant added to the sample to reach $pH_n$, wherein $pH_n$ is different from $pH_{initial}$, and wherein the initial pH (pHinitial) and the first additional pH value ($pH_n$) are measured using a pH probe or a pH meter of a pH flow cell;

applying a model to determine a second amount of titrant ($Titrantn_{+1}$) to reach a target pH value, based on $pH_{initial}$, $Titrant_n$ and $pH_n$, wherein the target pH is a first intermediate target pH; and based upon the result obtained by the model for determining a second amount of titrant ($Titrant_{n+i}$), adding the second amount of titrant ($Titrant_{n+i}$) to the sample;

measuring a second pH ($pH_{n+1}$) of the sample, using a pH probe or a pH meter of a pH flow cell, after adding the second amount of titrant ($Titrant_{n+i}$); and correcting the pH meter-used to measure the second pH ($pH_{n+1}$) when a difference between the second pH ($pH_{n+1}$) and the target pH value to indicate a calibration error in the pH meter.

2. The method of claim 1, wherein the difference between $pH_{n+1}$ as measured and the target pH value is >0.01 pH units, >0.02 pH units, >0.03 pH units, >0.04 pH units, >0.05 pH units, >0.06 pH units, >0.07 pH units, >0.08 pH units, >0.09 pH units, or >0.10 pH units.

3. The method of claim 1, wherein the difference between $pH_{n+1}$ as measured and the target pH value is >0.05 pH units.

4. The method of claim 1, wherein the target pH value is an intermediate target pH value, and wherein the method further comprises:

adding a third amount of titrant ($Titrant_{n+2}$) to the sample;

measuring a third pH ($pH_{n+2}$) of the sample; and applying the model to determine a fourth amount of titrant to reach a target final pH based on $pH_{initial}$, $Titrant_{n+2}$, and $pH_{n+2}$.

5. The method of claim 4, further comprising adding the fourth amount of titrant to the sample and measuring a fourth pH of the sample to determine $pH_{n+3}$ as measured, wherein a difference between $pH_{n+3}$ as measured and the target final pH is >0.01 pH units, >0.02 pH units, >0.03 pH units, >0.04 pH units, >0.05 pH units, >0.06 pH units, >0.07 pH units, >0.08 pH units, >0.09 pH units, or >0.10 pH units.

6. The method of claim 5, wherein the difference between $pH_{n+3}$ as measured and the target final pH indicates the calibration error in the pH meter.

7. The method of claim 4, further comprising:

generating at least one reference titration curve from at least one reference sample relating an amount of titrant added to the at least one reference sample to a pH of the at least one reference sample;

optionally normalizing the at least one reference titration curve; and generating the model to fit the at least one reference titration curve.

8. The method of claim 7, wherein generating the at least one reference titration curve comprises:

measuring an initial pH of the at least one reference sample ($pH_{initial\_ref}$);

adding the amount of titrant to the at least one reference sample ($Titrant_{n\_ref}$) and measuring an additional reference pH value ($pH_{n\_ref}$), $Titrant_{n\_ref}$ being the amount of titrant added to the at least one reference sample to reach $pH_{n\_ref}$, wherein $pH_{n\_ref}$ is different from $pH_{initial\_ref}$;

repeating step (ii) until the at least one reference sample reaches a final pH ($pH_{final\_ref}$) by adding a total amount of titrant to the at least one reference sample ($Titrant_{tot\_ref}$); and plotting amount of titrant added versus pH of the at least one reference sample.

9. The method of claim 7, further comprising correcting for pH meter calibration when generating the model.

10. The method of claim 9, wherein correcting for pH meter calibration comprises:

removing a first portion of the at least one reference sample prior to adding the amount of titrant, and measuring the pH of said first portion with an independently calibrated pH meter thereby generating an offline initial pH value ($pH_{initial\_off\_ref}$);

removing a second portion of the at least one reference sample after addition of a total amount of titrant and measuring the pH of said second portion with the independently calibrated pH meter thereby generating an offline final pH value ($pH_{final\_off\_ref}$); and applying a relationship between ($pH_{final\_off\_ref}$) and a measured pH value for the at least one reference sample to determine a corrected pH for the at least one reference sample.

11. The method of claim 10, wherein a corrected pHn_ref for the at least one reference sample is determined by:

$$pH_{initial\_off\_ref} + (pH_{final\_off\_ref} - pH_{initial\_off\_ref}) \times \left( \frac{pH_{n\_ref} - pH_{initial\_ref}}{pH_{final\_ref} - pH_{initial\_ref}} \right).$$

12. The method of claim 8, wherein the amount of titrant added to the at least one reference sample is normalized by:

$$pH_{initial\_off\_ref} + (pH_{final\_off\_ref} - pH_{initial\_off\_ref}) \times \left( \frac{pH_{n\_ref} - pH_{initial\_ref}}{pH_{final\_ref} - pH_{initial\_ref}} \right),$$

wherein $Titrant_{1\_ref}$ is an amount of titrant added to the at least one reference sample to reach a first reference pH ($pH_{1\_ref}$), and $Titrant_{2\_ref}$ is an amount of titrant added to the at least one reference sample to reach $pH_{2\_ref}$.

13. The method of claim 8, wherein the at least one reference titration curve comprises a single titration curve, and wherein $pH_{1\_ref}=pH_{initial\_ref}$, and $pH_{2\_ref}=pH_{final\_ref}$.

14. The method of claim 8, wherein the at least one reference titration curve comprises a plurality of reference titration curves.

15. The method of claim 14, wherein each reference titration curve comprises $pH_{initial\_ref}$ and $pH_{final\_ref}$, and wherein:

$pH_{1\_ref}$ is from one of the plurality of reference titration curves, and $pH_{2\_Ref}$ is from one of the plurality of reference titration curves, and $pH_{1\_ref}$ and $pH_{2\_ref}$ are selected to encompass a maximal difference in value while still encompassing pH values covered by all of the plurality of reference titration curves.

16. The method of claim 12, wherein the initial pH of the sample ($pH_{initial}$) and $pH_{1\_ref}$ are about the same, or wherein the initial pH of the sample ($pH_{initial}$) and $pH_{1\_ref}$ are not the same.

17. The method of claim 12, wherein the target final pH of the sample and $pH_{2\_ref}$ are about the same, or wherein the target final pH o the sample and $pH_{2\_ref}$ are not the same.

18. The method of claim 12, wherein $pH_{initial}$, $pH_{initial\_ref}$ and $pH_{1\_ref}$ are about the same, and wherein the target final pH of the sample, $pH_{final\_ref}$ and $pH_{2\_ref}$ are about the same.

19. The method of claim 8, wherein the target final pH of the sample is less than the initial pH of the sample ($pH_{initial}$), and wherein the titrant is an acid.

20. The method of claim 19, wherein $pH_{1\_ref}$ is between about 4.0 and 4.3, and $pH_{2\_ref}$ is between about 3.4 and 3.9.

21. The method of claim 19, wherein $pH_{initial}$ is between about 4.0 to 4.5, between about 4.1 and 4.5, between about 4.2 and 4.5, between about 4.3 and 4.5, between about 4.1 and 4.4 or between about 4.2 and 4.4.

22. The method of claim 19, wherein the target final pH of the sample is between about 3.0 and 3.8, between about 3.1 and 3.8, between about 3.2 and 3.8, between about 3.3 and 3.7, between about 3.4 and 3.7 or between about 3.5 and 3.7.

23. The method of claim 4, wherein the target final pH of the sample is greater than the initial pH ($pH_{initial}$), and wherein the titrant is a base.

24. The method of claim 23, wherein $pH_{1\_ref}$ is between about 3.0 and 3.8, or between about, between about 3.1 and 3.8, between about 3.2 and 38, between about 3.3 and 3.7, between about 3.4 and 3.7, or between about 3.5 and 3.7, and $pH_{2\_ref}$ is between about 5.3 and 8.5, between about 5.1 and 8.1, between about 5.5-8.0, or between about 7.5 and 8.0.

25. The method of claim 23, wherein $pH_{initial}$ is between about 3.0 and 3.8, between about 3.1 and 3.8, between about 3.2 and 3.8, between about 3.3 and 3.7, between about 3.4 and 3.7 or between about 3.5 and 3.7.

26. The method of claim 23, wherein the target final pH of the sample is between about 5.3 and 8.5, between about 5.1 and 8.1, between about 5.5-8.0, or between about 7.5 and 8.0.

27. The method of claim 1, wherein correcting the pH meter comprises sending a signal to an operator indicating that a pH probe is faulty.

28. The method of claim 1, wherein correcting the pH meter comprises recalibrating or replacing the pH meter.

29. The method of claim 7, further comprising, prior to measuring $pH_{initial}$ at step (i), comparing $pH_{initial}$ to a pH previously measured for the at least one reference sample, and correcting the pH meter when the difference between $pH_{initial}$ and the pH previously measured the calibration error in the pH meter.

30. The method of claim 1, further comprising comparing the $pH_{initial}$ from the sample to a $pH_{initial}$ value predicted by a statistical titration model, and correcting the pH meter when the difference between $pH_{initial}$ and the $pH_{initial}$ predicted by the statistical titration model indicates the calibration error in the pH meter.

31. The method of claim 1, further comprising comparing a change in pH from $pH_{initial}$ to $pH_n$ to a change in pH predicted by a statistical titration model, and correcting the pH meter when a difference between the change in pH from $pH_{initial}$ to $pH_n$ and the change in pH predicted by the statistical titration model indicates the calibration error in the pH meter.

32. The method of claim 1, wherein the sample comprises a protein of interest, and wherein the method prevents damage to the protein of interest caused by adding too much titrant to the sample.

33. The method of claim 1, wherein the sample comprises dupilumab.

* * * * *